US006954525B2

(12) United States Patent
Deo et al.

(10) Patent No.: US 6,954,525 B2
(45) Date of Patent: *Oct. 11, 2005

(54) METHOD AND APPARATUS FOR PROVIDING REAL-TIME EXECUTION OF SPECIFIC COMMUNICATIONS SERVICES IN AN INTELLIGENT NETWORK

(75) Inventors: Ajay P. Deo, Lewisville, TX (US); Kelvin R. Porter, Dallas, TX (US); Henry Wang, Irvine, TX (US)

(73) Assignee: MCI, Inc., Ashburn, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/613,879

(22) Filed: Jul. 3, 2003

(65) Prior Publication Data

US 2004/0005046 A1 Jan. 8, 2004

Related U.S. Application Data

(63) Continuation of application No. 09/420,669, filed on Oct. 19, 1999, now Pat. No. 6,594,355, which is a continuation-in-part of application No. 09/128,937, filed on Aug. 5, 1998, now Pat. No. 6,418,461.
(60) Provisional application No. 60/061,173, filed on Oct. 6, 1997, and provisional application No. 60/104,890, filed on Oct. 20, 1998.

(51) Int. Cl.[7] ............................. H04M 7/00; G06F 9/44
(52) U.S. Cl. .................. 379/219; 379/221.08; 379/229; 719/315
(58) Field of Search ........................... 379/219, 220.01, 379/221.08–221.12, 229, 230, 270.02, 201.01, 201.05; 719/315–317

(56) References Cited

U.S. PATENT DOCUMENTS 4,713,806 A 12/1987 Oberlander 5,157,390 A 10/1992 Yoshie et al.
(Continued)

FOREIGN PATENT DOCUMENTS

| WO | 95/23483 | 8/1995 |
|---|---|---|
| WO | 96/13949 | 5/1996 |

(Continued)

OTHER PUBLICATIONS

Stowe, Mike, "Service Management For the Advanced Intelligent Network", Countdown to the New Milennium, Phoenix Dec. 2–5, 1991, Proceedings of the Global Telecommunications Conference. (Globecom), New York, IEEE, US, vol. 3, Dec. 12, 1991, pp. 1667–1671.

*Primary Examiner*—Benny Tieu

(57) ABSTRACT

System and methodology for providing real-time call processing services received at a switch in an intelligent network having one or more service nodes having originating switches for receiving a call event. The system includes a platform-independent communication system for enabling communication between object instances executing at service nodes in the intelligent network. An operating system agent object instance executing in an execution environment associated with an originating switch communicates call origination information corresponding to a call event received at the switch to one or more object instances executing in an execution environment provided at a service node in the network; the object instances including a line object instance for maintaining the state of a communications line associated with a call origination, and, a service object implementing methods for performing a service according to a customer request. A first database storage device accessible by the service object provides call routing information according to a customer's subscription. A second database storage device is accessible by the service object to provide a corresponding terminating switch location address at a node in the network for the call based on the retrieved call routing information. The platform-independent communication system communicates call routing commands between the service object and at least the line object instance, for enabling call connection between originating and terminating switches independent of their location in the network.

18 Claims, 25 Drawing Sheets

U.S. PATENT DOCUMENTS

| | | | |
|---|---|---|---|
| 5,168,515 A | 12/1992 | Grechter et al. | |
| 5,185,782 A | 2/1993 | Srinivasan | 379/210.01 |
| 5,323,452 A | 6/1994 | Dickman et al. | |
| 5,335,268 A | 8/1994 | Kelly, Jr. et al. | |
| 5,450,480 A | 9/1995 | Man et al. | |
| 5,463,682 A | 10/1995 | Fisher et al. | |
| 5,475,817 A | 12/1995 | Waldo et al. | |
| 5,537,466 A | 7/1996 | Taylor et al. | |
| 5,551,035 A | 8/1996 | Arnold et al. | |
| 5,619,557 A | 4/1997 | Van Berkum | |
| 5,644,629 A | 7/1997 | Chow | |
| 5,655,081 A | 8/1997 | Bonnell et al. | 709/202 |
| 5,664,102 A | 9/1997 | Faynberg | |
| 5,742,668 A | 4/1998 | Pepe et al. | |
| 5,748,896 A | 5/1998 | Daly et al. | |
| 5,754,639 A | 5/1998 | Flockhart et al. | |
| 5,754,939 A | 5/1998 | Herz et al. | |
| 5,774,668 A | 6/1998 | Choquier et al. | |
| 5,799,153 A | 8/1998 | Blau et al. | |
| 5,812,533 A | 9/1998 | Cox et al. | |
| 5,825,865 A | 10/1998 | Oberlander et al. | |
| 5,825,869 A | 10/1998 | Brooks et al. | |
| 5,826,268 A | 10/1998 | Schaefer et al. | |
| 5,828,747 A | 10/1998 | Fisher et al. | |
| 5,838,970 A | 11/1998 | Thomas | |
| 5,867,498 A | 2/1999 | Gillman et al. | |
| 5,881,134 A | 3/1999 | Foster et al. | |
| 5,892,946 A | 4/1999 | Woster et al. | |
| 5,898,839 A | 4/1999 | Berteau | |
| 5,907,607 A | 5/1999 | Waters et al. | |
| 5,912,961 A * | 6/1999 | Taylor et al. | 379/221.11 |
| 5,915,008 A | 6/1999 | Dulman | |
| 5,923,892 A * | 7/1999 | Levy | 712/31 |
| 5,940,616 A | 8/1999 | Wang | |
| 5,958,016 A | 9/1999 | Chang et al. | |
| 5,966,434 A | 10/1999 | Schafer | |
| 5,991,389 A * | 11/1999 | Ram et al. | 379/230 |
| 5,991,811 A | 11/1999 | Ueno et al. | |
| 5,999,965 A | 12/1999 | Kelly | |
| 6,014,700 A | 1/2000 | Bainbridge et al. | |
| 6,028,924 A * | 2/2000 | Ram et al. | 379/229 |
| 6,041,109 A | 3/2000 | Waller et al. | |
| 6,041,117 A | 3/2000 | Androski et al. | |
| 6,044,142 A | 3/2000 | Hammarstrom et al. | |
| 6,044,264 A | 3/2000 | Huotari et al. | |
| 6,044,368 A | 3/2000 | Powers | |
| 6,078,586 A | 6/2000 | Dugan et al. | |
| 6,085,030 A | 7/2000 | Whitehead et al. | |
| 6,101,616 A | 8/2000 | Joubert et al. | |
| 6,122,510 A | 9/2000 | Granberg | |
| 6,134,530 A | 10/2000 | Bunting et al. | |
| 6,182,109 B1 | 1/2001 | Sharma et al. | |
| 6,208,856 B1 | 3/2001 | Jonsson | |
| 6,209,018 B1 | 3/2001 | Ben-Shachar et al. | |
| 6,266,406 B1 | 7/2001 | Mercouroff et al. | |
| 6,295,353 B1 | 9/2001 | Flockhart et al. | |
| 6,310,949 B1 * | 10/2001 | Taylor et al. | 379/219 |
| 6,321,323 B1 * | 11/2001 | Nugroho et al. | 712/34 |
| 6,324,275 B1 | 11/2001 | Yagel et al. | |
| 6,327,355 B1 * | 12/2001 | Britt | 379/201.03 |
| 6,330,326 B1 | 12/2001 | Whitt | |
| 6,333,931 B1 | 12/2001 | LaPier et al. | |
| 6,360,266 B1 | 3/2002 | Pettus | |
| 6,363,411 B1 | 3/2002 | Dugan et al. | |
| 6,366,657 B1 | 4/2002 | Yagel et al. | |
| 6,393,481 B1 | 5/2002 | Deo et al. | |
| 6,418,461 B1 * | 7/2002 | Barnhouse et al. | 709/201 |
| 6,430,600 B1 | 8/2002 | Yokote | |
| 6,453,038 B1 | 9/2002 | McFarlane et al. | |
| 6,564,270 B1 | 5/2003 | Andert et al. | |
| 6,628,769 B1 | 9/2003 | Vleer et al. | |

FOREIGN PATENT DOCUMENTS

| | | |
|---|---|---|
| WO | 96/20448 | 7/1996 |
| WO | 98/09421 | 3/1998 |
| WO | 00/23898 | 4/2000 |
| WO | 00/24182 | 4/2000 |

* cited by examiner

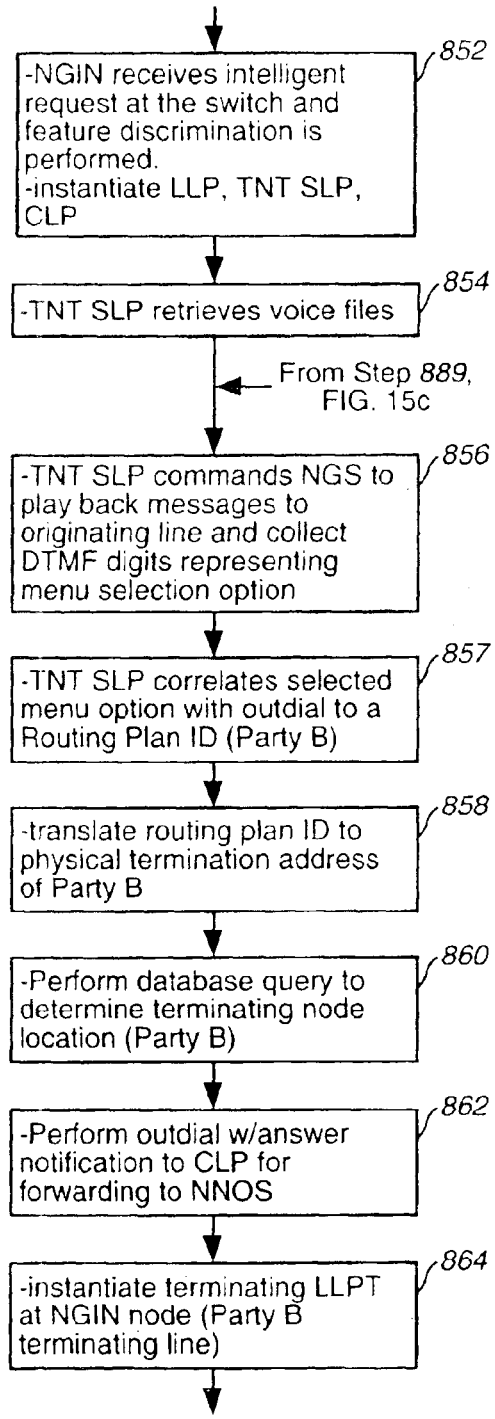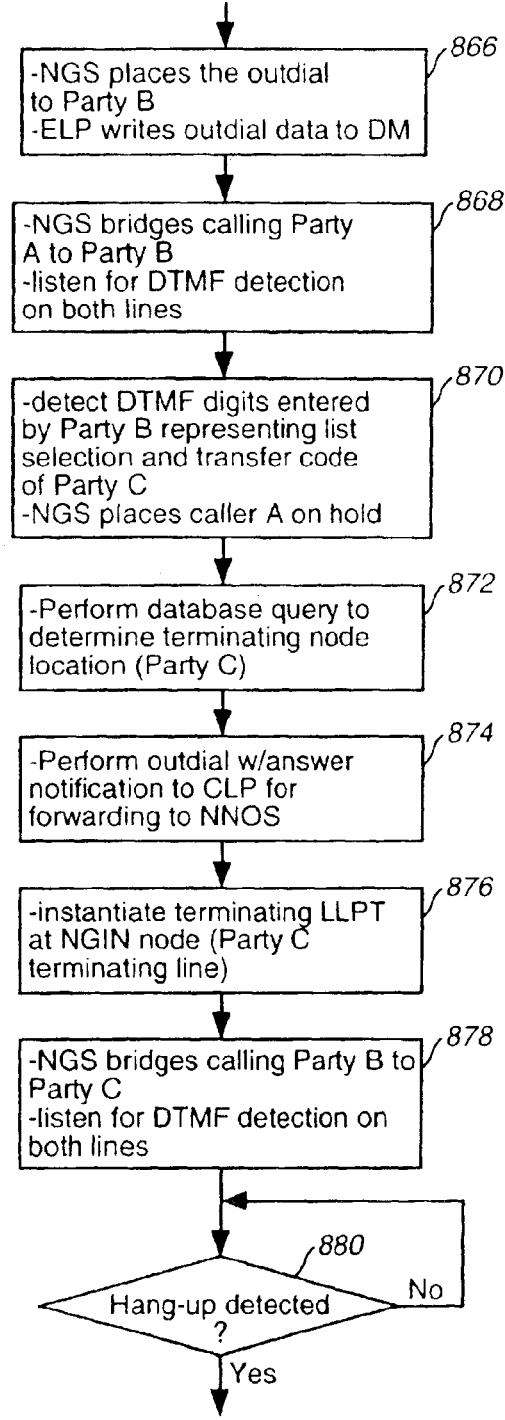
FIG. 15a
FIG. 15b

METHOD AND APPARATUS FOR PROVIDING REAL-TIME EXECUTION OF SPECIFIC COMMUNICATIONS SERVICES IN AN INTELLIGENT NETWORK

CROSS-REFERENCE TO RELATED APPLICATION

This application is a continuation of U.S. patent application Ser. No. 09/420,669, filed Oct. 19, 1999, now U.S. Pat. No. 6,594,355, entitled "Method and Apparatus for Providing Real Time Execution of Specific Communications Services in an Intelligent Network" which is a Continuation-In-Part of commonly assigned, U.S. patent application Ser. No. 09/128,937, filed Aug. 5, 1998, now U.S. Pat. No. 6,418,461, entitled "Intelligent Call Platform for an Intelligent Network Distributed Architecture" which claims the benefit of U.S. Provisional Application Ser. No. 60/061,173, filed Oct. 6, 1997, both of which are incorporated herein in their entirety by reference thereto. This application additionally claims the benefit of U.S. Provisional Application Ser. No. 60/104,890, filed Oct. 20, 1998, the whole contents and disclosure of which is incorporated by reference as if fully set forth herein.

FIELD OF THE INVENTION

The present invention relates generally to intelligent network systems for providing telecommunications services, and specifically, to a methodology for performing services in response to service requests received at a switch associated with an intelligent communications network.

BACKGROUND OF THE INVENTION

A network service is a function performed by a communications network, such as data or telephony, and its associated resources in response to an interaction with one or more subscribers. For example, a telephony network resident service, such as call forwarding or voice mail access, can be invoked by a subscriber by dialing a special sequence of digits. Other network services may be directed at assisting a network owner with security, validation, and authentication. Adding or modifying a service requires changes to be made in the communications network.

Most conventional telecommunication networks are composed of interconnected switches and communication services. These switches are controlled by integrated or imbedded processors operated by proprietary software or firmware designed by the switch manufacturer. Typically, the switch manufacturer's software or firmware must support all functional aspects of service processing, call processing, facility processing and network management. This means that when a network owner wishes to implement a new-service or modify an existing service, the software of every switch in the network must be revised by the various, switch manufacturers.

The fact that the network contains different, switch models from different manufacturers requires careful development, testing and deployment of the new software. The time required to develop, test and deploy the new software is lengthened because the code size at each switch grows larger and more complex with each now revision. Thus, this process can take several years. In addition, this increased complexity further burdens the switch processors, increases the chances for switch malfunction, and may require the modification or replacement of the switch.

Moreover, the fact that multiple network owners depend upon a common set of switch manufacturers results in two undesirable situations that limit competition. First, a manufacturers' software release may attempt to incorporate changes requested by several network owners, thus preventing the network owners from truly differentiating their services from the services provided by their competition. This also forces some network owners to wait until the manufacturer incorporates requests from other network owners into the new release. Second, a-switch software release incorporating a function as requested by one network owner to implement a new service can unintentionally become accessible to other network owners.

These problems have become intolerable as the demand for new network services has increased exponentially over the last five to ten years due to increased subscriber mobility, increased variety and bandwidth of traffic, dissolution of traditional numbering plans, more sophisticated services and increased competition. Thus, it is widely recognized that new network architectures need to incorporate a more flexible way of creating, deploying and executing service logic. In order to fully appreciate the novel architecture of the present invention hereinafter described, the following description of the relevant prior art is provided with reference to FIGS. 1–4.

Referring to FIG. 1, a logical representation of various switching architectures, including the present invention, is shown. A monolithic switch, which is denoted generally as 20, contains service processing functions 22, call processing functions 24, facility processing functions 26 and a switch fabric 28. All of these functions 22, 24, 26 and 28 are hard-coded, intermixed and undifferentiated, as symbolized by the group 30. Moreover, functions 22, 24, 26 and 28 are designed by the switch manufacturer and operate on proprietary platforms that vary from manufacturer to manufacturer. As a result, these functions 22, 24, 26 and 28 cannot be modified without the aid of the manufacturer, which slows down service development and implementation, and increases the cost of bringing a new service to market. The development of new and innovative services, call processing, data processing, signal processing and network operations are, therefore, constrained by the manufacturer's control over their proprietary switch hardware and software, and the inherent difficulty of establishing and implementing industry standards.

The service processing functions 22 are encoded within the monolithic switch 20 and only allow local control of this process based on local data contents and the number dialed. This local information is interpreted by a hard-coded process engine that carries out the encoded service function: The call processing functions 24 are hard-coded and provide call origination and call termination functions. This process actually brings up and takes down individual connections to complete a call. Likewise, the facility processing functions 26 are also hard-coded and provide all data processing relating to the physical resources involved in a call. The switch fabric 28 represents the hardware component of the switch and the computer to run the monolithic software provided by the switch manufacturer, such as Northern Telecom, Inc. The switch fabric 28 provides the physical facilities necessary to establish a connection and may include, but is not limited to, bearer devices (T1's and DSO's), switching matrix devices (network planes and their processors), link layer signal processors (SS7, MTP, ISDN, LAPD) and specialized circuits (conference ports, audio tone detectors).

In an attempt to address the previously described problems, the International Telecommunications Union and the European Telecommunication Standards Institute endorsed the ITU-T Intelligent Network Standard ("IN"). Similarly, Bellcore endorsed the Advanced Intelligent Network Standard ("AIN"). Although these two standards differ in presentation and evolutionary state, they have almost identical objectives and basic concepts. Accordingly, these standards are viewed as a single network architecture in which the service processing functions 22 are separated from the switch.

Using the IN and AIN architectures, a network owner could presumably roll out a new service by creating and deploying a new Service Logic Program ("SLP"), which is essentially a table of Service Independent Building Blocks ("SIBB") to be invoked during a given type of call. According to this approach, a number of specific element types inter-operate in conjunction with a SLP to provide services to network subscribers. As a result, any new or potential services are limited by the existing SIBBS.

The In or AIN architecture, which is denoted generally as 40, logically separates the functions of the monolithic switch 20 into a Service Control Point ("SCP") 42, and a Service Switching Point ("SSP") and Switching System 44. The SCP 42 contains the service processing functions 22, whereas the SSP and Switching System 44 contain the call processing functions 24, facility processing functions 26 and the switch fabric 28. In this case, the call processing functions 24, facility processing functions 26 and the switch fabric 28 are hard-coded, intermixed and undifferentiated, as symbolized by the group 46.

The Service Switching Point ("SSP") is a functional module that resides at a switch in order to recognize when a subscriber's signaling requires more than simple routing based solely upon the number dialed. The SSP suspends further handling of the call while it initiates a query for correct handling of the call to the remote SCP 42, which essentially acts as a database server for a number of switches. This division of processing results in the, offloading of the infrequent, yet time consuming task of handling special service calls, from the switch. Furthermore, this moderate centralization draws a balance between having one readily modifiable, heavy burdened repository serving the whole network versus deploying a complete copy of the repository at every switch.

Referring now to FIG. 2; a diagram of a telecommunications system employing an IN or AIN architecture is shown and is denoted generally as 50. Various customer systems, such as an ISDN terminal 52, a first telephone 54, and a second telephone 56 are connected to the SSP and Switching System 44. The ISDN terminal 52 is connected to the SSP and Switching System 44 by signaling line 60 and transport line 62. The first telephone 54 is connected to the SSP and Switching System 44 by transport line 64. The second telephone 56 is connected to a remote switching system 66 by transport line 68 and the remote switching system 66 is connected to the SSP and Switching System 44 by transport line 70.

As previously described in reference to FIG. 1, the SSP 70 is a functional module that resides at a switch in order to recognize when a subscriber's signaling requires more than simple routing based upon the number dialed. The SSP 70 suspends further handling of the call while it initiates a query for correct handling of the call. This query is sent in the form of SS7 messaging to a remote SCP 42. The Service Control Point 42 is so named because changing the database content at this location can alter the 15 network function as it appears to subscribers connected through the many subtending switches. The query is sent through signaling, line 72 to the Signal Transfer Point ("STP") 74, which is simply a router for SS7 messaging among these elements, and then through signaling line 76 to the SCP 42.

The Integrated Service Management System ("ISMS") 78 is envisioned as a management tool to deploy or alter services or to manage per-subscriber access to services. The ISMS 78 operates mainly by altering the operating logic and data stored within the SSP 70 and SCP 42. The ISMS 78 has various user interfaces 80 and 82. This ISMS 78 is connected to the SCP 42 by operations line 84, the SSP and Switching System 44 by operations line 86, and the Intelligent Peripheral ("IP"). 88 by operations line 90. The 30 Intelligent Peripheral 88 is a device used to add functions the network that are not available on the switches, such as a voice response or speech recognition system. The IP 88 is connected to the SSP and Switching System 44 by signaling line 92 and transport line 94.

Now referring to FIG. 2, the processing of a call in accordance with the prior art will be described. The call is initiated when the customer picks up the receiver and begins dialing. The SSP 70 at the company switch monitors the dialing and recognizes the trigger sequence. The SSP 70 suspends further handling of the call until service logic can be consulted. The SSP 70 then composes a standard SS7 message, and sends it through STP(s) 74 to the SCP 42. The SCP 42 receives and decodes the message and invokes the SLP. The SLI interprets the SCP, which may call for actuating other functions such as database lookup for number translation. The SCP 42 returns an SS7 message to the SSP and Switching System 44 regarding the handling of the call or otherwise-dispatches messages to the network elements to carry-out the correct service. At the conclusion of the call, an SS7 message is sent among the switches to tear down the call and call detail records are created by each switch involved in the call. The call detail records are collected, correlated, and resolved offline for each call to derive billing for toll calls thus, completing call processing.

The IN and AIN architectures attempt to predefine a standard set of functions to support all foreseeable services. These standard functions are all hard-coded into various state machines in the switch. Unfortunately, any new functions, which are likely to arise in conjunction with new technologies or unforeseen service needs, cannot be implemented without an extensive overhaul and testing of the network software across many vendor platforms. Furthermore, if a new function requires changes to standardized call models, protocols, or interfaces, the implementation of the service utilizing that function may be delayed until the changes are ratified by an industry standards group. But even as draft standards have attempted to broaden the set of IN and AIN supported functions, equipment suppliers have refused to endorse these draft standards due to the staggering increase in code complexity. A detailed flow chart describing the process for generic service creation according to the prior art may be found in above-mentioned, commonly-owned, co-pending U.S. patent application Ser. No. 09/128,937 filed Aug. 5, 1998, now U.S. Pat. No. 6,418,461, entitled "Intelligent Call Platform for an Intelligent Network Distributed Architecture", the contents and disclosure of which is incorporated by reference as if fully set forth herein.

In further view of FIG. 2, other limitations of the IN and AIN architecture arise from having the call processing and facility processing functions, namely, the SSP 70, operating within the switch. As a result, these functions must be provided by each switch manufacturer using their proprietary software. Network owners are, therefore, still heavily dependent upon manufacturer software releases to support new functions. To further complicate the matter, the network owner cannot test SSP 70 modules in conjunction with other modules in a unified development and test environment. Moreover, there is no assurance that an SSP 70 intended for a switch manufacturer's processing environment will be compatible with the network owner's service creation environment.

This dependency of multiple network owners upon a common set of switch manufacturers results in two undesirable situations that limit competition. First, a manufacturer's software release may attempt to incorporate changes requested by several network owners, thus preventing the network owners from truly differentiating their services from the services provided by their competition. This also forces some network owners to wait until he manufacturer incorporates requests from other network owners into the new release. Second, a switch software release incorporating a function as requested by one network owner to implement a new service can unintentionally become accessible to other network owners. Therefore, despite the intentions of the IN and AIN architects, the network owner's creation, testing and deployment of new services is still-impeded because the network owner does not have complete control of, or access to, the functional elements that shape network service behavior.

In another attempt to solve these problems, as disclosed in pending U.S. patent application Ser. No. 08/580,712, filed Aug. 30, 1999, now U.S. Pat. 6,041,109, entitled "Telecommunications System Having Separate Switch Intelligence and Switch Fabric", a Separate Switch Intelligence and Switch Fabric ("SSI/SF") architecture, which is referred to generally as 150 (FIG. 1), logically separates the SSP 70 from the Switching System 44. Now referring back to FIG. 1, the switch intelligence 152 contains the call processing functions 24 and facility processing functions 26 that are encoded in discrete state tables with corresponding hard-coded state machine engines, which is symbolized by circles 154 and 156. The interface between the switch fabric functions 158 and switch intelligence functions 152 may be extended through a communications network such that the switch fabric 158 and switch intelligence 152 may not necessarily be physically located together, by executed within the same processor, or even have a one-to-one correspondence. In turn, the switch intelligence 152 provides a consistent interface of simple non-service-specific, non-manufacturer-specific functions common to all switches.

An Intelligent Computing Complex ("ICC") 160, contains the service processing functions 22 and communicates with multiple switch intelligence elements 152. This approach offers the network owner advantages in flexible service implementation because all but the most elementary functions are moved outside the realm of the manufacturer-specific code. Further improvements may be realized by providing a more unified environment for the creation, development, test and execution of service logic.

As previously discussed, current network switches are based upon monolithic proprietary hardware and software. Although network switches can cost millions of dollars, such equipment is relatively slow in terms of processing speed when viewed in light of currently available computing technology. For example, these switches are based on Reduced-Instruction Set Computing ("RISC") processors running in the range of 60 MHz and communicate with each other using a data communications protocol, such as X.25, that typically supports a transmission rate of 9.6 Kb/s between various platforms in a switching network. This is extremely slow when compared to personal computers that contain processors running at 200 MHz or above and high end computer workstations that offer 150 Mb/s FDDI and ATM interfaces. Accordingly, network owners need to be able to use high-end workstations instead of proprietary hardware.

SUMMARY OF THE INVENTION

The present invention is directed to a methodology for performing services in response to service requests, e.g., 1-800 telephone calls, received at a switch associated with a node of an intelligent communications network ("IN"). Particularly, the intelligent network includes a plurality of service nodes, each node providing an execution environment that may provide all of the call processing functionality necessary to handle a call at the instance it is received at the switch or resource complex physically associated with that particular service node.

According to a preferred aspect of the invention, there is provided a method for performing a call routing service in the intellegent network having one or more service nodes and a switch platform including an originating switch for reveiving communications service requests from a calling party. The method includes the steps of: communicating call origination information from the originating switch to a first object instance executing in an execution environment provided at a service node; determining a line object instance for maintaining the state of a communications line associated with a call origination, and a service object implementing methods for performing a service for a customer; instantiating the service logic and line logic objects in the execution environment; querying a first database storage provided in the network for retrieving call routing information in support of the service, the call routing information being specific to a customer; querying a second database storage for determining a terminating location including a terminating switch for the call based on the retrieved routing information, and initiating instantiation of a line object instance for maintaining the state of a communications line associated with a call termination; and, communicating call routing commands from the executing service object to the line object of the originating line, the line object instructing the originating switch to route the received call from the originating switch to a terminating switch for connection to a called party, whereby the platform-independent communication system is provided to, enable routing of the call information between a calling party and a destination party via the originating and terminating line object instances independent of their location in said network.

The various features of novelty which characterize the invention are pointed out with particularity in the claims annexed to and forming a part of the disclosure. For a better understanding of the invention, its operating advantages, and specific objects attained by its use, reference should be had to the drawings and descriptive matter in which there are illustrated and described preferred embodiments of the invention.

BRIEF DESCRIPTION OF THE DRAWINGS

The above and further advantages of the present invention may be better understood by referring to the following description in conjunction with the accompanying drawings, in which:

FIGS. 15(a)–15(c) depict an example process for performing an enhanced voice takeback and transfer call service.

DETAILED DESCRIPTION

The present invention is one component of a comprehensive intelligent network alternately referred to herein as the Intelligent Distributed Network Architecture ("IDNA") or the Next Generation Intelligent Network ("NGIN"). As described herein, the NGIN architecture is designed to perform intelligent call processing services for any type of call received at a resource complex or switching platform, e.g., switch, router, IP termination address, etc. The IDNA/NGIN preferably comprises a plurality of distributed service nodes with each node providing an execution environment providing call processing functionality necessary to handle a call at the instance it is received at the switch or resource complex physically associated with that particular service node. NGIN is of a highly scalable architecture and engineered to ensure that executable service objects, embodied as independent Service Logic Programs ("SLP"), and associated data for performing event services, e.g., 1-800 telephone call, send fax, etc., may be deployed to and maintained at the service nodes in a cost-effective manner. By employing CORBA-compliant Object Request Broker technology, the intelligent network supports location and platform-independent call processing service execution independent of and transparent to the event switching platform or resource complex in which an event or call is received, said, enables high-level logic programs to be run virtually anywhere in the network independent of the service execution platform. Furthermore, the system provides location-independent communications among these distributed processes.

Figure 1:
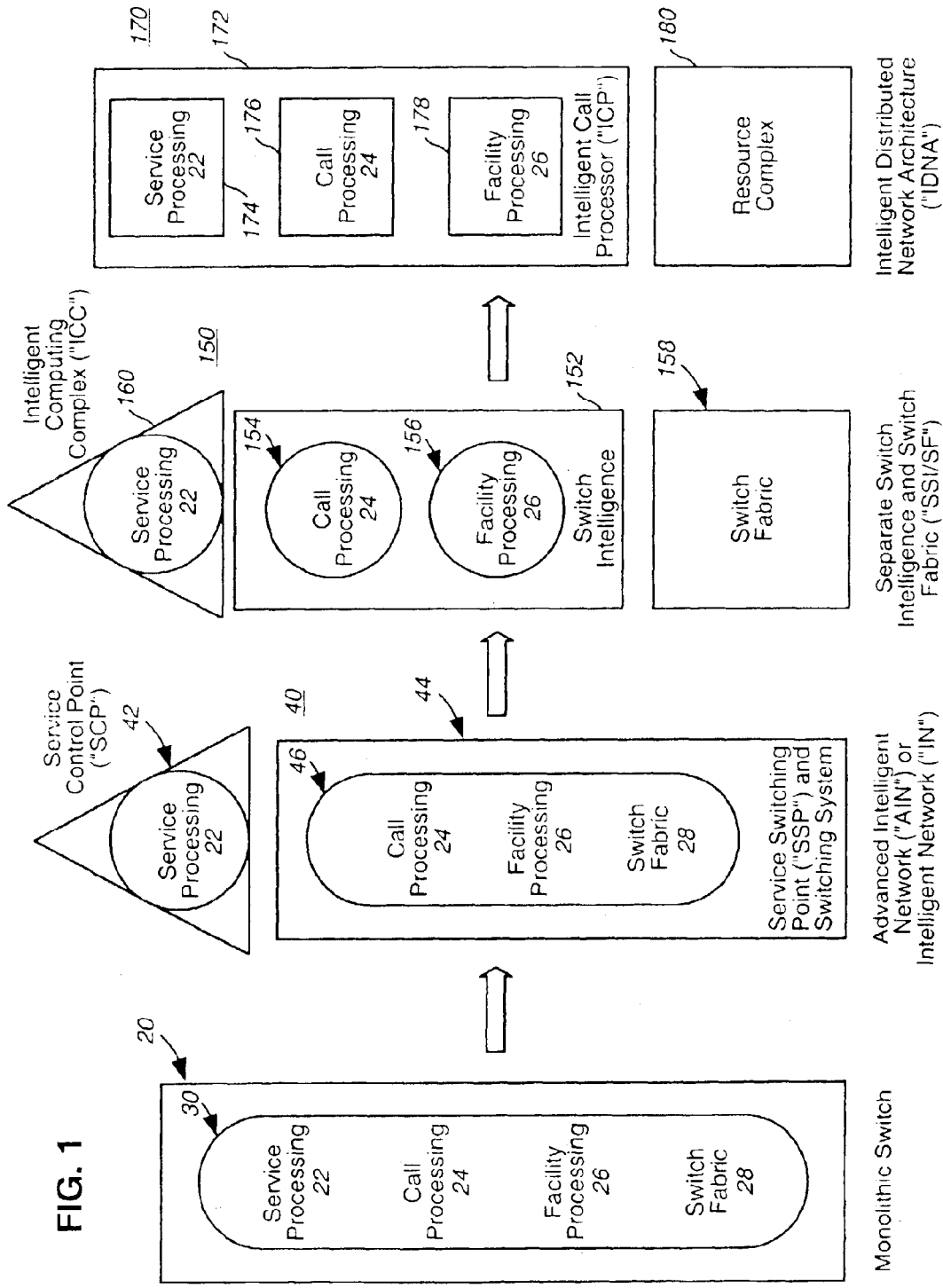
FIG. 1 is logical representation of various switching architectures.
Figure 2:
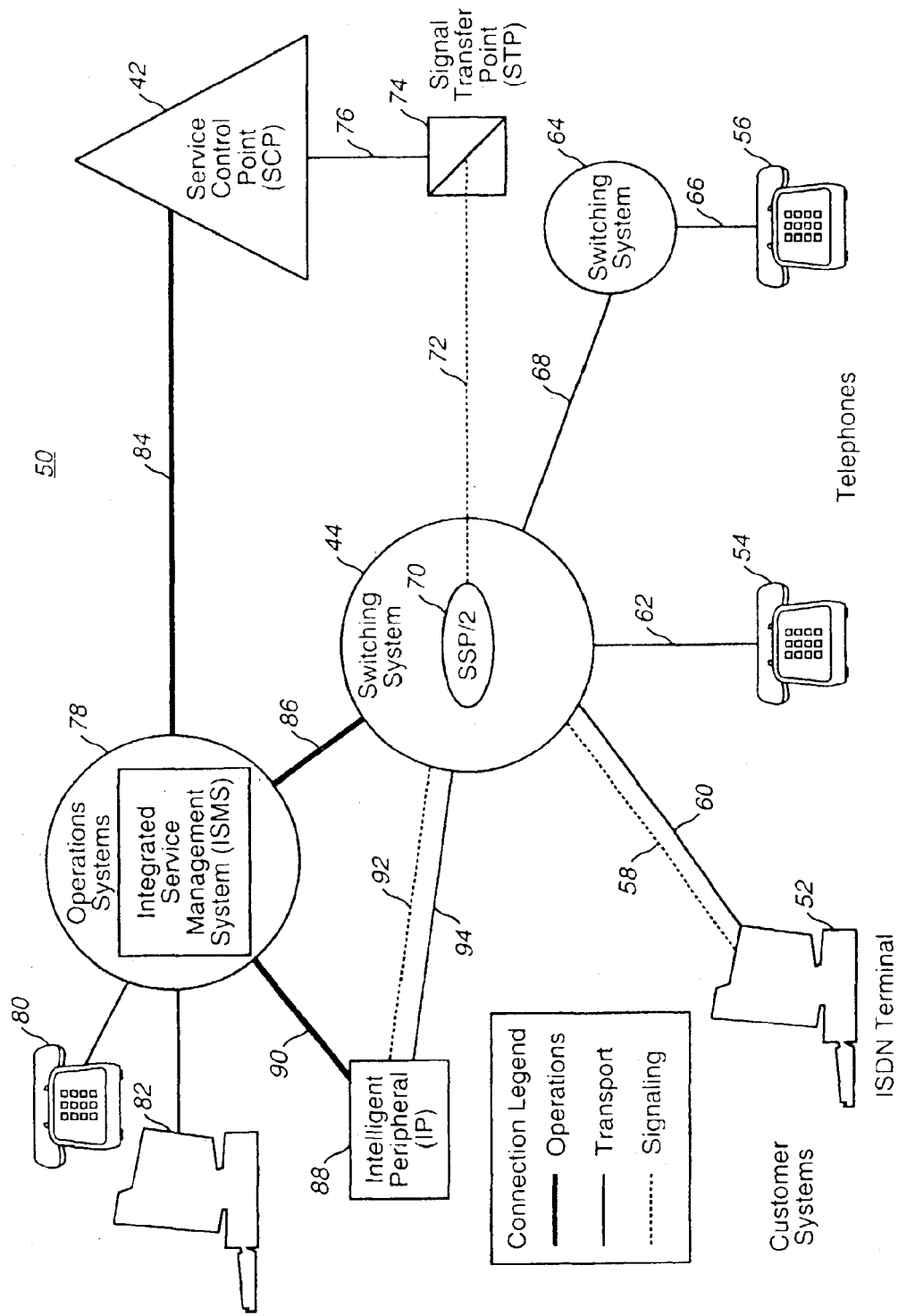
FIG. 2 is a diagram of a telecommunications system employing a typical intelligent network configuration according to the prior art.

Now referring to FIG. 1, the Intelligent Distributed Network Architecture ("IDNA") is denoted generally as 170. The present invention unifies the ICC 160 and Switch Intelligence 152 of the SSI/SF architecture 150 into an Intelligent Call Processor ("ICP") 172. Unlike the IN or AIN of SSI/SF architectures 40, whose functions are defined in state tables, the ICP 172-contains the service control functions 22, call processing functions 24 and facility processing functions 26 as managed objects in an object-oriented platform, which is symbolized by blocks 174, 176 and 178. The ICP 172 is logically separated from the Resource Complex 180.

Now referring to FIG. 3, a telecommunications system employing an intelligent distributed network architecture in accordance with the present invention will be described and is denoted generally as 200. The Wide Area Network ("WAN") 202 is a system that supports the distribution of applications and data across a wide geographic area. The transport network is based upon Synchronous Optical NETwork ("SONET") and connects the IDNA Nodes 204 and enables the applications within those nodes to communicate with each other.

Each IDNA Node 204 contains an Intelligent Call Processor ("ICP") 172 and a Resource Complex 180 (FIG. 1). FIG. 3 illustrates an IDNA Node 204 having a Resource Complex A ("RCA") 206 and a Resource Complex B ("RCB") 208. The ICP can be linked to Adjunct Processors 210, which provide existing support functions, such as provisioning, billing and restoration, however, these functions may be absorbed by functionality provided by a Network Management System ("NMS") 212. In the preferred embodiment, however, these support functions may be provided by a centralized Service Administration ("SA") system 500 having Data Management ("DM") component 400 as will be described herein with respect to FIG. 4. As further shown in FIG. 3, the ICP 172 can be also linked to other ICP's 172, other networks (not shown), or other devices (not shown) through a direct link 214 having signaling 216 and bearer links 218. A direct link prevents latency between the connected devices and allows the devices to communicate in their on language. The ICP 172 is the "brain" of the IDNA Node 204 and is preferably a general purpose computer, which may range from a single processor with a single memory storage device to a large scale computer network depending on the processing requirements of the IDNA Node 204. Preferably, the general purpose computer will have redundant processing, memory storage and connections.

As used herein, general purpose computers refer to computers that are, or may be assembled with, commercial off-the-shelf components, as opposed to dedicated devices specifically configured and designed for telephone switching applications. The integration of general purpose computers within the calling network affords numerous advantages.

The use of general purpose computers gives the ICP 172 the capability of scaling up with additional hardware to meet increased processing needs. These additions include the ability to increase processing power, data storage, and communications bandwidth. These additions do not require the modification of manufacturer-specific software and/or hardware on each switch in the calling network. Consequently, new services and protocols may be implemented and installed on a global scale, without modification of individual devices in the switching network. By changing from monolithic switches 20 (FIG. 1) to intelligent call processors 172, the present invention provides the foregoing advantages and increased capabilities.

In the case of applications that require more processing power, multi-processing allows the use of less expensive processors to optimize the price/performance ratio for call-processing. In other applications, it may be advantageous, necessary or more cost effective to use more powerful machines, such as minicomputers, with, higher processing rates.

The ICP 172 may, as noted above, comprise a cluster of general purpose computers operating, for example, on a UNIX or Windows NT operating system. For example, in a large application, supporting up to 100,000 ports on a single Resource Complex, the ICP 172 may consist of sixteen (16) 32 bit processors operating at 333 MHz in a Symmetric Multi-Processor cluster. The processors could, for example, be divided into four separate servers with four processors each. The individual processors would be connected with a System Area Network ("SAN") or other clustering technology. The processor cluster could share access to Redundant Array of Independent Disks ("RAID") modular data storage devices. Shared storage may be adjusted by adding or removing the modular disk storage devices. The servers in the clusters would preferably share redundant links to the RC 180 (FIG. 1).

As illustrated and like the "plug and play" feature of personal computers, the ICP software architecture is an open processing model that allows the interchangeability of: (1) management software; (2) ICP applications; (3) computing hardware and software; (4) resource complex components; and even (5) service architecture and processing. Such a generic architecture reduces maintenance costs due to standardization and provides the benefits derived from economies of scale.

Thus, the present invention enables the partitioning of development work and the use of modular tools that result in faster development and implementation of services. Moreover, the use of and the relevant aspects of service management are within the control of the network operator on an as required basis as opposed to the constraints imposed by fixed messaging protocol or a particular combination of hardware and software supplied by a given manufacturer.

Through the use of managed objected, the present invention also allows services and functions to be flexibly ("where you want it") and dynamically ("on the fly") distributed across the network based on any number of factors, such as capacity and usage. Performance is improved because service processing 22 (FIG. 1), call processing 24 (FIG. 1) and facility processing 26 (FIG. 1) operate in a homogeneous platform. In addition, the present invention allows the monitoring and manipulation of call sub-elements that could not be accessed before. The present invention also provides for monitoring the usage of functions or services so that when they are outdated or unused they can be eliminated.

The Resource Complex ("RC") 180 (FIG. 1) is a collection of physical devices, or resources, that provide bearer, signaling and connection services. The RC 180, which can include Intelligent Peripherals 88, replaces the switch fabric 28 and 158 (FIG. 1) of the IN or AIN or SSI/SF architecture. Unlike the IN or AIN architecture, the control of the Resource Complex, such as RCA 206 is at a lower level. Moreover, the RCA 206 can contain more than one switch fabric 158. The switch fabrics 158 or other customer interfaces (not shown) connect to multiple subscribers and switching networks via standard telephony connections. These customer systems may include ISDN terminals 52, fax machines 220, telephones 54, and PBX systems 222. The ICP 172 controls and communicates with the RC 180 (FIG. 1), RCA 206 and RCB 208 through a high speed data communications pipe (minimally 100 Mb/sec Ethernet connection) 224. The RC 180, 206 and 208 can be analogized to a printer and ICP 172 can be analogized to a personal computer wherein the personal computer uses a driver to control the printer. The "driver" in the IDNA Node 204 is a Resource Complex Proxy ("RCP") (not shown), which will be described below in reference to FIG. 5. This allows manufacturers to provide an IDNA compliant node using this interface without having to rewrite all of their software to incorporate IDNA models.

In addition, the control of the Resource Complex 180 (FIG. 1), RCA 206 and RCB 208, is at a lower level than typically provided by the AIN or IN architecture. As a result, resource complex manufacturers only have to provide a single interface to support facility and network management processing; they do not have to provide the network owner with specific call and service processing. A low level interface is abstracted into more discrete operations. Having a single interface allows the network owner to choose from a wide spectrum of Resource Complex manufacturers, basing decisions on price and performance. Intelligence is added to the ICP 172 rather than the RC 180, which isolates the RC 180 from changes and-reduces its complexity. Since the role of the RC 180 is simplified, changes are more easily made, thus making it easier to migrate to alternative switching and transmission technologies, such as Asynchronous Transfer Mode ("ATM")

Intelligent Peripherals ("IP") 88 provide the ability to process and act on information contained within the actual call transmission path. IP's 88 are generally in a separate Resource Complex, such as RCB 208, and are controlled by the ICP's 172 in a similar manner as RCA 206. IP's can provide the ability to process data in the actual call transmission path in real-time using Digital Signal Processing ("DSP") technology.

The Network Management System ("NMS") 212 is used to monitor and control hardware and services in the IDNA Network 200. A suggested NMS 212 implementation might be a Telecommunications Management Network ("TMN") compliant framework which provides management of the components within the IDNA Network 200. More specifically, the NMS 212 controls the deployment of services, maintains the health of those services, provides information about those services, and provides a network-level management function for the IDNA Network 200. The NMS 212 accesses and controls the services and hardware through agent functionality within the IDNA nodes 204. The ICP-NMS Agent (not shown) within the IDNA Node 204 carries out the commands or requests issued by the NMS 212. The NMS 212 can directly monitor and control RCA 206 and RCB 208 through a standard operations link 226.

Figure 3:
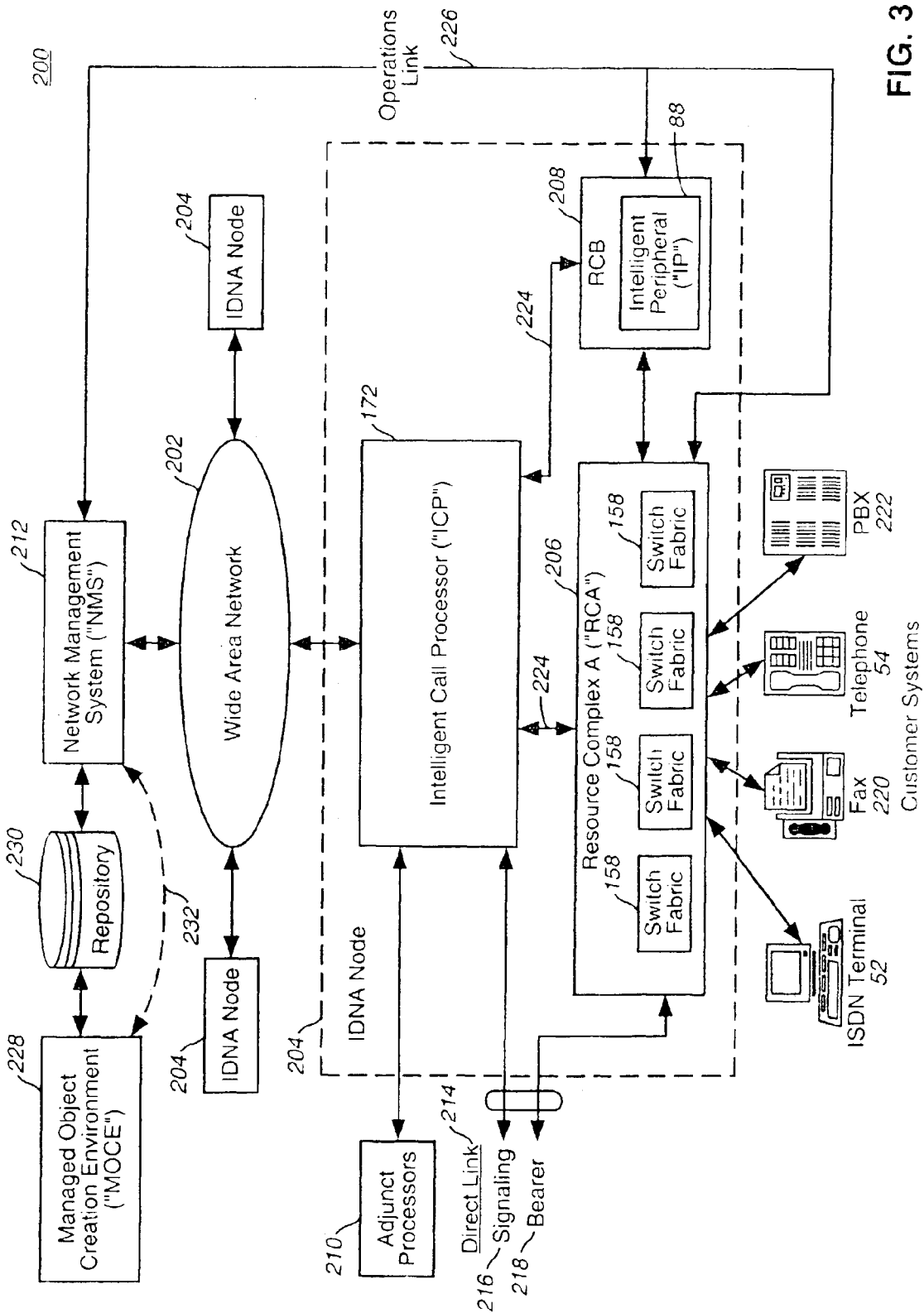
FIG. 3 is a diagram of a telecommunications system employing an intelligent distributed network architecture.

As further shown in FIG. 3, the Managed Object Creation Environment ("MOCE") 228 includes the sub-components to create services that run in the IDNA network 200. A Service Independent Building Block and API representations that a service designer uses to create new services are imbedded within the MOCE'S primary sub-component, a Graphical User Interface ("GUI"). The MOCE 228 is a unified collection of tools hosted on a single user environment or platform, alternately referred to as a Service Creation ("SC") environment. It represents the collection of operations that are required throughout the process of service creation, such as service documentation, managed object definition, interface definition, protocol definition and data input definition, which are encapsulated in managed objects, and service testing. The network owner only has to develop a service once using the MOCE 228, because managed objects can be applied to all the nodes on his network. This is in contrast to the network owner having each of the various switch manufacturers develop their version of the service, which means that the service must be developed multiple times.

The MOCE 228 and NMS 212 are connected together via a Repository 230. The Repository 230 contains the managed objects that are distributed by the NMS 212 and used in the IDNA/NGIN Nodes 204. The Repository 230 also provides a buffer between the MOCE 228 and the NMS 212, The MOCE 228 may, however, be directly connected to the NMS 212 to perform "live" network testing, which is indicated by the dashed line 232.

Figure 4:
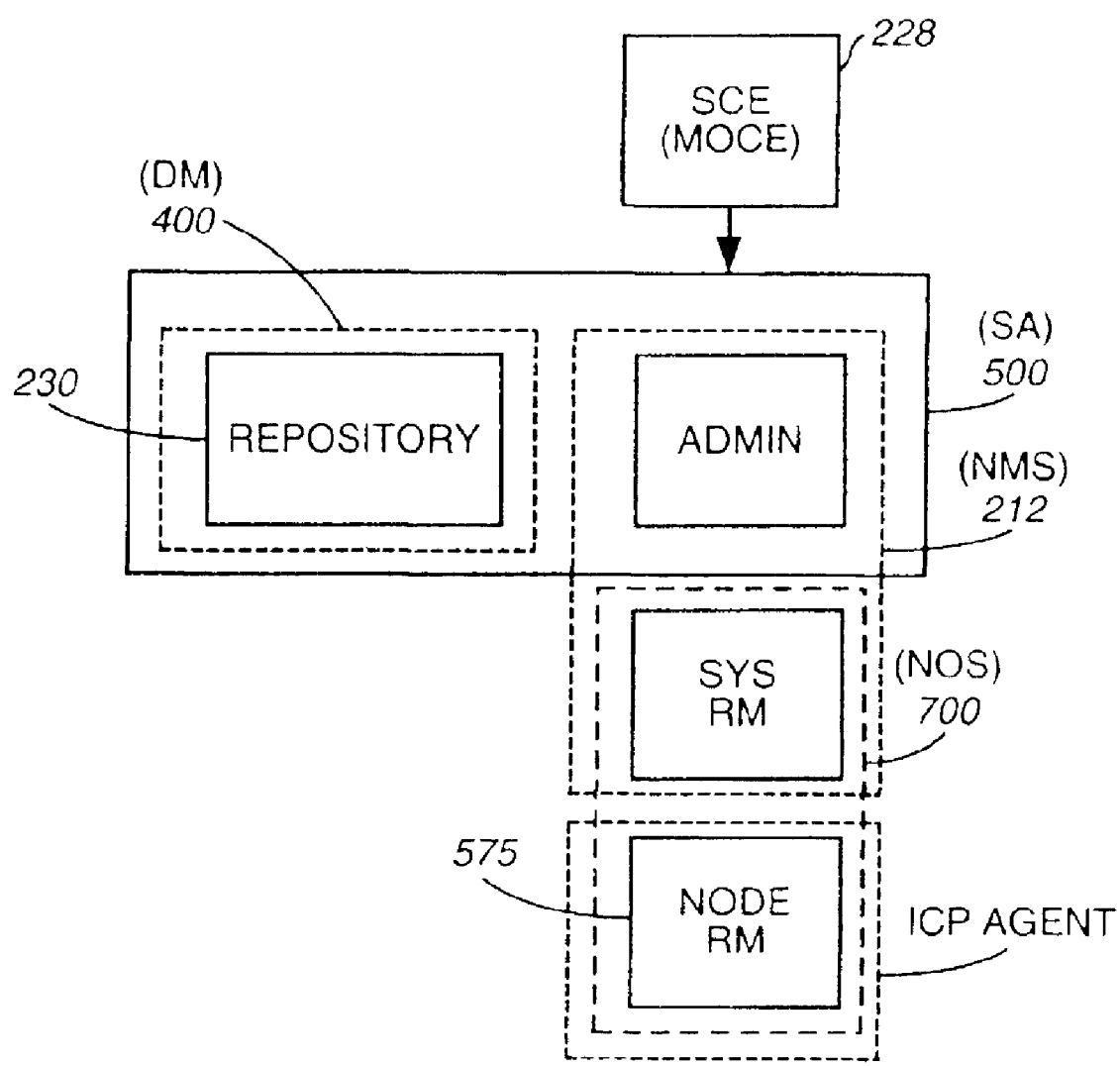
FIG. 4 is a block diagram depicting the SA and DM components of the Next Generation Intelligent Network.

In accordance with the preferred embodiment of the invention, as shown in FIG. 4, the IDNA/NGIN system includes a centralized Service Administration ("SA") component 500 that provides both a storage (Repository) 230 functionality and the generic network management (NMS) 212 functionality of the IDNA system 170 together with added capabilities as described in commonly-owned, co-pending U.S. patent application Ser. No. 09/412,590, filed Oct. 20, 1999, entitled "Method And Apparatus For Deploying Service Modules Among Service Nodes Distributed In An Intelligent Network", the contents and disclosure of which is incorporated by reference as if fully set forth herein. Generally, the SA component 500 as shown in FIG. 4 supports off-line storage, naming, distribution, activation and removal of all services and data for the IDNA/NGIN system and, additionally provides a data management ("DM") function enabling the run-time storage, replication, synchronization, and availability of data used by the service objects in the IDNA service nodes.

Figure 5:
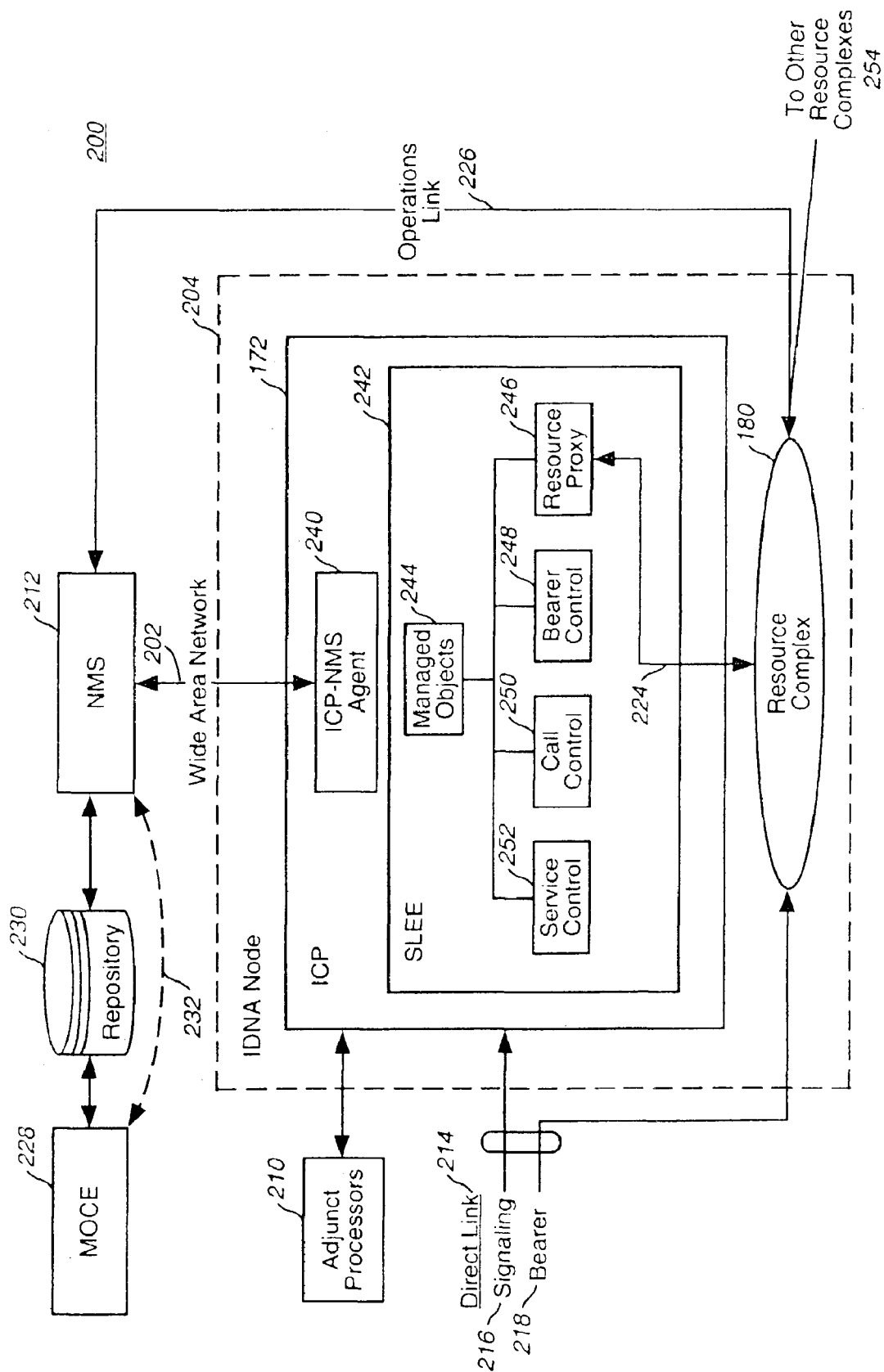
FIG. 5 is a logical and functional diagram of a telecommunications system employing an intelligent distributed network architecture in accordance with the present invention.

Referring now to FIG. 5, a logical and functional diagram of a telecommunications system employing an intelligent distributed network architecture 200 in accordance with the present invention will be described. The ICP 172 is shown to contain an ICP-NMS Agent 240 and a SLOE 242 that, in turn, hosts a variety of managed objects 246, 248, 250 and 252 derived from the managed objects base class 244.

In general, managed objects are a method of packaging software functions wherein each managed object offers both functional and management interfaces to implement the functions of the managed object. The management interface controls access to who and what can access the managed object functions. In the present invention, all of the telephony application software, except for the infrastructure software, run by the IDNA/NGIN Node 204 is deployed as managed objects and supporting libraries. This provides a uniform interface and implementation to control and manage the IDNA Node software.

The collection of network elements that connect, route, and terminate bearer traffic handled by the node will be collectively referred to as the Resource Complex ("RC") 180. The service processing applications running on the SLEE use the Resource Proxy ("RCP") 244 as a control interface to the RC 180. The RCP 244 may be likened to a device driver in that it adapts equipment-independent commands from objects in the SLEE to equipment-specific commands to be performed by the RC 180. The RCP 224 can be described as an interface implementing the basic commands common among vendors of the resources in the RCP-244. The RCP 244 could be implemented as shown as one or more managed objects running on the IDNA node 204. Alternatively, this function could be provided as part of the RC 180. The NMS 212, Repository 230 and MOCE 228 are consistent with the description of those elements in the discussion of FIGS. 3–5(*a*).

Note that the operations link 226 directly connects the NMS 212 to the RC 180. This corresponds to the more traditional role of a network management system in monitoring the operational status of the network hardware. This can be done independently of the IDNA architecture (e.g., by using the well-known TMN approach). In addition, the RC 180 may be connected to other resource complexes 254. A direct signaling link 214 is also shown entering the ICP 172 so that signaling 216, such as SS7, can enter the call processing environment directly. By intercepting signaling at the network periphery, the SS7 message can go directly to the ICP 172 without going through the RC 180. This reduces latency and improves robustness by shortening the signaling path. An accompanying bearer line 218 connects to the RC 180.

Figure 6:
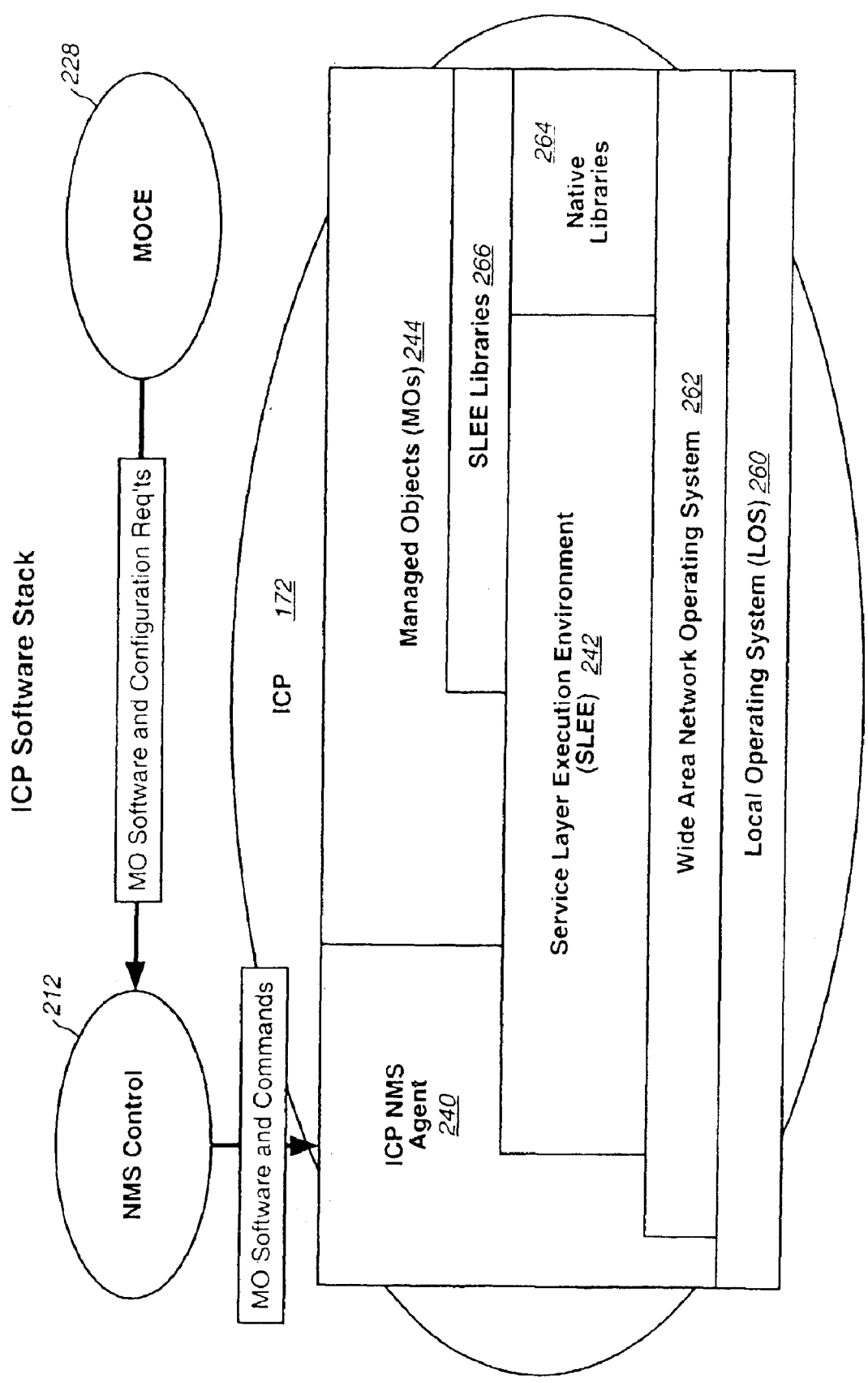
FIG. 6 is a diagram illustrating the layering of functional interfaces within an intelligent call processor in accordance with the present invention.

FIG. 6 depicts the layering of functional interfaces within the ICP 172. The MOCE 228 is the system where the managed object software and its dependencies are generated. The NMS 212 controls the execution of the ICP 172 by interfacing to an agent function provided within the ICP 172, called the ICP-NMS Agent 240. The NMS 212 controls the operation of the Local Operating System ("LOS") 260 on the ICP 172. The NMS 212 controls the operation of the ICP 172, including starting and stopping of processes, querying the contents of the process table, and the status of processes, configuring the operating system parameters, and monitoring the performance of the general purpose computer system that hosts the ICP 172.

The NMS 212 also controls the operation of the Wide Area Network Operating System ("WANOS") 262. The NMS 212 controls the initialization and operation of the WANOS support processes and the configuration of the WANOS libraries via its control of the LOS 260 and any other interfaces provided by the NMS SLEE control. The NMS 212 controls the instantiation and operation of the one or more SLEE's 242 running on an ICP 172. The LOS 260 is a commercial-off-the-shelf operating system for operation of the general purpose computer. The WANOS 262 is a commercial-off-the-shelf middle-ware software package (e.g., an object request broker) that facilitates seamless communication between computing nodes. The SLEE 242 hosts the execution of managed objects 244, which are software instances that implement the service processing architecture. The SLEE 242 implements the means to control the execution of the managed objects 244 by the ICP-NMS Agent 240. Thus, a SLEE 242 instance is a software process capable of deploying and removing managed object software, instantiating and destroying managed object instances, supporting the interaction and collaboration of managed objects, administering access to Native Libraries 264, and interfacing with the NMS-ICP Agent 240 in implementing the required controls.

The Native Libraries 264 are libraries that are coded to depend only on the LOS 260 or WANOS 262 and the native general purpose computer execution (e.g., compiled C libraries). They are used primarily to supplement the native functionality provided by the SLEE 242.

SLEE libraries 266 are libraries coded to execute in the SLEE 242. They can access the functions provided by the SLEE 242 and the Native Libraries 264. The managed objects 244 are the software loaded and executed by the SLEE 242. They can access the functionality provided by the SLEE 242 and the SLEE libraries 266 (and possibly the native libraries 264).

The ICP-NMS Agent 240 provides the NMS 212 the ability to control the operation of the ICP 172. The ICP-NMS Agent 240 implements the ability to control the operation and configuration of the LOS 260, the operation and configuration of the WANOS 262, and the instantiation and operation of SLEE(s) 242. The proposed service processing architecture operates in layers of increasing abstraction. From the perspective of the SLEE 242, however, there are only two layers: the managed object layer 244, which is the layer of objects (software instances) that are interaction under the control of the NMS 212; and the Library layer 264 or 266, which is the layer of software (either native to the SLEE 242 or the LOS 260) that supplies supplementary functions to the operation of the managed objects 242 or the SLEE 242 itself. It is, however, anticipated that at some point, the NMS 212 may relinquish control of the exact location of managed object instances. For example, managed object instances may be allowed to migrate from one node to another based on one or more algorithms or events, such as in response to demand.

It should be understood that, collectively, the LOS and WANOS functionality may be represented as a Network Operating System or "NOS", as shown in FIG. 6, that functions to provide platform independent and location independent connectivity between the IDNA/NGIN system components. That is, NOS comprises a set of network-wide services that provides process interfaces and communications among the other IDNA/NGIN functional components and sub-components. Among the services provided by NOS are object connectivity, logical name translation, inter-process communications, and local and system-wide resource management ("RM"). For instance, as shown in FIG. 3, the NOS component 700 provides the local (NODE RM) and system-wide resource management (SYS RM) function, as described in commonly-owned, co-pending U.S. patent application Ser. No. 09/420,654, filed Oct. 19, 1999, now U.S. Pat. No. 6,425,005, entitled "Method And Apparatus For Managing Local Resources In Service Nodes Of An Intelligent Network," the contents and disclosure of which is incorporated by reference as if fully set forth herein. Particularly, the NOS component encapsulates the location of any service from the processes that need services and data, so that a process only needs to make a call to a single logical name. The NOS component then determines which instance of a service to use, and provides connectivity to that instance. The NOS 700 enables, in part, both the widely distributed nature of IDNA/NGIN, and the platform-independence of IDNA/NGIN. For example, the aforementioned logic programs use the NOS component 700 to call other logic programs, and can therefore call and invoke other logic programs that run on different SLEEs either in the same service node or a remote service node. Particularly, through the SA 500, a service node may be specified to perform only certain services. When a call that arrives at a switch having an associated service node 204 for which the needed service may not be performed, e.g., joining a conference bridge, IDNA may need to route the call to another node configured to provide such service. Preferably, IDNA, via the NOS component 700, will call the needed service at another remote service node, perform the call processing, and provide a service response to the switch at the original node.

Figure 7:
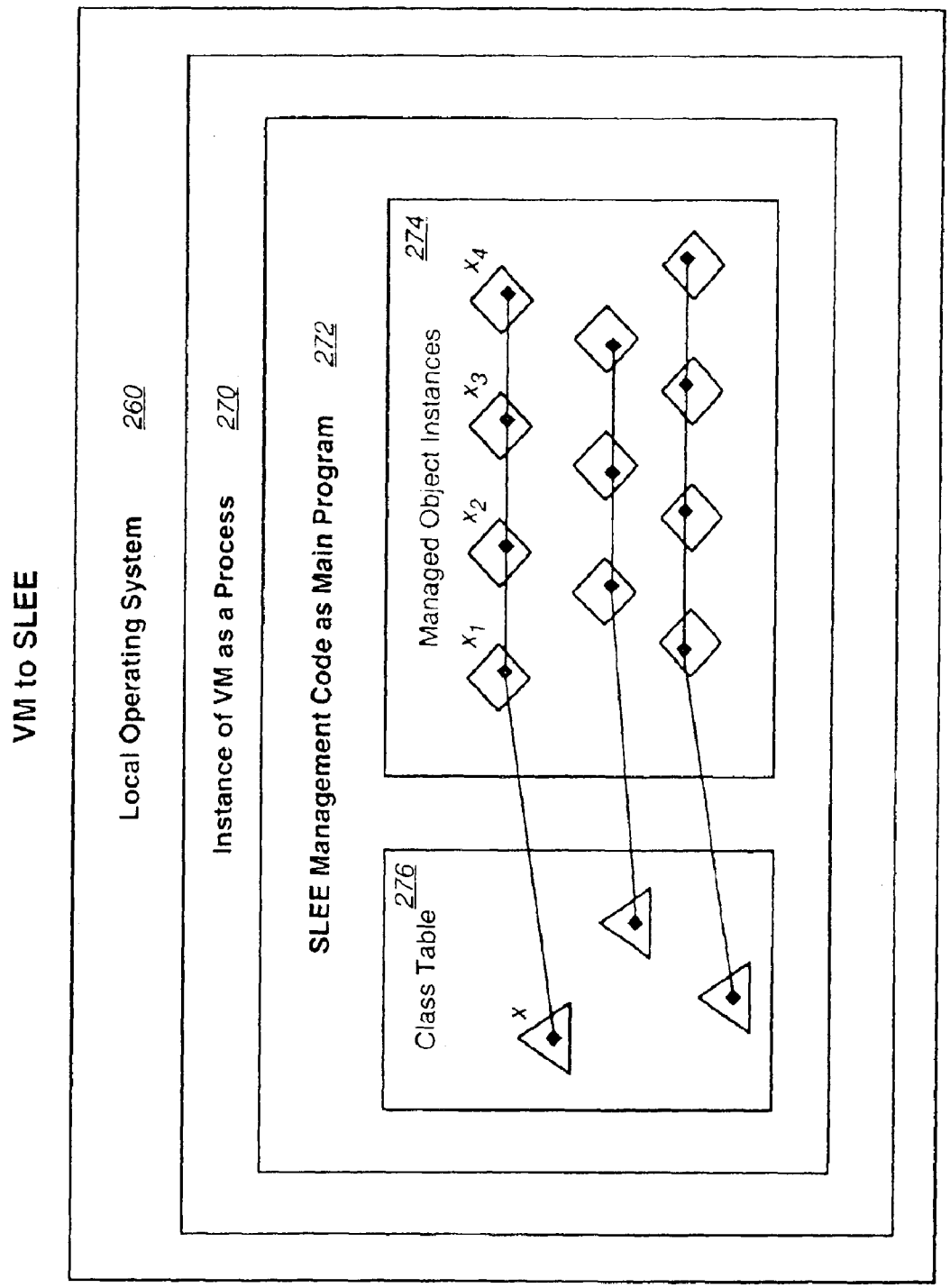
FIG. 7 is a Venn diagram illustrating the nesting of processing contexts whereby a virtual machine supports a service logic execution environment in accordance with the present invention.

FIG. 7 shows the nesting processing contexts within an ICP 172 such that the SLEE 242 is implemented within a virtual machine 270. A virtual machine 270 is started as a process within a LOS 260 in an ICP 172. Then, the SLEE management code is loaded and executed as the main program 272 by the VM process 270. The SLEE management code executing as the main program 272 interfaces to the ICP-NMS Agent 240 functionality and oversees the creation and destruction of managed object instances 274 from the class table 276. For example, managed object X, which resides in the class table 276 may have multiple instances will be explained, each managed object X is thereafter instantiated as needed, $X_1$, $X_2$, $X_3$, either under NMS/SA control or during the course of processing services requested by subscribers. The use of a Virtual Machine 270 carries implications for service creation as well as service logic execution.

The IN and AIN architectures revolve around services being encoded as state tables. Such state table descriptions are interpreted by a hard-coded state machine engine which carries out the encoded service function. As a result, the MOCE 228 and Service Logic Interpreter ("SLI") are very interdependent and provide only a fixed palette of functions. If a desired new service requires adding a new building block function, both the MOCE 228 and SLI must be changed, recompiled, throughly tested, and deployed in a coordinated fashion. In an IN or AIN architecture, deployment of new SLI code requires a brief downtime within the network. In contrast, the present invention provides a multiple concurrent architecture that allows new and-old SLI's to coexist.

The present invention-uses a virtual machine 270 to overcome these disadvantages. A virtual machine 270 is the functional equivalent of a computer, programmable at such an elementary level of function (i.e., logic operators, variables, conditional jumps, etc.) that a hosted program can essentially express any conceivable logic function, even those that are not readily expressed as finite-state model. The universality of a virtual machine 270 is especially useful in this application for allowing expression of call processing logic in forms that may be preferred over a state table. This differs from a logic interpreter, which typically supports higher level functions and is constrain ed in program semantics and in flexibility of expression. In the IN and AIN architectures, the SLI supports a limited structure and limited set of functions.

When virtual machine 270 software is run upon a general purpose computer, the virtual machine 270 may be viewed as an adapter layer. The code that runs as a program within the virtual machine 270 may have the same granularity of control and access to input/output and storage as if it were running directly upon the processor, yet the very same program may be portable to a totally different processor hardware running an equivalent virtual machine environment (i.e., operational in heterogeneous environments).

In a preferred embodiment, the "Java" platform developed by Sun Microsystems is prescribed for expressing all telephony application software. The prevalence of Java lends practical advantages in platform portability, ubiquity of development tools and skill sets, and existing support protocols such as ftp and http. Java accommodates object-oriented programming in a similar fashion to C++. The SLEE Management Code 272 and all managed objects 276 indicated in the SLEE 242 are encoded as Java bytecodes. The SLEE Management Code 272 includes functions to install, remove, and instantiate classes, to query and delete instances, and to assert global values and run/stop status.

Despite the foregoing advantages, the use of a virtual machine as a SLEE 242, in particular, a Java virtual machine, appears to have been overlooked by IN and AIN architects. Perhaps biased by the more common telephony applications like interactive voice response, IN and AIN designers have thought that a fixed palette of functions is adequate and preferable for its apparent simplicity and similarity to traditional call processing models. Whereas the AIN approach improves the speed of service creation only within a fixed call model and function set, the present invention can as easily evolve the entire implicit service framework to meet new service demands and new call processing paradigms.

The choice of an object-oriented SLEE 242 provides many key advantages including dependency management and shared security among co-instantiated objects. The touted advantages of object-oriented programming, such as modularity, polymorphism, and reuse, are realized in the SLEE 242 according to the present invention. Because of managed object inheritance hierarchy, widespread changes in call model, protocol, or some other aspects of call processing may be effected by relatively localized code changes, for example, to a single base class. Another important advantage is that the coded classes from which objects are instantiated within each SLEE 242 can be updated without having to disable or reboot the SLEE 242.

Figure 8:
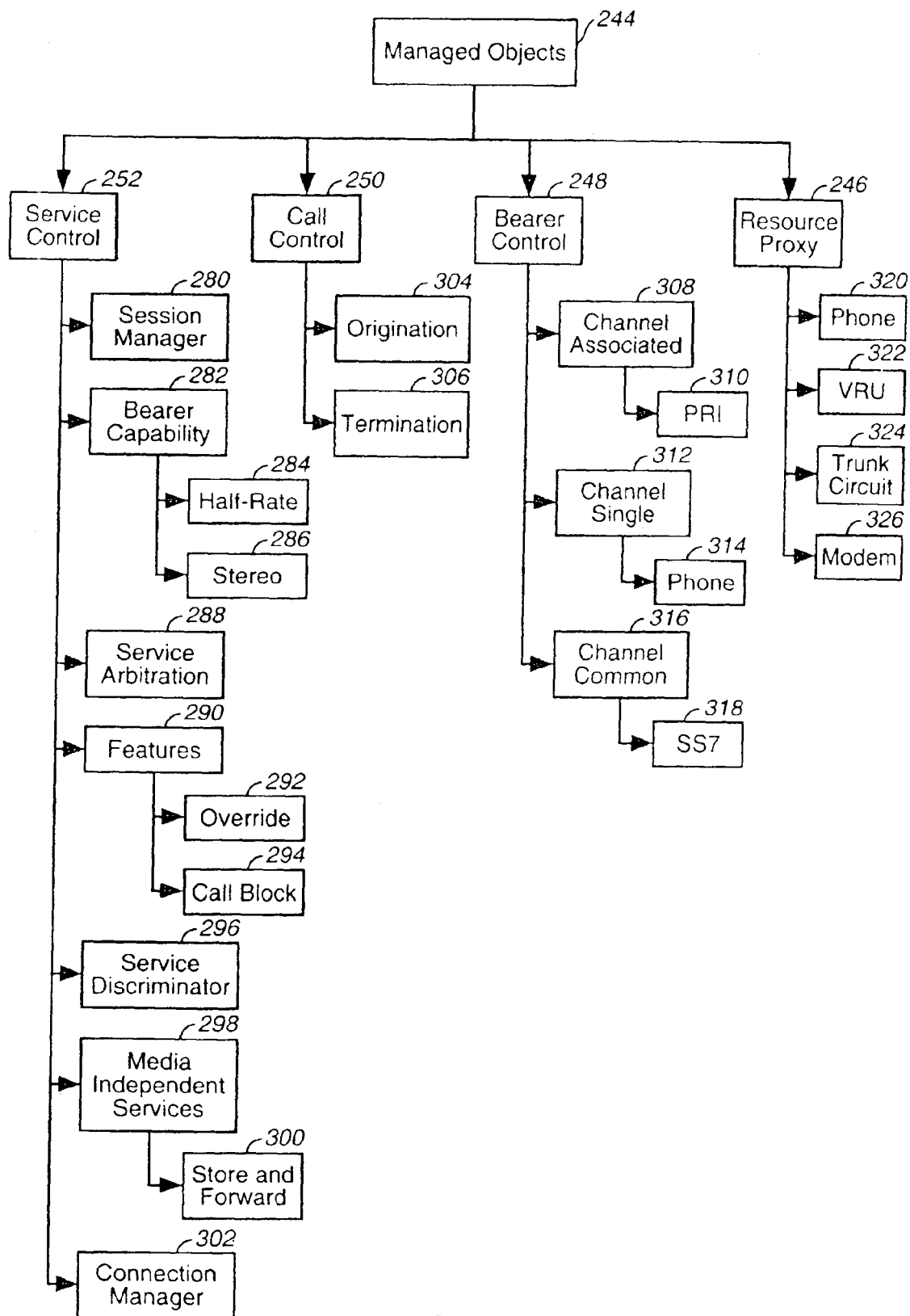
FIG. 8 is a diagram illustrating the class hierarchy of managed objects within an intelligent call processor in accordance with the present invention.

Referring now to FIG. 8, the class hierarchy of managed objects in accordance with a preferred embodiment of the present invention will be described. The abstract base class managed objects 244 includes common functionality and virtual functions to assure that all derived classes can properly be supported as objects in the SLEE 242. Specifically, four distinct subclasses are shown, the service control class 252, call control class 250, bearer control class 248, and resource proxy class 246.

The service control class 252 is the base class for all service function objects. The session manager class 280 encapsulates the session-related information and activities. A session may comprise one or more calls or other invocations of network functions. The session manager class 280 provides a unique identifier for each session. If call processing is taking place in a nodal fashion, then billing information must be collated. A unique identifier for each call makes collation easy, instead of requiring costly correlation processing. In service processing, protocols are wrapped by successive layers of abstraction. Eventually, the protocol is sufficiently abstracted to warrant the allocation/instantiation of a session manager (e.g., in SS7, the receipt of an IAM message would warrant having session management).

The bearer capability class 282 changes the quality of service on a bearer. A service control class 252 can enable changes in the Quality-of-Service ("QoS") of a call or even change the bearer capability, such as moving from 56 Kbit/s to higher rates and then back down. The QoS is managed by the connection manager class 302. For example, a Half-Rate subclass 284 degrades the QoS of a call to 4 Khz sample rate, instead of the usual 8 Khz sample rate. A Stereo subclass 286 might allow a user to form two connections in a call to support left-channel and right channel.

The service arbitration class 288 codifies the mediation of service conflicts and service interactions. This is required because service control classes 252 can conflict, particularly origination and termination services. For many practical reasons, it is undesirable to encode within each service control class 252 an awareness of how to resolve conflict with each other type of service control class 252. Instead, when a conflict is identified, references to the conflicting services and their pending requests are passed to the service arbitration class 288. The service arbitration class 288 may then decide the appropriate course of action, perhaps taking into account local context, configuration data, and subsequent queries to the conflicting service objects. Having a service arbitration class 288 allows explicit documentation and encoding of conflict resolution algorithms, as opposed to either hard-coded or implicit mechanisms. Moreover, when a service is updated or added, the existing services do not have to be updated to account for any conflict changes, which could require the change of multiple relationships within a single service.

The feature class 290 implements the standard set of capabilities associated with telephony (e.g., 3-way calling, call waiting). One such capability can be an override 292 to enable an origination to disconnect an existing call in order to reach an intended recipient. Another common capability can include a call block 294 whereby an origination offer can be rejected based upon a set of criteria about the origination.

The service discrimination class 296 is used to selectively invoke other services during call processing and is subclassed as a service itself. The service discrimination class 296 provides for flexible, context-sensitive service activation and obviates the need to have fixed code within each service object for determining when to activate the service. The activation sequence is isolated from the service itself. For example, Subscriber A and Subscriber B have access to the same set of features. Subscriber A chooses to selectively invoke one or more of his services using a particular set of signals. Subscriber B prefers to use a different set of signals to activate his services. The only difference between the subscribers is the manner in which they activate their services. So it is desirable to partition the selection process from the service itself. There are two available solutions. The service selection process for Subscribers A and B can be encoded in separate service discrimination class 296, or one service discrimination class 296 can use a profile per subscriber to indicate the appropriate information. This can be generalized to apply to more users whose service sets are disjointed. Furthermore, the use of a service discrimination class 296 can alter the mapping of access to services based upon the context or progress of a given call. The implementation of this class allows various call participants to activate different services using perhaps different activation inputs. In the prior art, all switch vendors delivered inflexible service selection schemes, which prevented this capability.

The media independent service class 298 is a type of service control class 252, such as store-and-forward 300, broadcasting, redirection, preemption, QoS, and multi-party connections, that applies to different media types including voice, fax, e-mail, and others. If a service control class 252 is developed that can be applied to each media type, then the service control class 252 can be broken into re-usable service control classes 252. If the service control class 252 is broken into media-dependent functions and a media-independent function (i.e., a media-independent SC which implements a service and a set media-dependent wrapper SC's—one per media type). As derived from the media-independent class 298, store and forward 300 provides the generic ability to store a message or data stream of some media type and then the ability to deliver it later based on some event. Redirection provides the ability to move a connection from one logical address to another based on specified conditions. This concept is the basis for call forwarding (all types), ACD/UCD, WATS (1-800 services), find-me/follow-me and mobile roaming, etc. Preemption, either negotiated or otherwise, includes services such as call waiting, priority preemption, etc. QoS modulated connections implement, future services over packet networks, such as voice/fax, streaming video and file transfer. Multi-party connections include 3-way and N-way video conferencing, etc. Although user control and input is primarily implemented using the keys on a telephone, voice recognition is expected to be used for user control and input in the future.

The connection manager class 302 is responsible for coordinating and arbitrating the connections of various bearer controls 248 involved in a call. Thus, the complexity of managing the connectivity between parties in multiple calls is encapsulated and removed from all other services. Service and Call processing are decoupled from the connections. This breaks the paradigm of mapping calls to connections as one to many. Now the mapping of calls to calls is many to many.

The connection manager classes 302 within an architecture are designed to operate stand-alone or collaborate as peers. In operation, the service control classes 252 present the connection manager classes 302 with requests to add, modify and remove call segments. It is the connection manager class' 302 responsibility to accomplish these changes. Note: Since connections can be considered either as resources in and of themselves or as the attributes of resources, a connection manager class 302 can be implemented as a proxy or an aspect of basic resource management functions.

The call control class 250 implements essential call processing, such as the basic finite-state machine commonly used for telephony, and specifies how call processing is to take place. Two classes may be derived along the functional partition of origination (placing a call) 304 and termination (accepting a call) 306.

The bearer control class 248 is directed at adapting specific signals and events to and from the Resource Complex 180, via the resource proxy 246, into common signals and events that can be understood by the call control objects 250. One anticipated role of an object derived from this class is to collect information about the origination end of a call, such as subscriber line number, class of service, type of access, etc. Subclasses may be differentiated on the basis of the number of circuits or channels associated with the signaling. These may include a channel associated class 308, as applies to the single signaling channel per 23 bearer channels in an ISDN Primary Interface 310, a channel single class 312 as typified by an analog phone 314 that uses dialing to control a single circuit, and the channel common class 316, represented by SS7 signaling 318 entirely dissociated from bearer channels.

The resource proxy class 246 is devoted to interfacing the execution environment to real-world switches and other elements in the bearer network. Examples of internal states implemented at this level and inherited by all descendent classes are in-service vs. out-of-service and free vs. in use. Contemplated derived classes are phone 320 (a standard proxy for a standard 2500 set), voice responsive units ("VRUs") 322 (a standard proxy for voice response units), IMT trunk connections 324 (a standard proxy for digital trunk (T1/E1) circuits), and modem connections 326 (a standard proxy for digital modems), corresponding to specific types of resources in the Resource Complex 180. A preferred manner in which a Service Control component may serve incoming service requests, is now described with further reference to FIG. 10 which illustrates particularly another embodiment of a service control environment 430 having SLEE applications 450, 450' executing within the operating system 435 of a service control server, e.g., general purpose computer 440.

Figure 9:
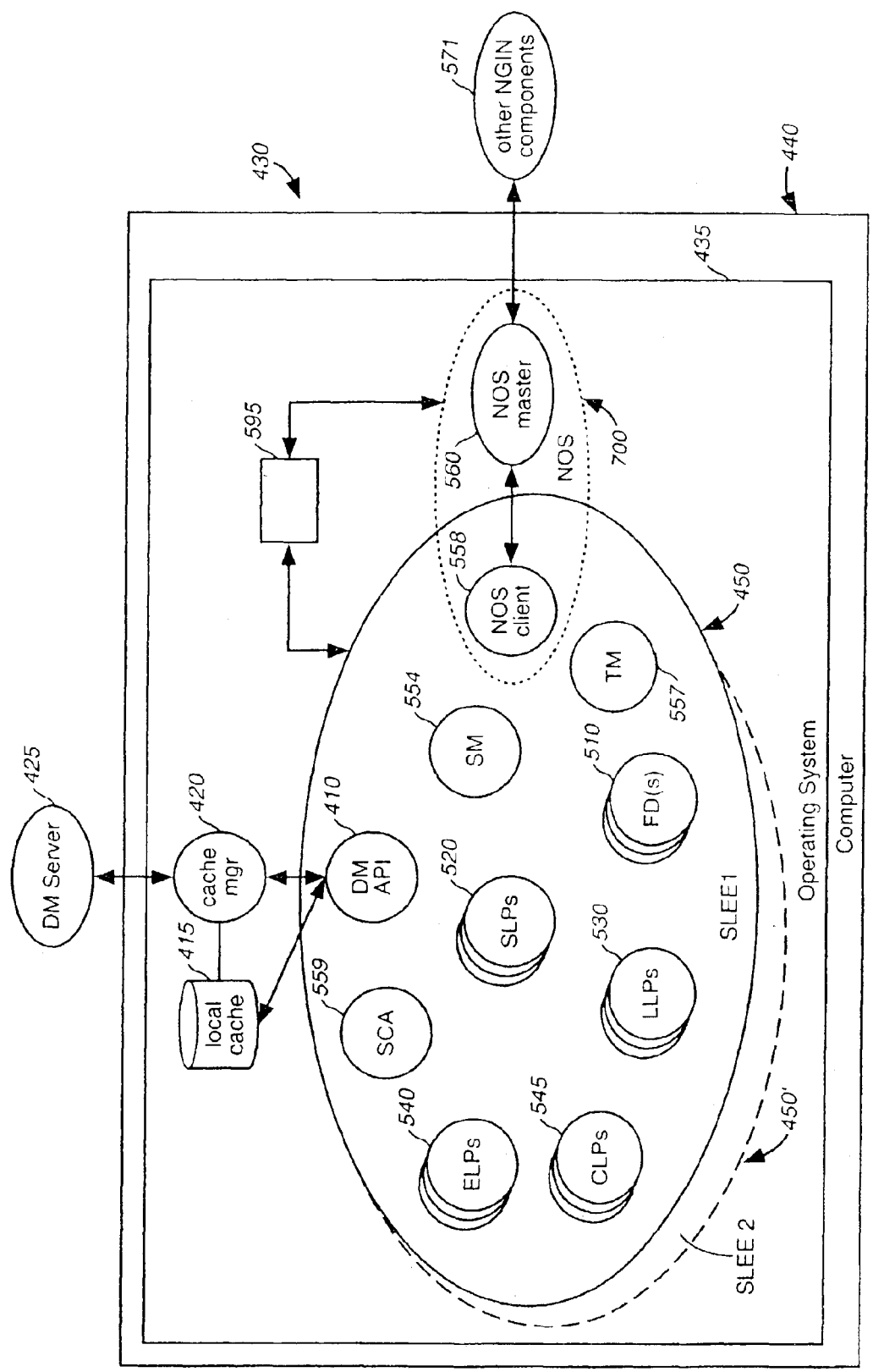
FIG. 9 illustrates a preferred architecture of a service control environment 430.

As shown in FIG. 9, the SLEE 450 is designed to execute at least five types of logic programs implemented in performing call processing services and other supporting services: 1) Feature Discriminator logic programs ("FD") 510, which are functional sub-components (objects) of the service control class/service discriminator class 296 (FIG. 8) that first receive a service request from the switching platform, determine which service to perform on a call based on some available criteria, for example, the dialed number of the call, and, then calls on another appropriate Service Logic Program to process the call; 2) the Service Logic Program ("SLP") objects 520, which are functional sub-components of the service control class 252 (FIG. 8) that perform service processing for a received service request or event; 3) Line Logic Program ("LLP") objects 530, which are functional sub-components of the call control class 250. (FIG. 8) that maintain the current state of a network access line; 4) Event Logic Program ("ELP") objects 540, which are functional hub-components of the service control/session manager class 260 (FIG. 8) to which all other logic programs write events; and 5) Call Logic Program ("CLP") objects 545 which are functional sub-components of the service control/ connection manager class 302 (FIG. 8) that maintains the state of an entire call by providing a connection point for all other logic programs that are involved in the processing of a call. Each of these logic programs are embodied as a software "objects", preferably written in Java™ programming language, that may either be temporarily instantiated or persistent, as will be described. The IDNA/NGIN service control architecture is designed such that these objects are written only once in MOCE/SCE, and may be deployed to a SLEEs on any type of computer and on any type of operating system anywhere in the network.

With greater particularity, the FD 510 is a static sub-component that 1) first receives a service request from the resource complex, e.g., switch when the switch identifies that the service is to be processed by IDNA/NGIN; 2) analyzes the information associated with the service request; and, 3) determines which SLP is capable of processing the service request. Preferably, the FD may be a system task or an instantiated object for receiving data provided from the resource complex including, but not limited to, the called number, the calling number, the originating switch ID, originating trunk group, the originating line information, and the network call ID. Through NOS, the FD 510 initiates the instantiation of the appropriate SLP, the CLP and the originating LLP to process the call. Preferably, the FD 510 is a persistent object, not being tied to a particular call or event, and runs actively in the Service Control SLEE 550 at all times. Depending upon the complexity, of the analysis performed, and the volume of the requests to FD, there may be one or more instances of a FD running actively in a Service Control SLEE 550 in order to share the load and guarantee real time efficiency. For instance, one FD may be used to analyze received SS7 message data, while another, FD may be used to analyze ATM message data.

The Line Logic Program (LLP) 530 is the functional sub-component that: 1) maintains the current state of a network access point, connection, or line; 2) queries Data Management for features associated with the physical point, connection, or line; and, 3) applies those features, such as call interrupt, call waiting, call forwarding, and overflow routing as the call situation demands. There is an LLP associated with a line that originates a call, hereinafter "LLPO", and an LLP associated with a point connection, or line to which a call terminates, hereinafter "LLPT". Once a Line Logic Program instance is instantiated, it registers itself with the switch fabric. As will be described, the Line Logic Program 530 sends all event data to the ELP sub-component of the same instance of service processing. Dynamic Sub-Components are those components that are dynamically constructed according to different stages of service processing and which are destructed when an instance of service processing is complete and including: Event Logic Programs (ELP); Call Logic Programs (CLP); and, Service Logic Programs (SLP).

The Event Logic Program (ELP) 540 is the functional sub-component used to keep the real-time event data that is generated during service processing and records all event data that occurs during execution of a service. The Event Logic Program preferably, is instantiated by the call control process at the switch when an event is first received. When the switch sends a service request to NGIN, it passes along the address of the ELP so that event data may be sent to this logic program tied to that call. The Event Logic Program is accessible to all the sub-components within the same instance of the service processing, i.e., the CLP, LLPs and SLP that pertain to the call. As each service processing component processes that call in the performance of a service, it writes event data to the ELP, through NOS, according to pre-established rules. When a call is completed, the event data in the ELP is written to a data store or log from which the event data is then compiled into billing records and sent to downstream systems for billing, traffic/usage reporting, and other back-office functions. Particularly, the ELP performs the function of: 1) gathering the network events generated by a specific call; 2) formatting the events into appropriate call history records, e.g., call detail records ("CDRs"), billing data records ("BDRs"), switch event records, etc.; and 3) verifying, validating and storing the information, e.g., in data management, for future transmission to a downstream system, e.g., customer billing. It should be understood that the rules for, determining which events get written to the ELP is established at Service Creation. Event data is additionally accessible by fraud management and network management systems.

The Call Logic Program (CLP) 545 is the functional sub-component that maintains the state of each service logic program involved in a call, and provides process interfaces among all services (LP's). In one embodiment, a CLP is instantiated by the FD when an event service request is first received for a call, or, may be instantiated by the NGS call control component 90 at the NGS switch. Alternatively, the CLP 545 may be instantiated by an SLP 510 at some point during call processing, in accordance with a trigger point programmed into the SLP; in this way, the instantiation of a CLP may be specific to a service. Call Logic Program receives the address of all the sub-components within the same instance of the service processing at the time of instantiation, i.e. the SLPs, LLPs and ELP. The CLP then associates the SLP(s), LLPO, LLPT, and ELP for that call and is accessible by all of these sub-components within the same instance of the service processing. That is, the Call Logic Program is the connection point for communication between the SLPs and the LLPs involved in the same instance of service processing. When a call is completed, the CLP notifies all of the sub-components within the same instance of service processing of the call completion which will initiate the tear down process of the logic programs.

The Service Logic Program (SLP) 520 is the dynamic sub-component providing the logic required to execute a service. An SLP is tied to a service, rather than a call, and performs services, and features contained therein, for a call. For example, an SLP can exist for a 1-800 collect (toll-free) calling service, another SLP can exist for a Virtual Private Network ("VNET") service. The features that an SLP may apply for a service, include, for example, call routing algorithms and IVR services. The SLP may be a persistent object for frequently used services, or it may be instantiated when demanded by the FD and killed upon call completion, e.g., for infrequently used services. Whether a certain SLP is active at all times, at some times, or only on-demand, is determined by the configuration file 580 generated by Service Administration for that service as shown in FIG. 11. Preferably, the Service Logic Program has access to the CLP and ELP sub-components within the same instance of service processing.

Not all SLPs are related to a specific call service and some SLPs are available for tasks that are needed by, and called by, other SLPs. Thus, for example, an SLP for an 800 service may need to invoke an SLP for a Line Information Database query to complete its tasks for call routing translations. An SLP can also pass control of call processing for a call to another SLP. Preferably, only one controlling SLP shall be executing at a time for a single instance of service processing. Any event data that is generated as part of the service task performed by the SLP is sent to the ELP component 540 within the same instance of service processing.

A Service Logic Program (SLP) can not be executed in an operating system directly because it does not contain all the information for a operating system to execute. Moreover, if the SLP needs to be executed in different operating systems without changing the format and content, NNOS middleware between the SLP and the operating system is provided to maintain the consistency of the SLP across operating systems.

As shown in FIG. 9, other processes that execute within the SLEE 450 for support and operational functions include: a Service Manager ("SM") object 554, responsible for loading, activating, de-activating and removing services that run in the SLEE and, further monitoring all other services running within its SLEE, and reporting status and utilization data to NOS; a NOS client process 558 which is a NOS class library that is used for interfacing with NOS services and is used by all services running within that SLEE to call on NOS services, i.e., is the gateway to NOS; a thread manager (TM) 557, which provides functionality needed for NGIN services to execute concurrently without tying up all the SLEE resources; and, a Data Management API 410 used to interface with the local cache and cache manager components of DM 400 through the intermediary of the DMAPI 410. As an example, a 1-800-number service having a SIBB that has collected 1-800-number digits, for example, may need to interact with the data management component to query a database to perform a number translation. This is accomplished through the DM API 410 which will perform the translation look-up said provide the data back to the service. As described herein, the database may have been previously loaded to the local cache 415 or, the data is accessed from the local DBOR through the DM server 425.

Still other service instances loaded in the SLEE as shown in FIG. 9 include a service agent instance 559 and a thread manager instance 557 associated therewith. Commonly-owned, co-pending U.S. patent application Ser. No. 09/420, 654, filed Oct. 19, 1999, now U.S. Pat. No. 6,425,005, entitled "Method And Apparatus For Managing Local Resources In Service Nodes Of An Intelligent Network," the contents and disclosure of which is incorporated by reference as if fully set forth herein describes, in greater detail the service activation process. As described in co-pending U.S. patent application Ser. No. 09/420,654, as part of the service activation, whenever a request is made for a service, e.g., in response to a call event, that requested service's service agent instance 559 will get the location of the call from NOS, via the NOS agent 558, and will query its thread manager instance 557 to determine if there is another thread instance that could process that call. For example, a particular type of service maybe allocated a predetermined number of instances, i.e., threads that may be invoked. The thread manager instance 557 will return a thread object (not shown) and clone an instance of that requested service (SLP) if the resources are available, or else will reject the call, if the new instance of the SLP is created, it's code is executed inside the thread. It should be understood that during this instantiation, a unique transaction identifier or session i.d. is created to determine which instance of the thread corresponds to the received call. Moreover, call context data is managed by the thread. Besides assigning execution threads, the service agent collaborates with the thread manager to monitor these threads and determine overall system loads.

Example service processing and utilization scenarios in accordance with the present invention are now described with reference to the sequence diagrams of FIGS. 10(*a*)–10(*i*) and the conceptual functional diagram of FIG. 24.

FIGS. 10(*a*)–10(*i*) describe the basic functional blocks implemented by the NGIN in the performance of services, e.g., calls, received at a network switch of the resource complex. These functional building blocks are generic in the sense that they may be implemented regardless of the type of service being performed and, particularly, they are described herein in the context of a 1-800/888 toll free call ("18C"), 1-800 collect call, etc. It is understood that with various modifications as described, the functional building blocks may be implemented in many event service scenarios.

Figure 16:
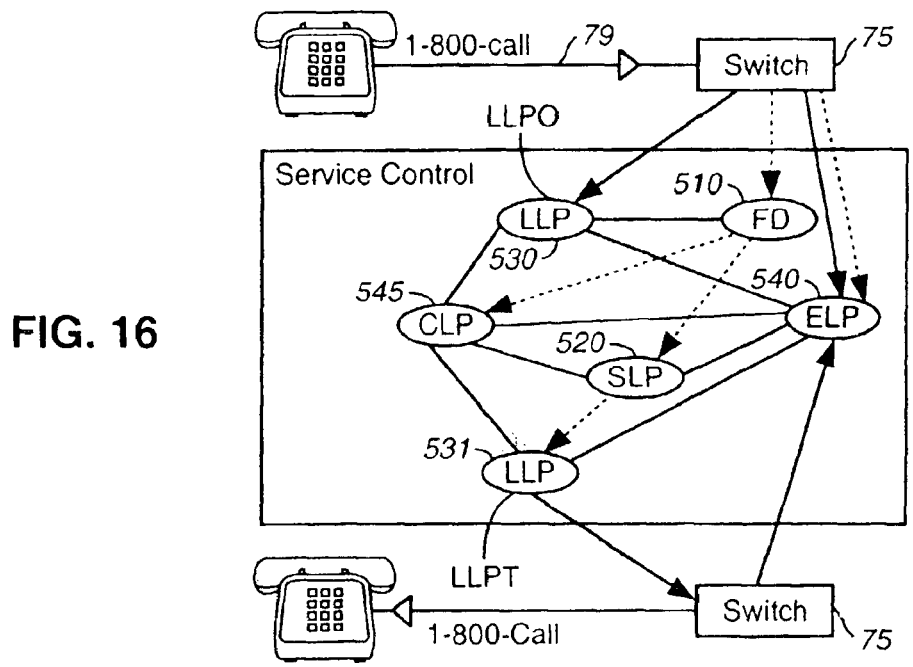
FIG. 16 depicts a call processing scenario as serviced by NGIN.

First, as shown at step 601, FIG. 10(*a*), it is assumed that a received call arrives at a Next Generation Switch ("NGS") associated with a service node as described in greater detail in commonly-owned, co-pending U.S. patent application Ser. No. 08/580,712, entitled "A Telecommunications System Having Separate Switch Intelligence and Switch Fabric" the entire contents and disclosure of which is incorporated by reference as if fully set forth herein. As described in co-pending U.S. patent application Ser. No. 08/580,712, when the NGS switch 75 receives a call, a bearer control component provides the call control component with the access line on which the call was received, as well as the ANI, dialed number, and other data needed for call processing. Call control maintains a state model for the call, as executed in accordance with its programmed logic. Additionally included in the state model are triggers for instantiating an ELP 540 and sending a service request to a feature discriminator service (FD) 510 as shown in FIG. 16 in the manner as will be described.

FIG. 10(*a*) is a sequence diagram describing the steps for performing feature discrimination on an incoming call. As shown at step 610, a logical name for the FD is sent from an NGS/NOS agent object to the NOS Name Translation (NT) function. Preferably, this Initial Address Message message includes both the name and the data (envelope and letter) with additional data such as the called 800#, ANI, Line ID, Network Call ID, Originating Switch Trunk. An ELP address is also sent along in this information. As indicated at step 612, a Name Translation is performed by NT to determine the feature discriminator name. It sends that name to DM to get the actual SLP name, i.e., FD.SLP). In this scenario, it is assumed that there is a feature discriminator in each SLEE that is always running (i.e., a persistent SLP). Then, as indicated at step 614, Data Management communicates the actual name of the FD SLP with its stored locations to the Name Translator (NT) which, in turn, sends the name to the NOS LRM function at step 616 to determine where the FD SLP is instantiated. It is understood that if a FD is not instantiated, NOS will instantiate one. The LRM picks a SLEE and returns the address of the SLEE to NT SLEE Address) as indicated at step 618. Then, at step 620, the NOS NT then sends the message (that came from NGS) to the Feature Discriminator SLP containing all the call origination information that came in. As part of this functionality, as indicated at step 625, the FD SLP then performs an FD database ("DB") lookup so that it may make a logical decision.

A SIBB invoked by an SLP for performing a DB lookup is now generically described in view of FIG. 10(*b*). In the context of feature discrimination, the DB lookup involves having the FD SLP communicate a logical FD Database name to NOS NT as indicated at step 630, however, any SLP object instance may initiate a database look-up. The NT queries DM with the logical DB name at step 632, and DM returns the database name and the addresses of its stored locations at step 633. For the situation where the database is at a remote node, a node-selection request to the NOS NRS system may be performed as indicated at step 634*a*. As a result, based on availability of services and the, status of SLEEs at service nodes, the NRS determines which node the database is located and sends the logical name to NOS NT as indicated at step 634*b*. Furthermore, as indicated at step 634*c*, NOS NT submits the DB address to the NOS NT instance at the remote node.

As indicated at step 635, the NOS NT may query the LRM to see if the database is locally available and if not, where it's available before finally choosing a location. The LRM returns the address of the DB to NT at step 636 which then sends the database physical address to the SLP, e.g., FD SLP, at step 637.

Alternately, as indicated by broken lines at steps 634*d*–634*f*, for the database location at a remote node, the NT at that node queries its LRM, returns the address to the remote NT, and returns the physical address to the SLP. The SLP, uses the data received earlier from the NGS NOS Agent and queries Data Management. For instance, in the case of the feature discrimination [in FIG. 10(*a*)], a query is made to find an SLP to handle the call as indicated at step 638 in FIG. 10(*b*). Finally, a data response is returned to the calling LP or SLP as indicated at step 639.

Particularly, in the context of the 18C service request, an FD SLP uses its feature discrimination table to identify which SLP is to handle the received service request. For example, if the received message is a 18C service request, it is to be handled by the 18C SLP. Table 3 below is an example abbreviated FD table having entries including pointers to various "toll-free", e.g., 1-800, call services.

---

Entry Port Table
   "001001" SLP pointer 'Vnet'
   "001002" Table pointer to FGD table
   FGD table
      1800* table pointer 800 table
      1888* table pointer 800 table
      1900* table pointer 900 table
      1* SLP pointer 'Local number'
   800 table
      1800collectSLP pointer to '1-800-C'
      18008888000SLP pointer 'Op Service'
      1800 *SLP pointer '800 service'
      1888 *SLP pointer '800 service'

--- where FGD is the feature group discriminator. Particularly, based on where the call originated in the network (switchboard) and the type of call received (e.g., 1-800), the FD will determine an appropriate SLP logical name. For instance, the identification "001002" indicates receipt of a call requiring a look-up in the FGD table (pointer to FGD table). The FGD table in turn, maintains pointers to other tables depending upon the called number, e.g., 800* where '*' is a delimiter. From this 800 table, for example, the FD obtains a pointer to the requested SLP logical name as indicated at step 649. Subsequently, this SLP is invoked and the service request is handed off to NOS which instantiates a CLP 545, LLPO 530 and the SLP 520 objects according to the 18C service requested.

In the preferred embodiment, the NGIN Service Creation component has defined the database that the FD SLP uses. It is populated by the NGIN SA component from service orders. As a result of the FD DB-query, DM sends back the results of the query to FD including at least three SLP names, LLP, CLP, SLP for object instantiation, in the manner as described herein. Next, as indicated at steps 628a–628c, the originating Line LP, i.e., LLPO, the SLP and CLP are respectively instantiated in the manner as described herein for the call service instance as with respect to FIG. 10(c).

Figure 10A:
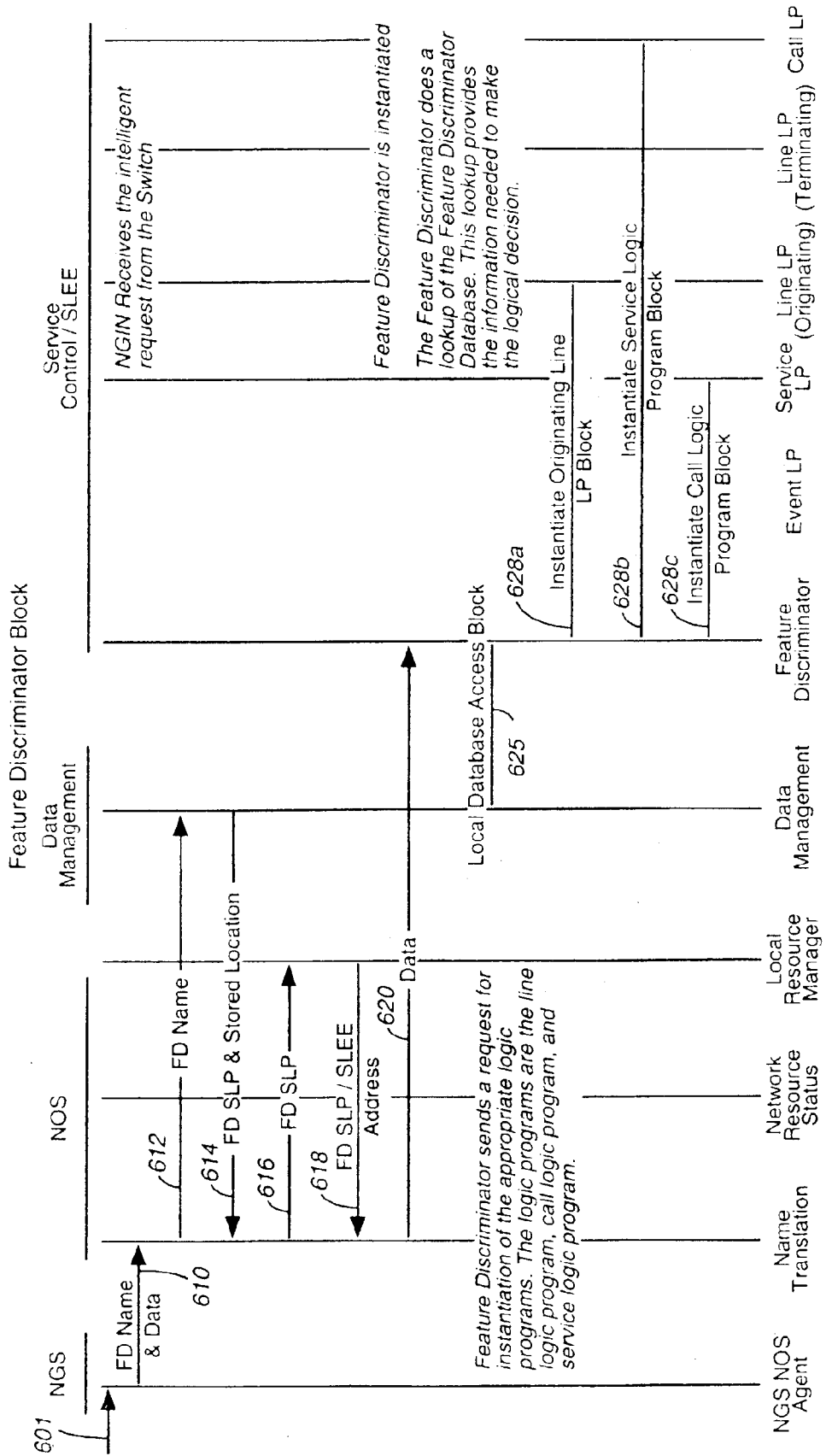
FIG. 10(a) depicts the generic functionality of an example feature discrimination instance.
Figure 10B:
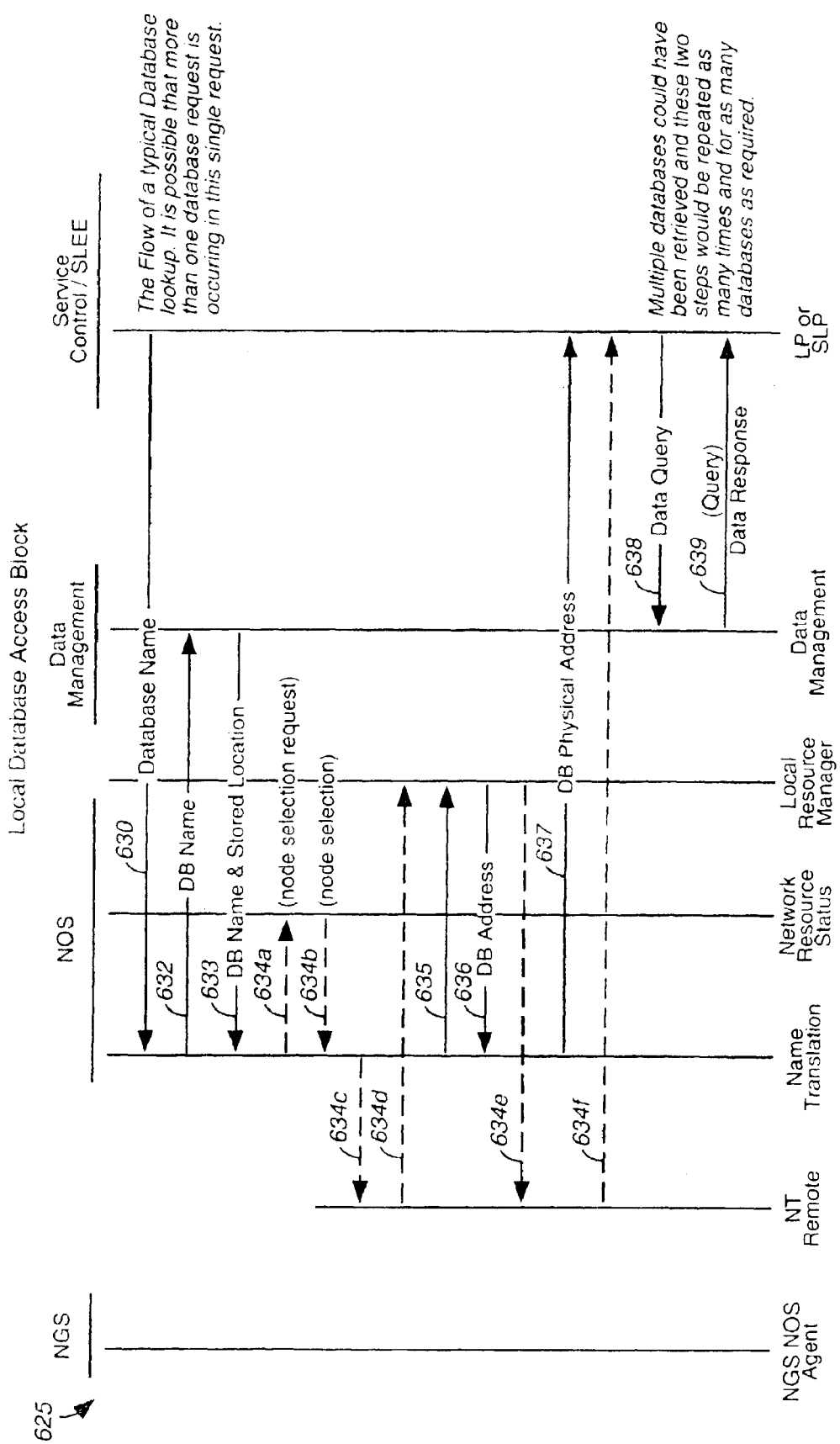
FIG. 10(b) depicts the generic local and remote database access functionality implemented by object instances employed during service processing.
Figure 10C:
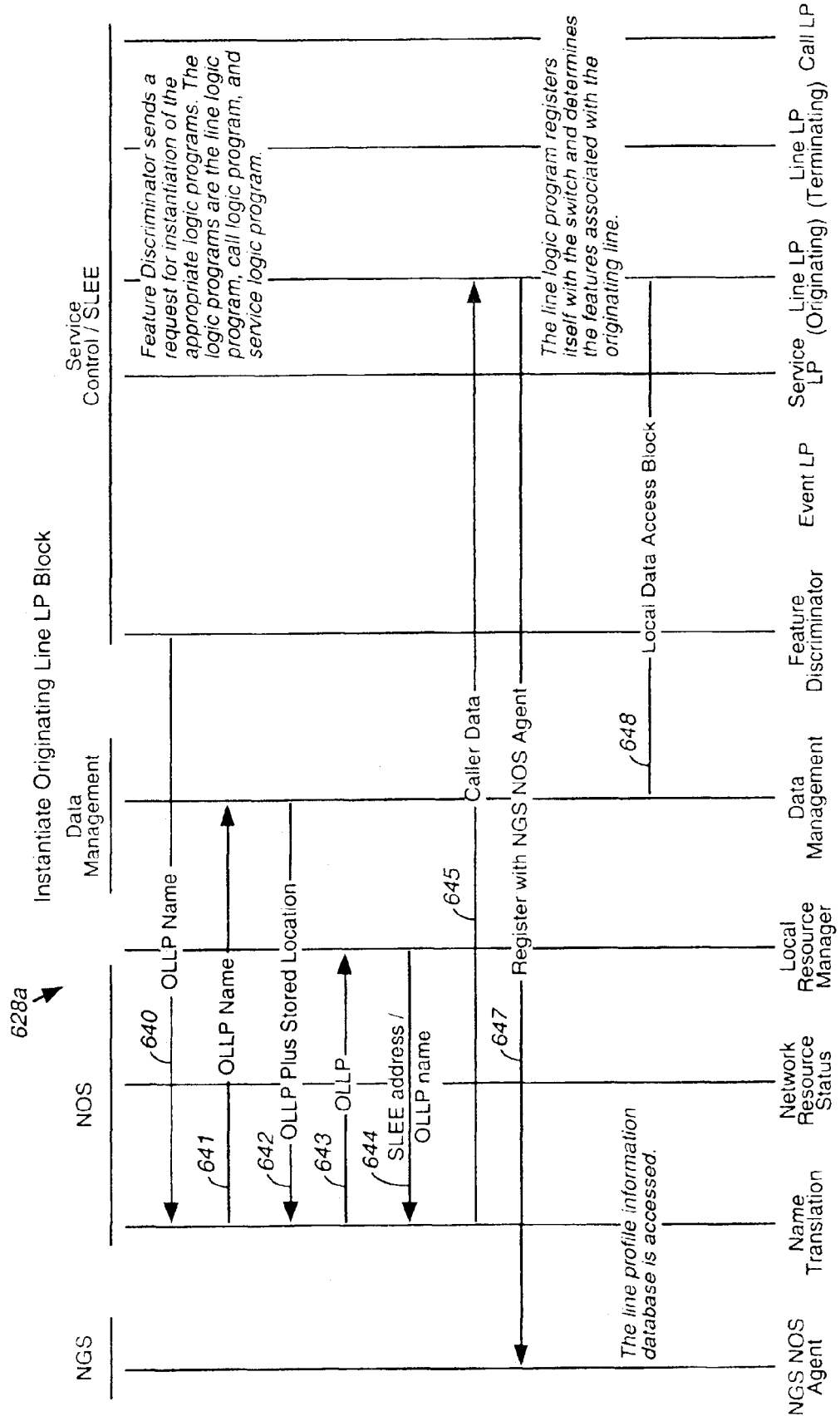
FIG. 10(c) depicts the generic process for instantiating an example line logic program instance at an originating node.

FIG. 10(c) is a sequence diagram describing the steps for instantiating an LLPO relating to a received service request. Particularly, using the results of the FD DB query, [step 639, FIG. 10(b)], the FD SLP sends the LLPO logical name to NT as indicated at step 640, and NT, in turn, queries it instance tables, e.g., included in a local DM cache, to obtain the physical location (object reference) and actual name of instantiated or available LLPO to execute as indicated at step 641. Preferably, the logical name for the LLPO is provided to NOS NT based on the bearer control line on which the call was received. That is, identification of this line is based on either the ANI or the access line identified by the bearer control component. The ANI identifies the original access line that originated the call, which may or may not be the same access line on which NGS receives the call, i.e., the received call may have originated on a local network, for example, and passed to switch on an inter-exchange carrier network. Therefore, features associated with a line, such as call waiting or call interrupt, can be identified by the ANI. As indicated at steps 642 and 643, the NOS NT translates the logical name for the LLPO to a physical address for an LLPO instantiation. It should be understood that, while other logic programs (such as SLPs) may be instantiated at other sites, the LLPs are instantiated at the site at which their associated lines are. The NT then queries the NOS LRM to find out where the LLPO is instantiated as indicated (at step 643) and LRM returns the actual LLPO,(SLP) name with the SLEE address (at step 644) which may be at the service control server, or the call control server. Next, as indicated at step 645, the caller identification data is communicated to-the instantiated LLPO instance via NOS NT, and, at step 647, the LLPO registers itself with the NGS NOS Agent at the switch. Once instantiated, the LLPO queries Data Management (at step 648) for features associated with the line, maintains the state of the originating line, and invokes any features such as call waiting or overflow routing when those features are invoked by the caller (i.e., call waiting) or network (i.e., overflow routing). The local database access query is performed in accordance with the steps described in FIG. 10(b), however, the physical address of the line information DB is communicated to the LLPO which requests DM to lookup customer originating line information for receipt by the LLPO.

Figure 10D:
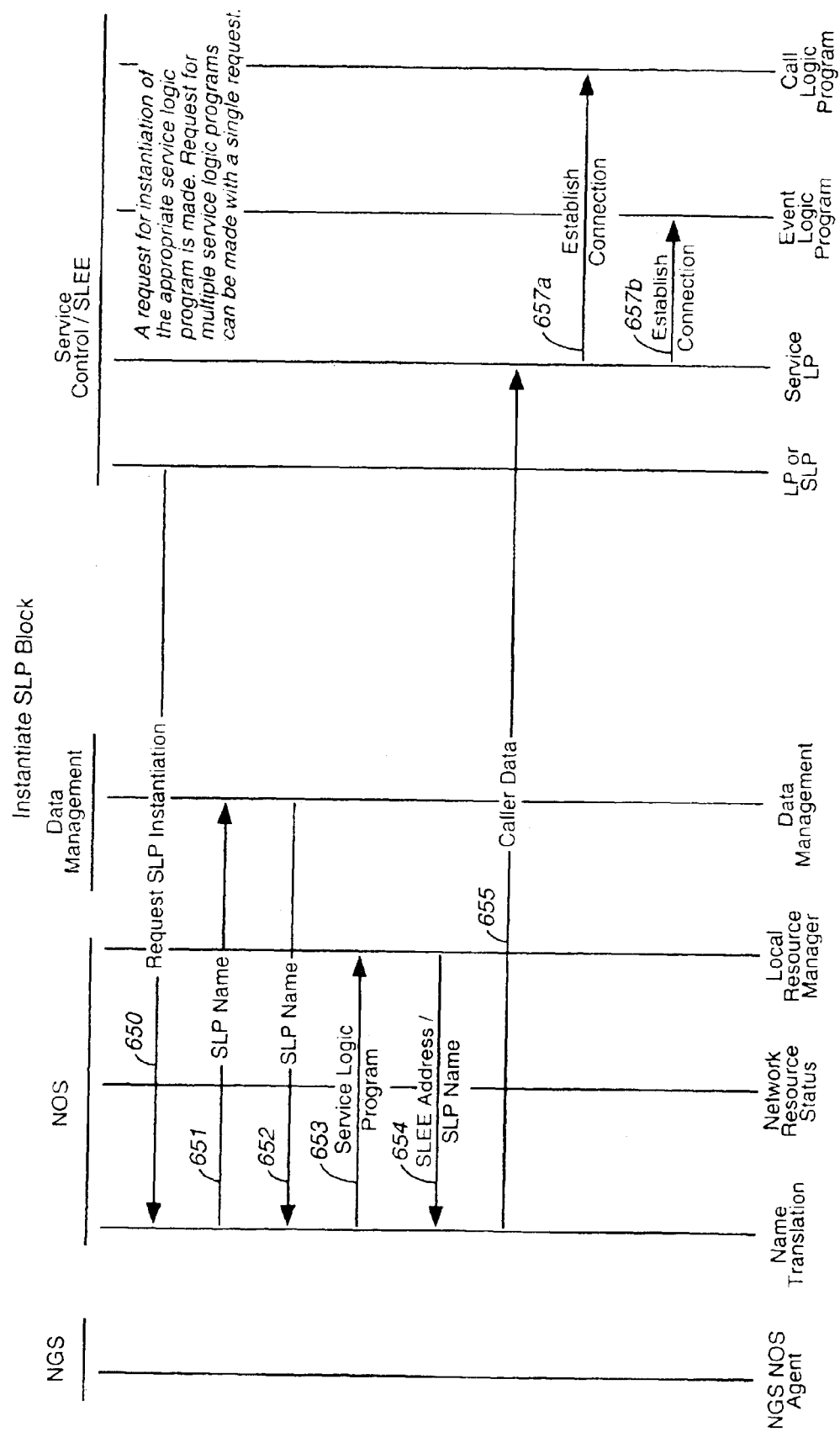
FIG. 10(d) depicts the generic process for instantiating a service logic program: instance.

FIG. 10(d) is a sequence diagram-describing the steps for instantiating an SLP relating to a received service request (as indicated at step 628b, FIG. 10(a)). Preferably, a request for multiple SLPs may be made in a single request such that the SLP, CLP and LLPO corresponding to the requested call service may be instantiated concurrently. Utilizing the results of the FD DB query, (step 625, FIG. 10(a), the FD SLP sends-the SLP logical name to NT as indicated at step 650, FIG. 10(d) and NT, in turn, queries its instance tables, e.g., local DM cache for the name translation for the physical location (object reference) of the SLP to execute as indicated at step 651. The DM (local cache) sends back the object reference of the SLP(s) (storage address), as indicated at step 652. The NT then queries the NOS LRM to find out if the SLP is instantiated locally and, if not, which instance of the requested service to use, as indicated at step 653. In response, the LRM returns the actual SLP name with the SLEE addresses at step 654. The NOS, in response, may send a request to the Service Manager object running on a Service Control SLEE in order to instantiate a new SLP service, or alternately, request that the service's thread manager assign a new thread for the requested service having a unique tracking identifier representing the call. In the preferred embodiment, NOS will select the SLP from a Service Control server that received the original incoming service request notification from the NGS, however, it is understood that NOS could select the SLP in any service control component through implementation of the NOS LRM and the NRS list of Service Control instances and their current status. The next step of FIG. 10(d), requires that the instantiated SLP process registers its physical address with the NOS, and that the NOS allocates this SLP to the service request. Then, at step 655, the NOS passes the service request hand-off message to the new SLP so that the SLP may begin processing the call in accordance with its programmed logic. Parallel to the SLP instantiation process, the associated CLP (and any other SLP) for this call may be instantiated as well, and it should be understood that an ELP instance for this call has been pre-instantiated for call context data collection. Finally, as indicated at step 657a, FIG. 10(d), the SLP communicates with the CLP providing it with the addresses of the SLP, LLP and the ELP, and at step 657b, the SLP communicates with the ELP providing it with the addresses of the SLP, LLP and the CLP. Via the COBRA implementation NOS, interfaces are thus established between the LLP, CLP, SLP.

The prior instantiation of the ELP requires steps such as: having the NGS call control component communicate a message to NOS including a logical name for an ELP and, in response, having NOS send a message to a Service Manager object (FIG. 10) to instantiate an ELP within a SLEE; and, return an object reference for that ELP back to call control which generates the ELP instance for that call. The NGS call control component includes this object reference in a service request message that is sent to an FD in the SLEE. Thus, all qualified event data that are generated for the call by any process are written to the instantiated ELP process.

Preferably, at the time the LLPO initiates DM to lookup customer originating line information, the instantiated SLP for the call is processing the service request. In the 18C scenario to be described, the 18C SLP has determined a routing termination, e.g., including a logical termination (LTERM) and switch/trunk in the context of a 18C service scenario, and the next step is to determine the terminating node location in NGIN and instantiate the terminating line logic program LLPT for the outgoing call. As will be explained in greater detail with respect to the 18C service scenario, the local database access sequence [of FIG. 10(b)] is implemented to determine the terminating NGIN node location based on the given final routing information. It should be understood that the terminating node may be at the same node where the call was received, or at a remote node other than the originating node. Once the terminating node location is received, the terminating LLP is instantiated as is a terminating line profile lookup.

Figure 10E:
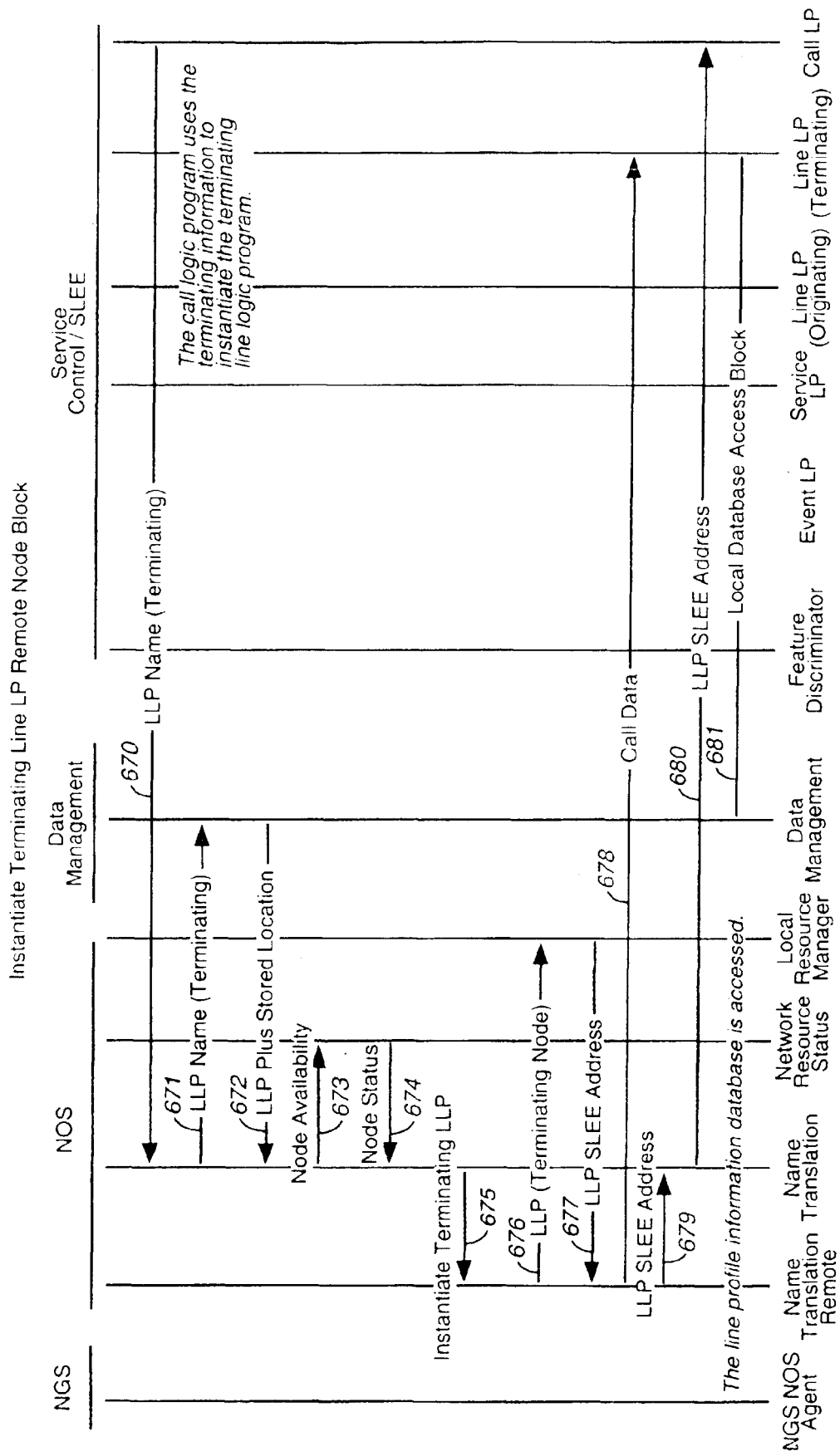
FIG. 10(e) depicts the generic process for instantiating an example line logic program instance at a terminating node.

FIG. 10(e) illustrates the process for instantiating the terminating LLP at a remote NGIN node prior to routing a call. As shown at step 670, this requires the CLP to send the terminating node location and the logical name of the terminating LLP to NT so that it may be instantiated (the terminating node location is part of the routing response returned from DM). The NT then-sends the LLP logical name to DM at step 671 which returns the actual LLP name plus the addresses of its stored location (object reference) at step 672. At step 673, the NT then queries the NOS NRS function to determine if the node to which this call is terminating is up and operational, and, at step 674, the NRS returns to NT the status of the terminating node. Via NOS, the NT of the local node requests the NOS NT agent of the remote node to instantiate the terminating LLP at step 675. As indicated at step 676, this requires the NT on the terminating node to query its LRM to determine if the LLP is already instantiated for this terminating line, and if not, instantiates the LLP. The LRM at the terminating node returns to NT the SLEE address where the LLP for the terminating line is running at step 677. Then, at step 678, the NT-of the terminating node sends the call data to the LLP of the terminating line and additionally sends the address of the SLEE executing the LLP for the terminating line to the NT of the originating node as indicated at step 679. The NT of the originating node sends the address of the SLEE executing the LLP for the terminating line to the CLP at step 680, and, as indicated at step 681, a local database lookup is performed to determine the features (if any) on the terminating line. Specifically, the terminating LLP sends logical database name of the line info database to NT for name translation. NT requests the actual line information database name from DM and sends the actual line information DB name and its stored locations to NT. NT queries LRM to find out if the line information DB is available locally and LRM sends back the physical DB address to NT. NT passes the line information DB physical address, to the terminating LLP. Then, the terminating LLP sends request to DM to look up customer terminating line information and DM returns the customer line information to LLPT. The system is now ready to perform the routing of the call, as will be described.

Figure 10F:
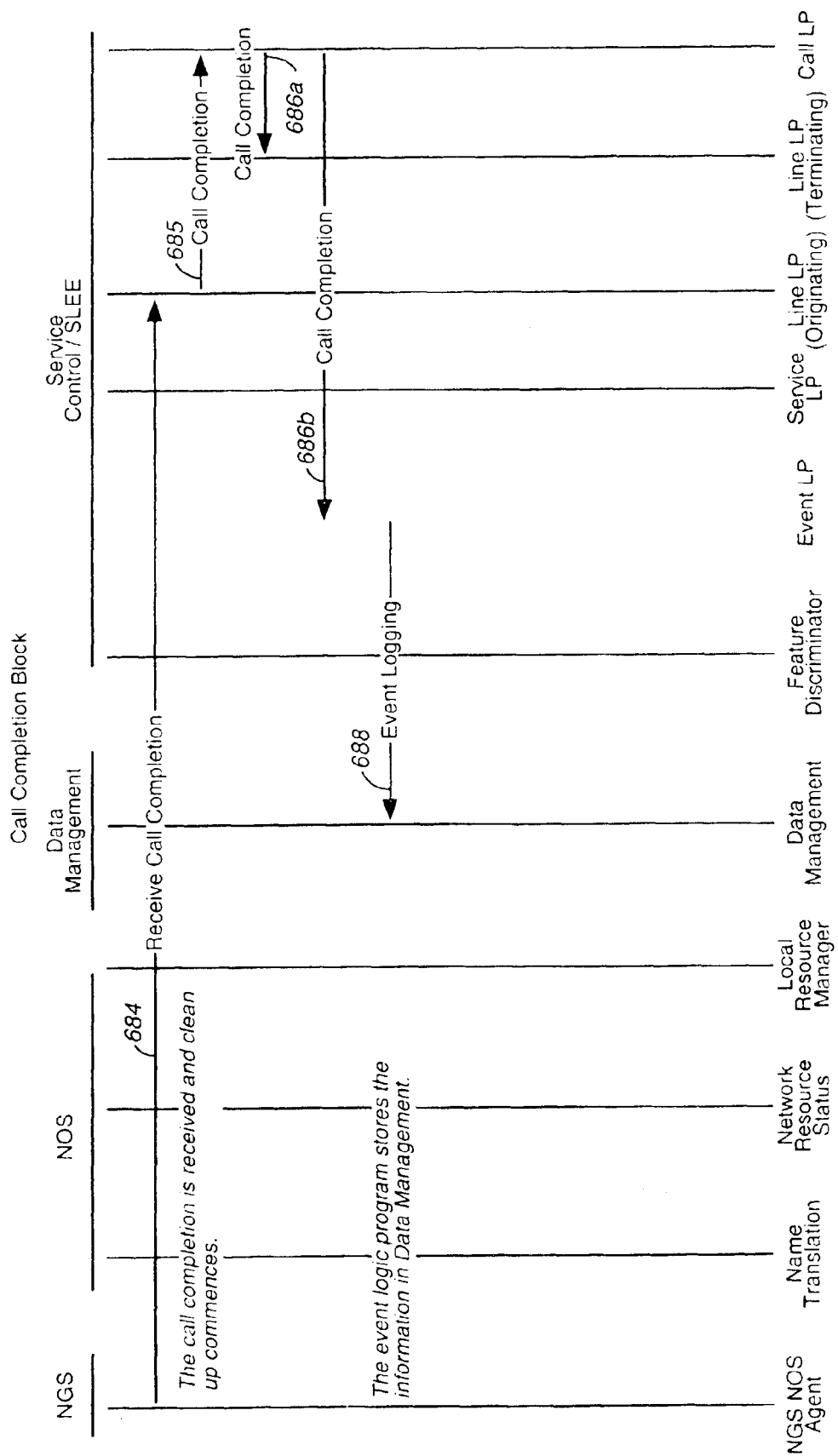
FIG. 10(f) depicts the generic process for completing service execution relating to a call.

FIG. 10(f) is a sequence diagram illustrating the procedure for performing call completion after the particular service, e.g., call routing, is performed. As indicated at step 684, FIG. 10(f), the LLPO receives a call completion notification from the NGS NOS Agent and at step 685 the LLP forwards the call completion notification to the CLP. At steps 686a and 686b, the CLP forwards the call completion notification to all associated LPS (e.g., LLPT, ELP) and the CLP terminates. Finally, upon notification of the call completion from the CLP, at step 688, the ELP writes the call information to DM.

Figures 11A, 11B:
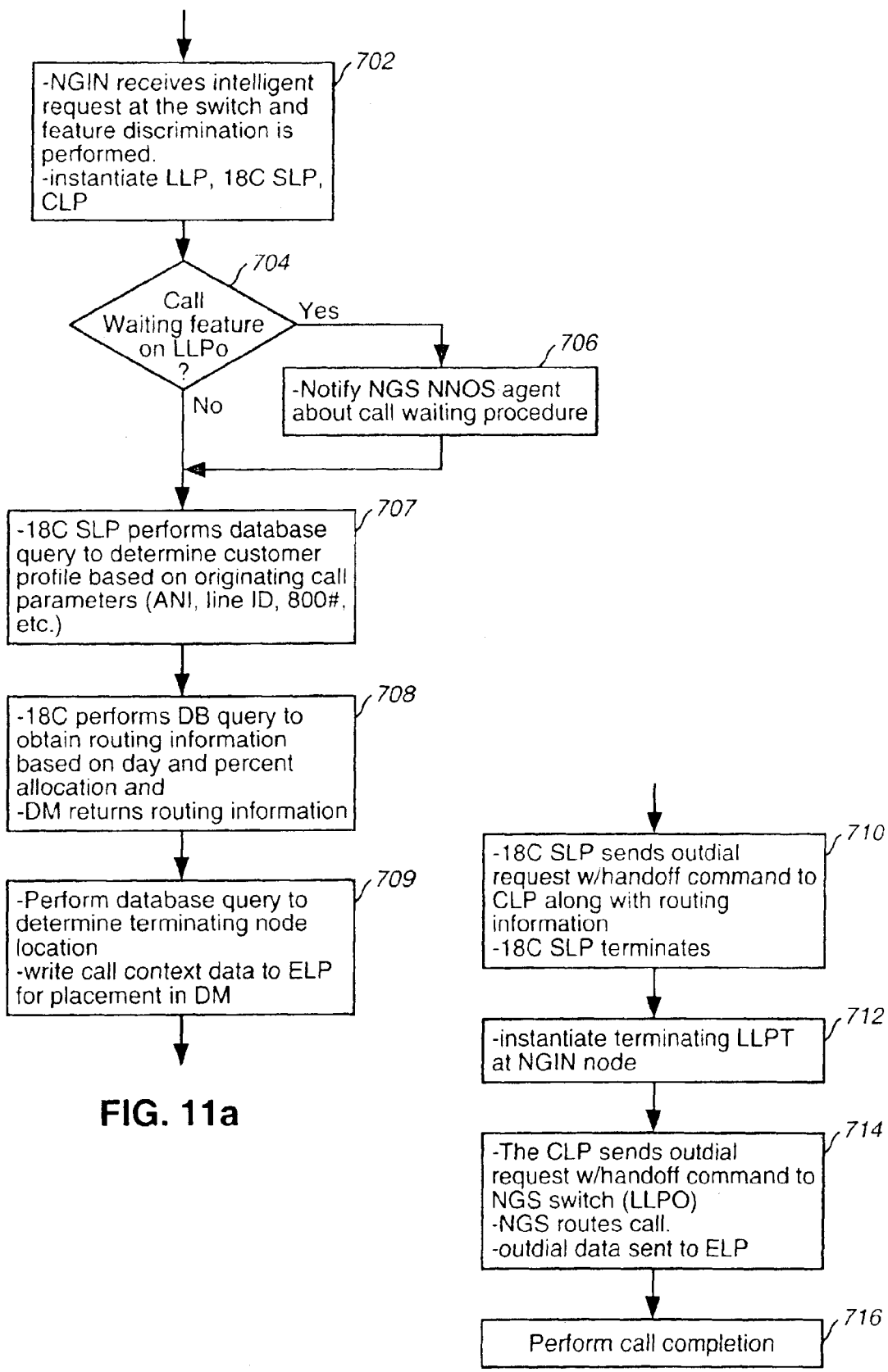
FIGS. 11(a)–11(c) depict an example SLP process for performing 1-800/8xx number translation, call extension to a termination, and implementing Call Waiting feature at the originating line.

An example 1-800 call service ("18C") scenario is now described in greater detail with respect to FIG. 11(a). The 18C service performed by NGIN enables an 800 number to be translated, e.g., based on the Day of Week and percent (%) allocation before extending the call to the correct termination. Particularly, as indicated at step 702, the NGIN receives the intelligent request at the switch, the feature discrimination is performed as described with respect to FIG. 10(a) and the SLP, CLP and LLP instantiations are performed as described with respect to FIGS. 10(c) and 10(d). Then, at step 704, if the LLPO has determined a Call Waiting feature associated with the originating line, the LLPO sends the NGS NOS Agent a notification to inform the LLPO if an incoming call is detected, as indicated at step 706. This notification informs the NGS not to play a busy signal if an incoming call is received, e.g., while the originating line is trying an outdial. Next, at step 707, the instantiated 18C SLP performs the database query to determine the customer profile based on the Day of Week and percent (%) allocation. This entails querying the DM cache for the logical name of the 800 call routing database, and once the database is located, performing a customer lookup for the correct routing termination based on, for example, the called 800 number, the line identification, the originating switch trunk and the ANI. The DM returns a customer profile to the 18C SLP. Then, as indicated at step 708, the 18C SLP constructs a query for DM by sending the day and percent (%) allocation according to the customer profile. The DM will then return the final routing information including the LTERM and the Switch/trunk.

Next, as indicated at step 709, a database query is performed to determine a terminating node location for the termination specified in the routing response. After DM returns the terminating location to the SLP, any call context data is written to the ELP for eventual storage in the DM.

Next, at step 710, [FIG. 11(b)], the 18C SLP sends an outdial request with a handoff command to the CLP along with the routing information and the 18C SLP terminates. At step 712, [FIG. 11(b)], the terminating LLPT at the termination node is instantiated in the manner as described with respect to FIG. 10(e). Then, as indicated at step 714, the CLP sends the outdial with handoff command to the LLPO which is forwarded to the NGS NOS agent. The NGS routes the call to the termination node and the ELP writes the outdial data to the DM. Finally, as described with respect to FIG. 10(f), call completion is performed as indicated at step 716 [FIG. 11(b)].

In a more advanced 18C service, the 18C SLP includes functionality for servicing calls having Call Waiting feature on the originating line. In an example service scenario, an interrupt is received on the originating line during the 800 number translation process indicating that another call has been received. The incoming call is accepted by the caller and the pending outdial is continued. Additionally, the caller switches back to the 800 number outdial and completes that call.

Figure 11C:
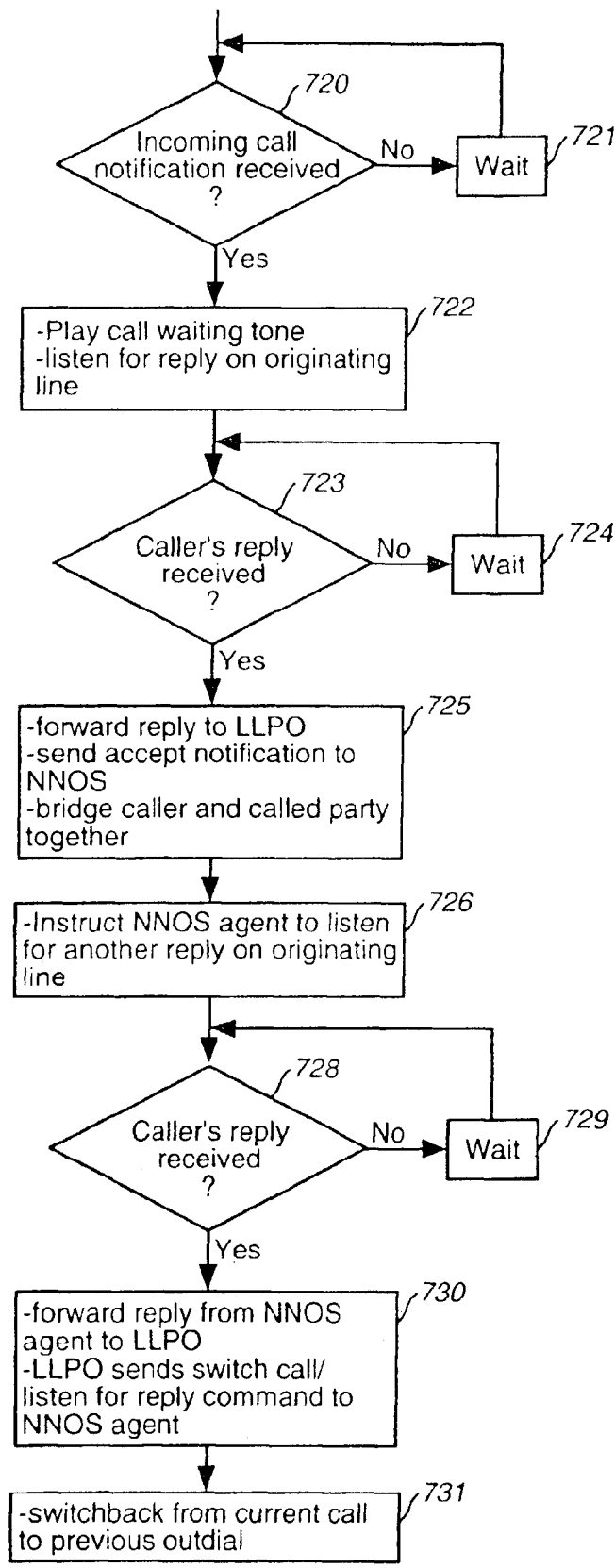

FIG. 11(c) illustrates this advanced 18C service scenario. Particularly, after the LLPO has communicated the notification to the NGS NOS agent to inform it when a call interrupt has been received as indicated at step 704, with respect to FIG. 11(a), the LLPO enters a call waiting mode.

As indicated at steps 720, 721, FIG. 11(c), the LLPO waits for a possible incoming call notification from the NGS NOS Agent in response to a Call Waiting interrupt signifying that a new incoming call for the originating line been received. When a call is received as determined at step 720, the LLPO instructs the NGS NOS Agent to play the call waiting tone and listen for a reply on the originating line, as indicated at step 722. At steps 723, 724, the NGS NOS Agent listens for a reply and forwards the caller's reply to the LLPO. When the caller's reply is received at step 723, the following is performed at step 725: 1) the NGS NOS agent forwards the reply to the LLPO; 2) the LLPO sends a call accepted notification to the NGS NOS Agent indicating that the caller has accepted the incoming call; and, 3) the NGS bridges the caller and the calling party together. In this scenario, it is assumed that the incoming call has already established its CLP, LLP and ELP through its instantiation processes. Then, as, indicated at step 726, the LLP further instructs the NGS NOS Agent to listen for another reply on the originating line, and at steps 728 and 729, the process waits to receive the caller's reply indicating that the second call is terminated.

In the meantime, as described with respect to FIGS. 11(a) and 11(b), the advanced 18C SLP has continued its processing by determining a terminating node location given the routing information (e.g., not on an originating node), and sending an outdial request with handoff command to the CLP, including the routing information. At this point, the advanced 18C SLP instance terminates. Additionally, in the manner as described, the LLPT is instantiated (associated with the terminating line), the CLP sends an outdial command to the NGS which routes the call to the instantiated LLPT;, and writes the outdial information to the ELP.

Returning back to FIG. 11(c), assuming the caller's reply has been received at the originating line as indicated at step 728, it is necessary to switch back to the previous outdial. That is, at step 730, the NGS NOS Agent forwards the reply to the LLPO. The LLPO interprets the reply to be a switch from the current-call to the previous outdial that was initiated. The LLP dispatches a Switch Call/Listen for Reply command to the NGS NOS Agent and a switchback to the previous outdial is performed at step 731. It is assumed that the LLP of the originating line receives a call completion notification from the CLP of the second call indicating that that call waiting call has been completed. Finally, the call completion is performed [FIG. 10(f)]. It should be understood that the process described herein for handling the Call Waiting interrupt would be applicable no matter what time a call waiting interrupt is received at the originating line. Additionally, similar principles apply to the scenario of a call waiting applied at the terminating line.

Figures 12A, 12B:
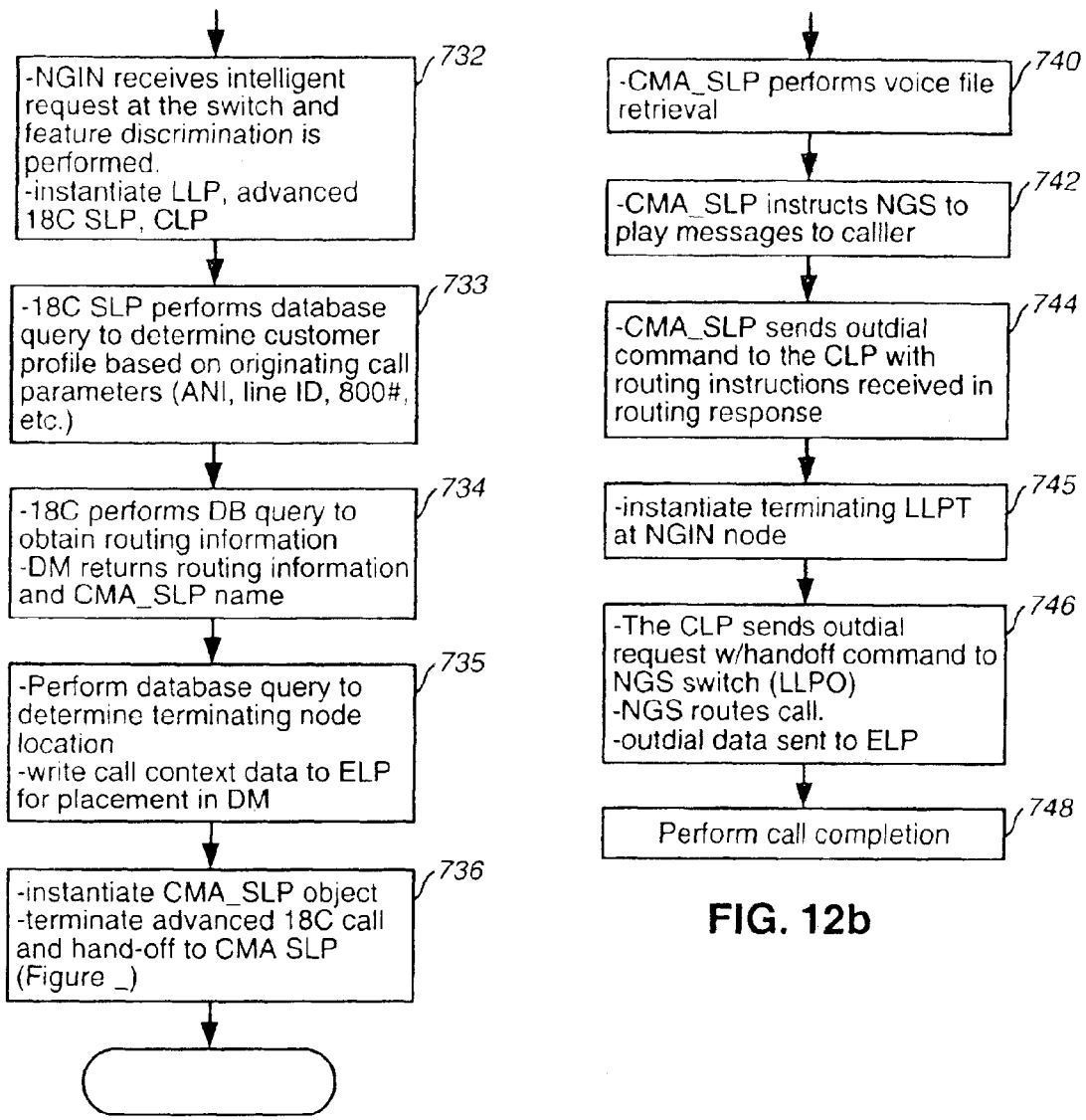
FIGS. 12(a) and 12(b) depict an example process for performing 1-800/8xx number translation, and performing message playback to a caller before extending a call to a termination.

Building on the advanced 18C scenario, another SLP may be executed to play a message to the caller first before extending the call to its termination. FIG. 12(a) illustrates this advanced 18C service scenario implementing customized message announcement and call extension features. First, the advanced 18C SLP described with respect to FIG. 11(a) is instantiated for the 800 number translation. Particularly, as indicated at step 732, this involves: receiving the intelligent request at the switch, performing feature discrimination, and, performing the advanced 18C SLP and LLP (and CLP) object instantiations. Assuming the instantiated advanced 18C SLP determines no features associated with the originating line, then, a lookup is performed to determine the correct routing. As part of this routing query, a customer profile lookup is first done, as indicated at step 733 followed by a day and percent allocation query, as indicated at step 734. As a result of the day and percent allocation query, DM returns routing instructions for a call extension and the name of the new Customized Message Announcement SLP ("CMA SLP") for handling the remainder of the call to the advanced 18C SLP. Then, as indicated at step 735, the terminating node location is determined, and, any call context data may be written to the ELP at this point for placement in the call context DM.

Then as indicated at step 736, the new Customized Message Announcement SLP ("CMA SLP") is instantiated. This CMA SLP invokes SIBBs to direct the playing of the voice file and the extending of the call. As a result of the CMA_SLP Instantiation, the NOS NT sends the call identification data and SLP address list (ELP, CLP, and LLP) to the new CMA SLP. Then, the advanced 18C SLP terminates and hands off this call to the CMA SLP. This CMA SLP invokes SIBBs to direct the playing of the voice file and the extending of the call. As a result of the CMA_SLP instantiation, the NOS NT sends the call identification data and SLP address list (ELP, CLP, and LLP) to the new CMA SLP. Then, the advanced 18C SLP terminates and hands off this call to the CMA SLP.

FIG. 12(b) illustrates the methods-implemented by the CMA SLP. As indicated at step 740, the CMA_SLP invokes SIBBs to perform a DM database query for retrieving specific customer voice files for message playback at the originating line as described with respect to FIG. 10(g).

Figure 10G:
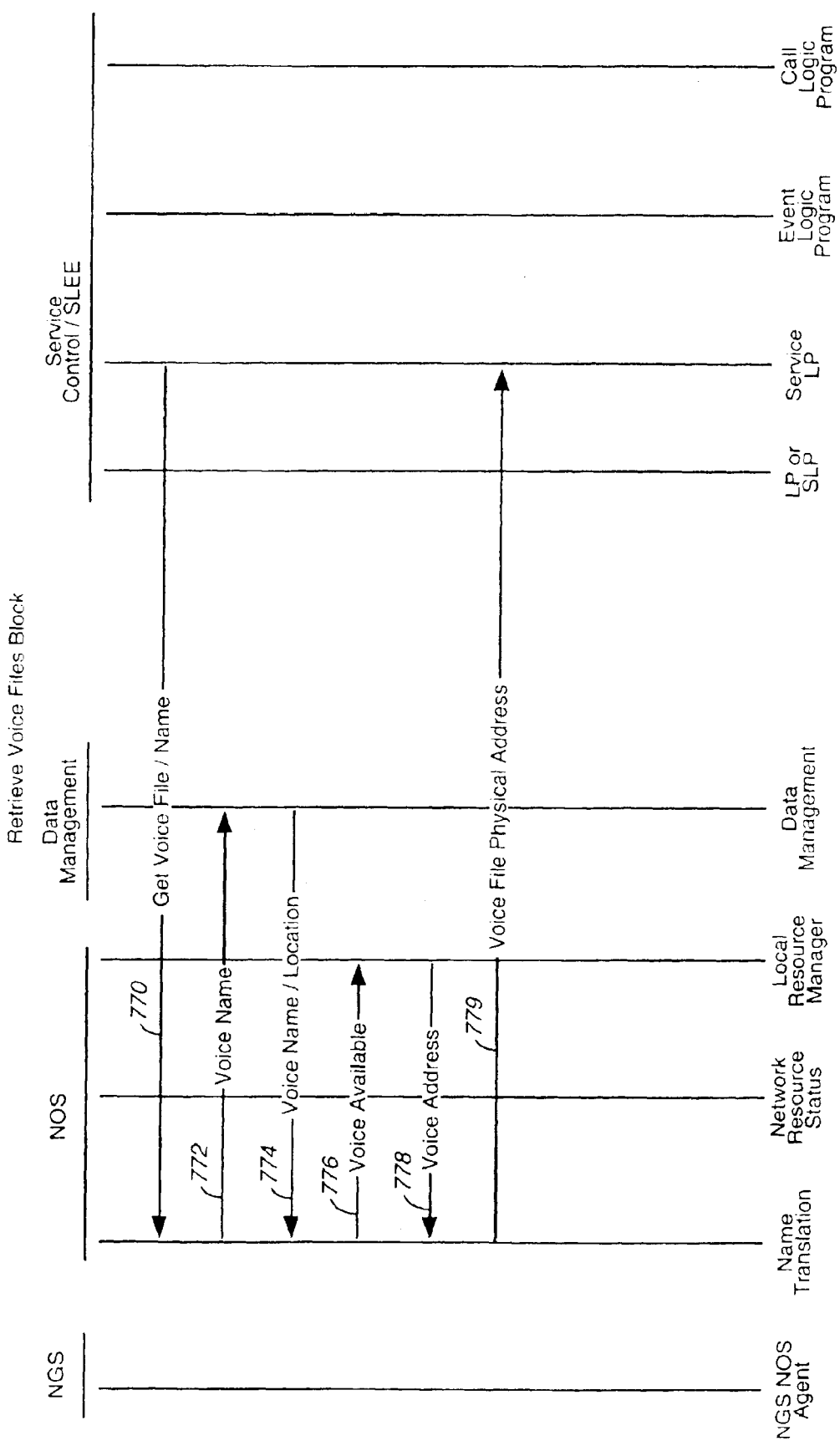
FIG. 10(g) depicts the generic process for retrieving voice files during service processing.
Figure 10H:
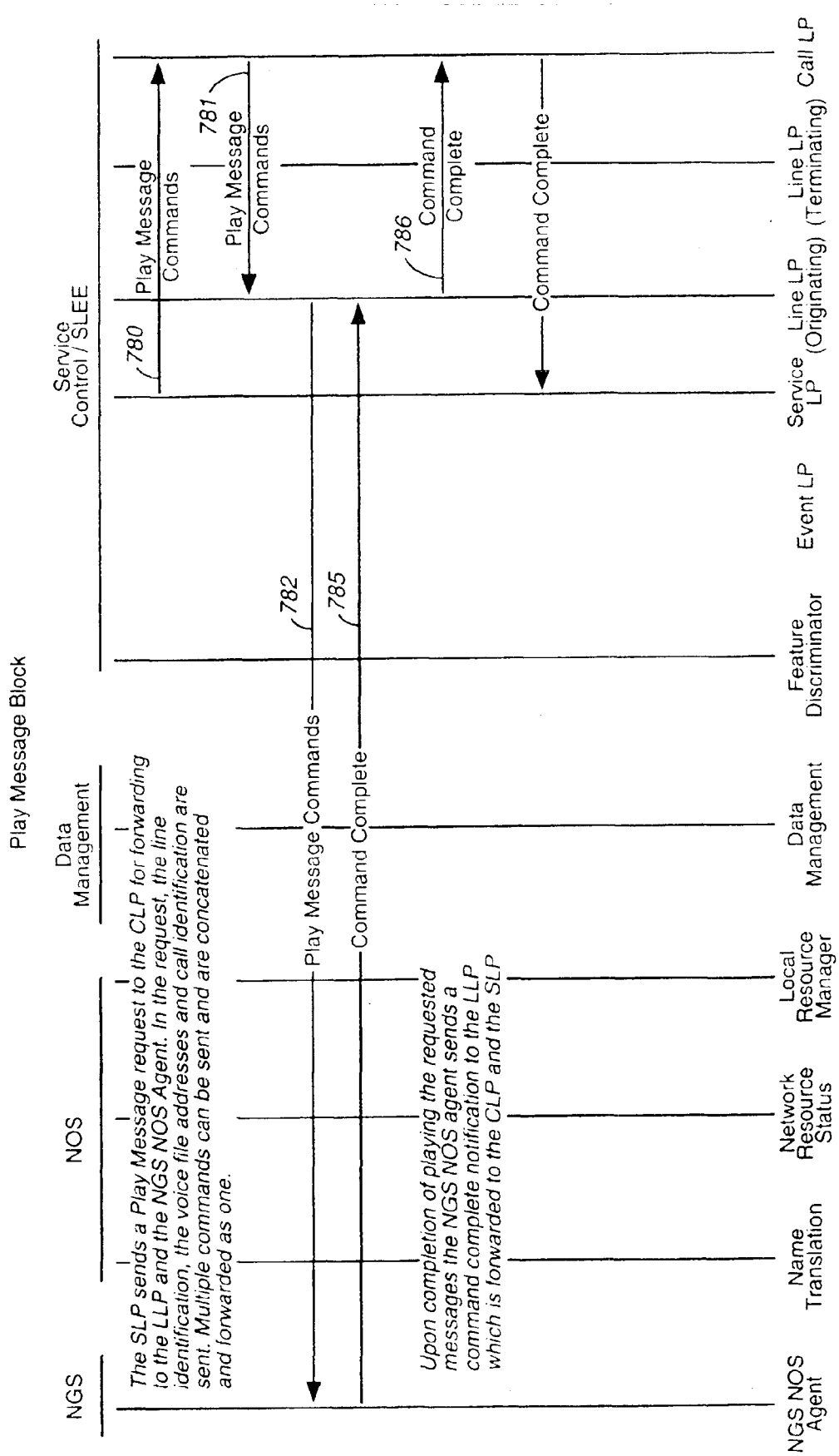
FIG. 10(h) depicts the generic process for playing a voice file message at a network switch during service processing.
Figure 10I:
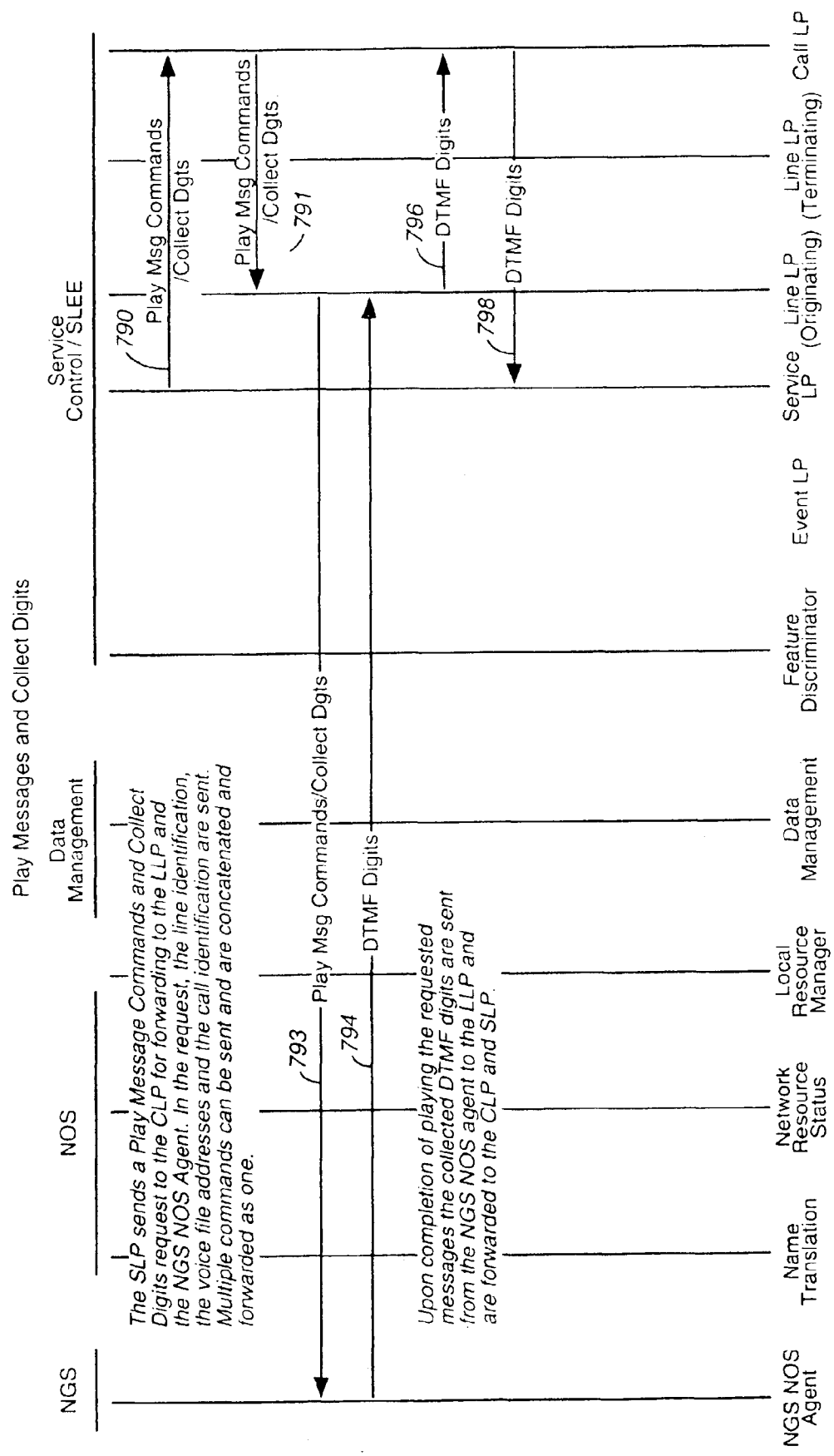
FIG. 10(i) depicts the generic process for playing a voice file message and collecting entered DTMF digits at a network switch during service processing.

Next, as indicated at step 742, the CMA SLP invokes SIBBs for instructing the NGS to play messages (retrieved voice files) to the caller, as described in greater detail with respect to FIG. 10(h). Finally, as indicated in FIG. 12(b), step 744, the CMA SLP sends an outdial command to the CLP with the routing instructions that were received in the routing response of the advanced 18C SLP.

Finally, in this example scenario, the terminating LLP is instantiated as indicated at step 745; a profile lookup is performed to determine the features available-on the terminating line; the outdial command is completed as indicated at step 746; and the outdial data is written back to the ELP. Finally, at step 748, the call completion is executed.

FIG. 10(g) is a sequence diagram illustrating a SIBB process for retrieving voice files from DM for playback over the resource complex. Specifically, according to the FIG. 10(g), the following steps are implemented: 1) the CMA SLP sends the logical name of the voice file to NT for name translation (step 770). In this scenario, it is assumed that a generic voice file message may be retrieved, however, utilizing the customer profile information, a unique voice file message specific to a customer may be retrieved; 2) the. NOS NT queries DM for the actual name and location of the voice file (step 772); 3) DM returns the voice file name and the addresses of its stored locations to NT (step 774); 4) NT queries the LRM and/or NRS for the availability of the database containing the voice file (step 776) and the LRM returns the address of the database containing the voice file to NT (step 778). Finally, the physical address of the voice file is returned to the CMA SLP from NT, as indicated at step 779.

FIG. 10(h) is a sequence diagram illustrating a SIBB process for initiating the playing of messages to the caller. In an example scenario, the SIBBs perform the following steps: 1) communicating a Play Message request from the SLP to the CLP (step 780), forwarding the request to the originating LLPO (step 781). It should be understood that in the request, the line identification, the voice file addresses and the call identification data are sent. Preferably, multiple commands may be sent that are concatenated and forwarded as one; 2) the LLPO forwards the play message command to the NGS NOS Agent (step 782). The NGS allocates the appropriate resource, e.g., which switch port has IVR capabilities, VRU port, etc., and performs the play message command; 3) the NGS NOS Agent communicates a Play Msg. Complete command to the LLP for future forwarding to the SLP (step 785); 4) a Play Msg Complete notification is forwarded from the LLP to the CLP (step 786,); and, 5) the Play Msg Complete notification is then forwarded from the CLP to the SLP (step 788).

Figures 13A, 13B:
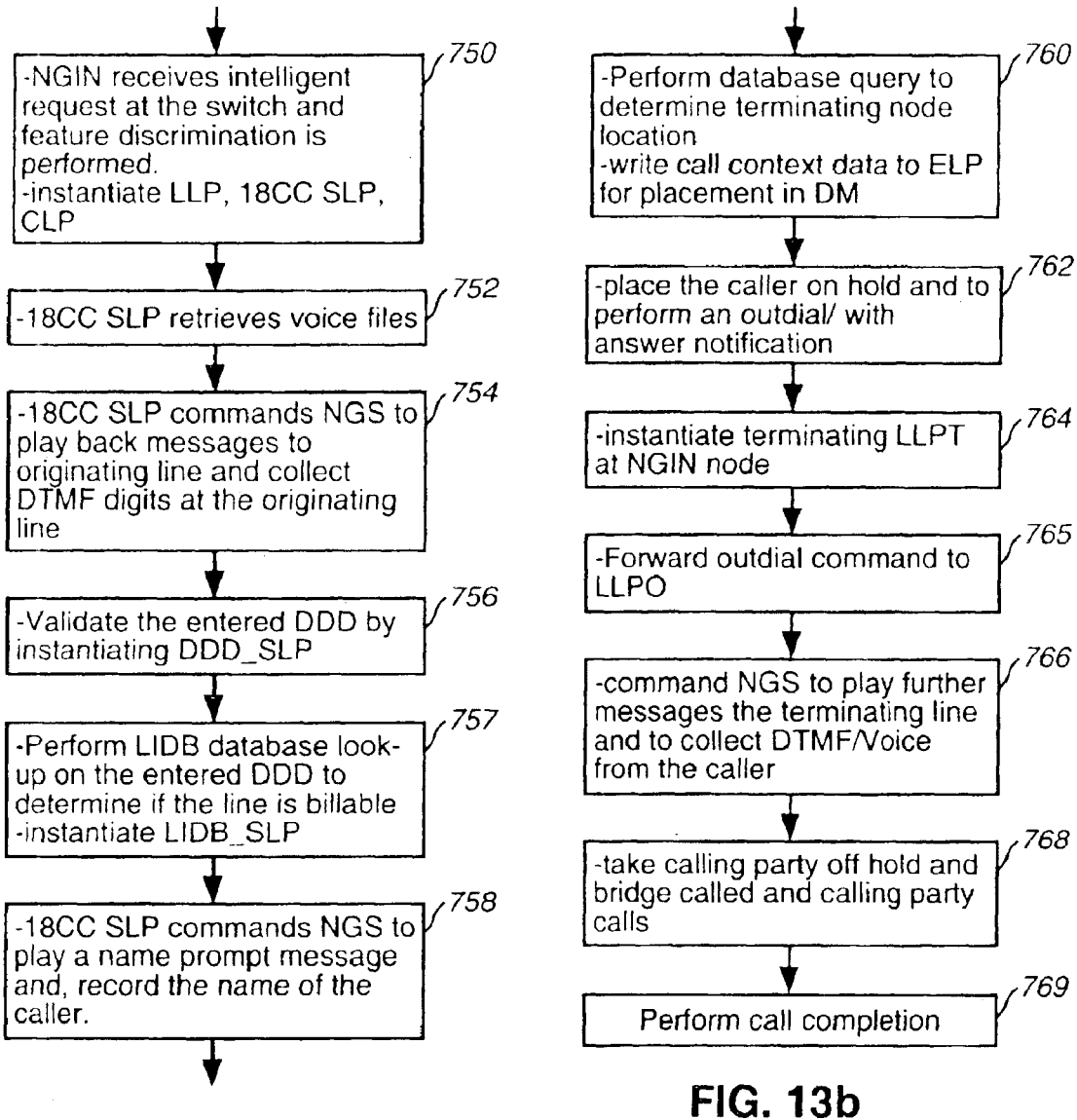
FIGS. 13(a) and 13(b) depict an example process for performing 1-800/8xx collect call service.

A 1-800 collect call ("18CC") service with a collect call option is now described in greater detail with respect to FIG. 13(*a*). This 18CC scenario describes the ability to provide a 1-800 Collect service with options such as collect call and calling card options. To provide this functionality, this scenario implements an 18CC SLP which instantiates an LIDB Lookup SLP or SIBB ("LIDB_SLP") to verify that the called line is billable, and implements a validate direct dialed digits SLP or SIBB ("DDD_SLP") to verify that the DDD entered by the caller is valid It is assumed that all database and voice files used in this scenario have been built using the NGIN Service Creation Environment.

First, as indicated at step 750, FIG. 13(*a*), the NGIN receives the intelligent request at the switch, performs feature discrimination, and, performs the 18CC SLP and LLP (and CLP) instantiations. Assuming no features are associated with the originating line, then, as indicated at step 752, the 18CC SLP retrieves voice files for the service. Then, at step 754, the 18CC SLP commands the NGS to play messages to and collect digits at the originating line, as now described with respect to FIG. 10(*i*).

FIG. 10(*i*) is a sequence diagram illustrating the procedure implementing SIBBs for playing messages to and collect digits at the originating line. As indicated at step 790, FIG. 10(*i*), the 18CC SLP sends a Play Message request to the CLP for forwarding to the LLP and the NGS NOS Agent. In the request, the line identification, the voice file addresses and the call identification are sent. The commands sent may include: Play Tone, Play Greeting w/cutthru and Collect Dual Tone Multi-Frequency ("DTMF") w/a timeout. It is understood that these commands may be concatenated and forwarded by NOS in a single message. Then, as indicated at step 791, the CLP forwards the 18CC SLP request to the originating LLP and the LLPO forwards the Play Msg commands and the Collect Digits command to the NGS NOS Agent, as indicated at step 793. The NGS then allocates the appropriate resource and performs the commands in the sequence they are received. That is, at step 794, the NGS NOS Agent sends the collected DTMF Digits to the LLP for future forwarding to the 18CC SLP and, at step 796, the LLPO forwards the DTMF digits to the CLP. Finally, at step 798, the collected DTMF Digits are forwarded from the CLP to the 18CC SLP where the DTMF digits represent the DDD of the called party.

Returning to FIG. 13(*a*), having received the DTMF, the next step is to perform the validation of the entered DDD which entails instantiating a validate DDD SLP in the manner as described herein with respect to FIG. 10(*d*). Particularly, the 18CC SLP or SIBB sends a logical name representing the validate DDD SLP to NOS NT for name translation. Then, NT sends the logical validate DDD SLP Name to DM and DM returns the actual validate DDD SLP name plus the object reference (stored location). The NT then queries its LRM to determine if the validate DDD SLP is already instantiated on this node. If not, it instantiates the SLP. The LRM returns the address of the SLEE where the validate DDD SLP is instantiated to NT and NT sends the physical address of the instantiated validate DDD SLP to the 18CC SLP.

Returning back to FIG. 13(*a*), at step 756, the 18CC SLP forwards the query to the validate DDD SLP and the DDD is validated according to length, NPA and NXX. The Validate DDD SLP executes the query and the result is returned to the 18CC SLP. For purposes of explanation, it is assumed that the query result returned indicates a valid DDD.

Having validated the entered DDD, the next step is to perform the LIDB DB Lookup on the entered DDD to determine if the line is billable, as indicated at step 757, FIG. 13(*a*). Thus, in accordance with FIG. 10(*b*), the following steps for instantiating the LIDB lookup are performed. First, the 18CC SLP sends the logical LIDB SLP to NT for name translation and NT returns the physical address for the LIDB SLP if already instantiated, or if not instantiated, implements NOS LRM and NRS functions to determine the best node that is able to run the LIDB SLP, e.g., on the basis of location and node status. After NRS returns the selected node to NOS NT, the NT of the local node requests the NT of the remote node to instantiate the LIDB SLP. Thus, the NT on the remote node queries its LRM to determine if the LIDB SLP is already instantiated on this node. If not, it instantiates the SLP. The LRM of the remote node forwards the query data to the LIDB SLP, including the return address of the 18CC SLP. The LIDB SLP formats the query data to the appropriate format and forwards the query to the gateway-to the LIDB database. The LIDB query is executed and the result is returned to the 18CC SLP.

Then, as indicated at step 758, the following steps are performed to command the NGS to play the name prompt message and to record the name of the caller. Specifically, the 18CC SLP implements a Play Message request SIBB implementing functionality for forwarding the line identification, the voice file addresses and the caller identification data to the NGS NOS agent, and commanding NGS to Play Name Prompt and Record Name at the originating line. These NGS commands may concatenated and forwarded as one message. The CLP forwards the 18CC SLP request to the originating LLPO which then forwards the respective Play Message command and Record message command to the NGS NOS Agent. The NGS allocates the appropriate resource and performs the commands in the sequence they are received.

The NGS NOS Agent then sends a command complete notification to the LLPO for future forwarding to the 18CC SLP. Finally, the command complete notification is forwarded from the LLP to the CLP which then forwards it to the 18CC SLP.

Next, at step 760, FIG. 13(*b*), the terminating node location lookup is performed, and, at step 762, SIBBs are invoked to communicate a command to the NGS to place the caller on hold and perform an outdial. Specifically, the following steps are implemented: 1) the 18CC SLP forwards a Place Caller on Hold command to the CLP for forwarding to the NGS NOS Agent. Along with the command is the line identifier of the line that is to be placed on hold; 2) the CLP forwards the command to the originating LLP; 3) the originating LLP forwards the Place Caller on Hold command to the NGS NOS Agent and the NGS places the caller on hold; 4) the NGS NOS Agent then sends a command complete notification to the LLPO for future forwarding to the 18CC SLP; 5) the Command Complete notification is forwarded from the LLPO to the CLP which then forwards notification to the 18CC SLP indicating that the caller has been placed on hold; and 6) the 18CC SLP forwards an Outdial w/Answer Notification command including the terminating node location to the CLP for forwarding to the NGS NOS Agent.

The next step 764 is to instantiate the LLP for the terminating line (LLPT) on the terminating node and perform a lookup of the profile associated with the line, and to return the customer line information to LLP. Then, as indicated at step 765, steps for performing the outdial, and receiving answer notification are performed. Particularly, these steps include: 1) the CLP forwarding the outdial command to the originating LLPO; 2) the originating LLPO forwarding the outdial w/Answer Notification command to the NGS NOS Agent; 3) the NGS places the outdial; 4) the ELP writes the outdial data to Data Management for formatting and forwarding; 5) the NGS NOS Agent sends an answer notification to the LLPO of the originating line; 6) the LLP forwards the answer notification to the CLP which then forwards the answer notification to the 18CC SLP; and 7) the 18CC SLP determines that the answer notification is an indication that someone has answered the phone versus an answer machine or other device.

Next, as indicated at step 766, a command is initiated to the NGS to play further messages at the terminating line and to collect DTMF/Voice from the-caller representing the called party's response to the acceptance of the charges. In this scenario, it is assumed that the called party accepts the charges. The steps include: 1) the 18CC SLP sends a "Play Message" request to the CLP for forwarding to the LLPT and the NGS NOS Agent. In the request, the line identification, the voice file addresses and the call identification data are sent. The commands sent may include: Play Collect Call Message, Playback Recorded Name, Play Accept Charges Message and Recognize Voice/Collect DTMF w/a timeout and may be concatenated and forwarded as one message; 2) the CLP forwards the 18CC SLP request to the terminating LLP; 3) the LLP forwards the Play Msg commands to the NGS NOS Agent and, in response, the NGS allocates the appropriate resource and performs the commands in the sequence they are received; 4) the NGS NOS Agent sends the collected DTMF Digits/Recognized Voice to the LLP for future forwarding to the 18C, SLP; and, 5) the collected DTMF Digits/Voice are forwarded from the LLP to the CLP which are then forwarded to the 18CC SLP.

Next, as indicated at step 768, FIG. 13(*b*), the NGS is instructed to take the caller off hold and bridge the caller and the called party. These steps comprise: 1) sending the command to take the caller off hold to the CLP for future forwarding to the NGS NOS Agent; 2) forwarding the request to the LLPO of the originating line; 3) forwarding the command to the NGS NOS Agent. Within the command, the lines to be bridged are identified; 4) the NGS NOS Agent sends a command complete notification to the LLP for future forwarding to the 18CC SLP; and 5) the command complete notification is forwarded from the LLP to the CLP which is then forwarded to the 18CC SLP indicating that the caller and called party have been bridged. Finally, as indicated at step 769, the call completion process is performed.

Figure 14A:
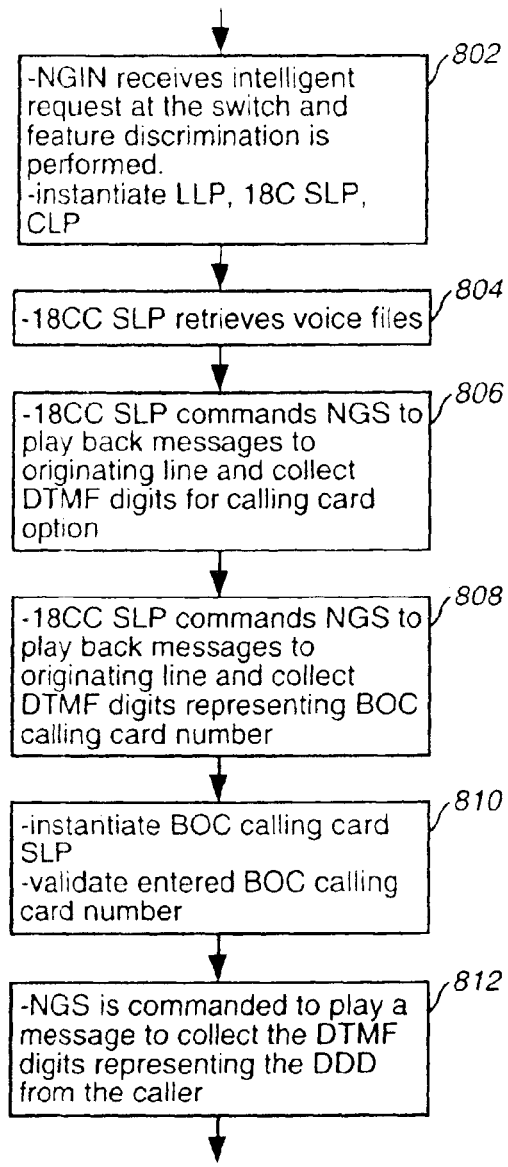
FIGS. 14(a) and 14(b) depict an example process for performing 1-800/8xx collect call service when caller implements a calling card.
Figure 14B:
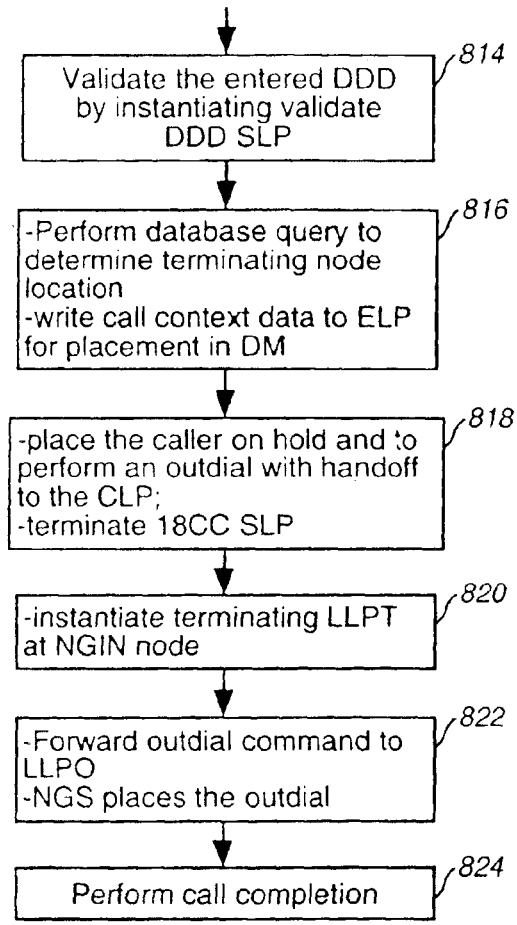

An 1-800 collect call ("18CC") scenario with a calling card option is now described in greater detail with respect to FIG. 14(*a*). This 18CC scenario describes the ability to, provide a 1-800 Collect service with a calling card option. In this scenario, a 18CC SLP is instantiated to provide the service. This SLP will call a Validate DDD SLP to verify that the DDD entered by the caller is valid.

First, as indicated at step 802, FIG. 14(*a*), the NGIN receives the intelligent request at the switch, the feature discrimination is performed and, the 18CC SLP and LLP (and CLP) instantiations are performed and respective interfaces established. In this 18CC scenario, the instantiated 18CC SLP performs a DM database query and determines features associated with the originating line. For purposes of explanation, it is assumed that no features are associated with the originating line. Then, as indicated at step 804, the 18CC SLP retrieves voice files for the service. Then, at step 806, the 18CC SLP commands the NGS to play messages to and collect digits at the originating line. As previously described with respect to FIG. 10(*i*), the 18CC SLP implements SIBBs for playing messages to and collecting digits at the originating line which represent the calling card option.

Then, as indicated at step 808, the NGS is further commanded to play further messages and collect the actual BOC calling card number from the caller. These steps include: sending a Play Message request, including the line identification, the voice file addresses and the call identification data, to the CLP for forwarding to the LLP and the NGS NOS Agent; and, sending a concatenated message including a Play Message w/cutthru command prompting the caller to enter the BOC Card message and a collect DTMF w/a timeout command. The CLP then forwards the 18CC SLP request to the originating LLP which then forwards the Play Msg command and the collect DTMF command to the NGS NOS Agent. The NGS allocates the appropriate resource and performs the commands in the sequence they are received. The NGS NOS Agent sends the collected DTMF Digits (representing the BOC card number entered by the caller) to the LLP for future forwarding to the 18C SLP. The collected DTMF Digits are then forwarded from the LLP to the CLP which then forwards them to the 18C SLP.

In the manner as described wmth respect to FIG. 10(*c*), the next step 810 instantiates a BOC Card validation SLP or SIBB ("BOX_CC_SLP") which requests the validation of the BOC Card number entered by the caller. Once instantiated, the BOC CC SLP formats the query data to the appropriate format and forwards the query to the gateway to the BOC Card database. The BOC Calling Card query is executed and the result is returned to the 18CC SLP. For this scenario, it is assumed that the entered BOC Card number is valid.

Next, as indicated at step 812, the NGS is commanded to play a message to collect the DTMF digits representing the DDD from the caller, forwarding the collected digits, and validating the entered DDD, as indicated at step 814, FIG. 14(*b*). As described herein with respect to FIG. 10(*h*), this requires instantiation of a Validate DDD SLP which executes the query and returns the result to the 18CC SLP. In this scenario, it is assumed that the DDD entered is valid. Next, as indicated at step 816, the terminating node location lookup is performed followed by a command from the 18CC SLP to place the caller on hold and to perform an outdial in the manner as previously described. Then, as indicated at step 818, an outdial with handoff from the 18CC SLP to the CLP is initiated including the terminating node information. The 18CC SLP is thereafter terminated.

The next step 820 is to instantiate the LLP for the terminating line (LLPT) on the terminating node, perform a lookup of the profile associated with the line, and to return the customer line information to the LLP. Then, at step 827, the command for the outdial and the receipt of the answer notification, and further instructions are forwarded to the NGS for the terminating line.

Finally, the call completion process described herein with respect to FIG. 10(f) is performed at step 824. Upon notification of the call completion from the CLP, the ELP writes the call information to DM and terminates.

A further service provided by NGIN, and exemplified by the flow chart of FIG. 15(a), is an Enhanced Voice Service Takeback and Transfer (TNT) service implementing a TNT SLP in the manner as described. First, as indicated at step 852, FIG. 15(a), the NGIN receives the intelligent request at the switch, performs feature discrimination, and, the, instantiates TNT SLP, LLP (and CLP) objects with respective interfaces established. Then, as indicated at step 854, the TNT SLP retrieves voice files for the service. This entails performing a database query via NOS to retrieve the physical address of the actual voice file library. Next, at step 856, NGS is commanded to play messages to the originating line. Specifically, the TNT SLP sends a Play Message request to the CLP for forwarding to the LLP and the NGS NOS Agent. In the request, the line identification, the voice file addresses and the call identification are sent. The commands sent include: Play Greeting, Play Menu Route w/cutthru and Collect DTMF w/a timeout and, may be concatenated and forwarded as one. Then, the CLP forwards the TNT SLP request to the originating LLP which forwards the Play Msg commands and the Collect Digits command to the NGS NOS Agent. The NGS allocates the appropriate resource and performs the commands in the sequence they are received. The NGS NOS Agent then sends the collected DTMF Digits to the LLP for future forwarding to the TNT SLP via the CLP. In this EVS TNT scenario, the DTMF digits represent the menu option selected by the caller. The. TNT SLP logic correlates the menu option with an outdial to a Routing Plan ID associated with a second Party B as indicated at step 857.

Then, as indicated at step 858, a routing DB lookup is performed to translate the routing plan ID to a physical termination address of Party B which is returned to the calling TNT SLP. Additionally, as indicated at step 860, a database lookup is performed to determine the terminating node location. As a result of this query, DM returns the terminating location to the TNT SLP. In this scenario, the terminating node for Party B is one other than the originating node.

At the following step 862, an outdial to Party B is performed, i.e., the TNT SLP forwards an Outdial w/Answer Notification command including the terminating node information to the CLP for forwarding to the NGS NOS Agent. Since this is a supervised outdial, an indication of busy, no answer or answer must be sent back from NGS. It is assumed that the TNT SLP remains running. Next, at step 864, in the manner described herein, the LLPT for the terminating line (Party B) on the terminating node is instantiated and a lookup of the profile associated with the line is performed.

The process continues at step 866, FIG. 15(b), where the command for the outdial is forwarded from the CLP to the LLPO, which is forwarded to the NGS via NOS to place the outdial. At this point, the ELP may write the outdial data to Data Management for formatting and forwarding. Assuming that Party B answered the call, the NGS NOS Agent sends an answer notification to the LLPO which forwarded to the TNT SLP via the CLP. The TNT SLP accordingly determines that the answer notification is an indication that someone has answered and, in response., initiates a bridge to the caller.

As indicated at step 868, FIG. 15(b), the NGS bridges Party A to Party B and listens for DTMF detection on both lines. Specifically, the TNT SLP forwards a Bridge Parties/Listen for DTMF command to the CLP for forwarding to the NGS NOS Agent. Along with the command is the line identifiers of the lines that are to be bridged. The Listen for DTMF command includes detecting a hangup condition on the lines. The CLP forwards the command to the originating LLPO which forwards the Bridge Parties/Listen for DTMF command to the NGS NOS Agent. The NGS NOS Agent in turn, sends a command complete notification to the TNT SLP via, the LLPO and CLP, the notification indicating that Party A and Party B are bridged and may now converse.

At the next step 870, it is assumed that DTMF digits entered by Party B and representing the transfer code and predefined list selection of Party C, are detected. Specifically, this step entails having the NGS NOS Agent send the collected DTMF Digits to the LLP for future forwarding to the TNT SLP via the CLP. The TNT SLP then forwards a Place Caller on Hold/Play Music command to the CLP for forwarding to the NGS NOS Agent. Along with the command is the line identifier of the line (Party A) that is to be placed on hold. The CLP forwards this command to the originating LLP which, in turn, forwards the Place Caller on Hold/Play Music command to the NGS NOS Agent to enable the NGS to place caller A on hold. The NGS NOS Agent sends a command complete notification to the LLP for future forwarding to the TNT SLP via the CLP, the notification indicating that caller A has been placed on hold. It is assumed that the act of placing Caller A on hold breaks the bridge between A and B, cancels the Listen for DTMF on Party A's line, and starts the playing of the music on-hold to Party A.

At the following step 872, a lookup on the entered list option entered by Party B is performed. The TNT SLP sends the list selection entered by Party B to DM for a destination translation. The DM returns the physical termination address (of party C) to the TNT SLP, i.e., the list selection translated to Party C's physical termination address. Included is the step of determining the terminating node location for Party C via NOS to determine the physical termination address which is returned to the TNT SLP. In this scenario, it is assumed that the terminating node for Party C is one other than the originating node or Party B's terminating node.

Next, as indicated at step 874, FIG. 15(b), an outdial to Party C is performed. Specifically, the TNT SLP forwards an Outdial w/Answer Notification command including the terminating node information to the CLP for forwarding to the NGS NOS Agent via the originating LLP and the NGS places the outdial. As this is a supervised outdial, an indication of busy, no answer or answer is sent back from NGS. Additionally, the ELP writes the outdial data to Data Management for formatting and forwarding. The NGS NOS Agent sends an answer notification to the LLP of the originating line. Assuming that Party C answered the call, the LLP forwards the answer notification to the TNT SLP via the CLP. The TNT SLP determines that someone has answered and a bridge to the caller can now be made. Then, at step 876, the LLPT for the terminating line of Party C is instantiated on the terminating node and a lookup of the profile associated with that line is performed in the manner as described herein.

The next step 878 commands the NGS to bridge Party B to Party C and to listen for DTMF detection on the line associated with Party C. Particularly, the TNT SLP forwards a Bridge Parties/Listen for DTMF command to the CLP for forwarding to the NGS NOS Agent. Along with the command is the line identifiers of the lines that are to be bridged (Party B and Party C). The Listen for DTMF command includes detecting a hangup condition on the lines and applies only to Party C since Party B's line already has the DTMF listen initiated. The CLP then forwards the command to the originating LLP which forwards the command to the NGS NOS Agent. The NGS NOS Agent sends a command complete notification to the LLP for forwarding to TNT SLP via the CLP which notification indicates that Party B and Party C are bridged. After the completion of these steps, Party B and Party C are now talking, Party A is on Hold and the TNT SLP is still running.

Figure 15C:
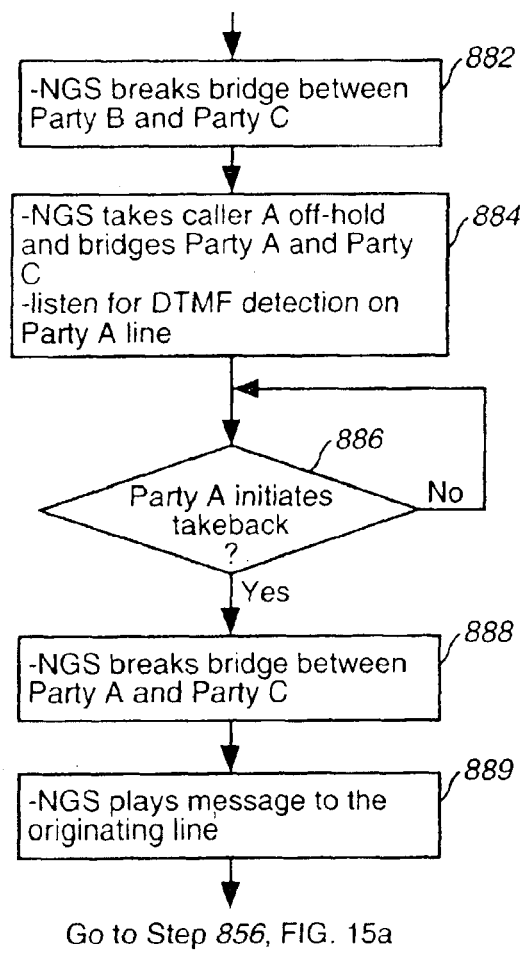

As indicated at step 880, a determination is made as to whether a hangup by Party B has been detected. If not, the process waits for the hang-up event. If a hang-up is detected on Party B's line at step 880, then, as shown in FIG. 15(c), step 882, the NGS is commanded to break the bridge between Party B and Party C. Specifically, the NGS NOS Agent sends the hangup detection to the LLP for forwarding to the TNT SLP via CLP. The TNT SLP forwards a Break Bridge command to the NGS NOS agent via the CLP and LLPO. Along with the command is the line identifiers of the lines (Party B) that are to be affected. The NGS NOS Agent sends a command complete notification to the LLP for forwarding to the TNT SLP via the CLP indicating that the bridge between Party B and Party C has been broken.

Then, as indicated at step 884, the NGS is commanded to take Caller A off-hold and bridge Party A and Party C together. Upon completion of these steps, Party A and party C are talking, Party B has hung up and the TNT SLP is still running in case a takeback or giveback is initiated. Particularly, the TNT SLP forwards a Take Caller off Hold/Bridge parties/Listen for DTMF command to the CLP for forwarding to the NGS NOS Agent. Along with the command is the line identifiers of the lines that are affected The Listen for DTMF command only affects Party A's line since the Listen for DTMF has already been initiated on Party C's line. Via the LLP, the CLP forwards the Take Caller Off Hold/Bridge parties/Listen for DTMF command to the NGS NOS Agent. The NGS NOS Agent sends a command complete notification to the TNT SLP via the CLP, the notification indicating that the bridge between Party A and Party C has been made.

Next, as indicated at step 886, a determination is made as to whether Party A has initiated a takeback. If not, the process waits for the takeback digit code to be entered. Particularly, the DTMF digits representing the takeback code entered by Party A are detected and forwarded to the TNT SLP via NOS. As a result of a takeback being detected, the NGS is commanded to break the bridge between Party A and party C, as indicated at step 888. The TNT SLP forwards a Break Bridge command to the CLP for forwarding to the NGS NOS Agent via the LLPO. Along with the command is the line identifiers of the Party A and Party C lines that are to be affected. When the command is completed, the NGS NOS Agent'sends a command complete notification to the LLPO for forwarding to the TNT SLP via the CLP the notification indicating that the bridge between Party A and Party C has been broken. Party A is now returned back to the menu route of the TNT SLP.

Finally, as indicated at step 889, the NGS is commanded to play messages to the originating line and collect digits in the manner as described herein. In the request, the line identification, the voice file addresses and the call identification are sent including commands such as: Play Menu Route w/cutthru and Collect DTMF w/a timeout. In the manner as described herein, the NGS NOS Agent sends the collected DTMF Digits to the LLP for future forwarding to the TNT SLP via the LLP and CLP. The DTMF Digits represent the menu option selected by the caller.

The EVS TNT scenario is now ended at this point. Party A has initiated a takeback and is now played the main menu message. This scenario loops back to step 856, FIG. 15(a) where the caller can enter any option off of the menu.

In addition to the 18C and advanced collect call services described herein, the NGIN supports the following additional services, including, but not limited: 1) 900 Service, i.e., upon receiving 900 calls, NGIN decides whether the 900 service provider is local or national. If it is local, the call is routed to the service provider CPE. A special rate will be applied to the caller. If the service provider is national, the call is routed to the long distance carrier of the service provide to further call routing; 2) Find me/Follow Services, i.e., an address is assigned to a particular subscriber and that subscriber may change the destination associated with that address. IN this manner, NGIN allows a subscriber to receive calls as they move locations; 3) Abbreviate Services, i.e., translating subscriber's abbreviated dialing digits into a valid NANP digits and routing the call accordingly. The subscriber may specify the length of the abbreviated dialing number, and number of total abbreviated dialing numbers. The subscriber may also change the abbreviated dialing number by interaction with the system through DTMF tones; 4) Advance Call Waiting Services, i.e., extending the call waiting feature by delivering caller ID to the called party via special user terminal or, playing the caller's name; 5) Advanced Fax Service, i.e., forwarding the fax according to the Forward List having, for example, TOD/DOW options; 6) Advanced Voice Mail Services, e.g., Voice Mail services with advanced features, such as integrated fax mail box, voice mail message indication through special tone when the subscriber picks up the phone, or paging, delivering voice mail to an address or, a list of addresses; 7) Anywhere Call Pick-up Services, i.e., combining conventional paging services with network based capabilities for completing calls. The calling party is given the option of paging the subscriber, entering some indicator via DTMF input to inform the subscriber who is calling (e.g. preassigned number or code), and wait for the subscriber to be connected to the line. As an option, the service platform may pass along the calling number of the calling party for display on the subscriber's pager screen; 8) One Number Service, i.e., providing a single number for a business customer for all the service locations across the country. The user dials the number, and the call will be routed to a location nearest to the caller based on the calling party's originating location; 9) Single Number Service, i.e., a combination of Find-Me and Follow-Me services; 10) Voice Activated Dialing Services, i.e., a subscriber may speak a word or a phrase to make a call instead of dialing digits on the phone pad. To enable the service, the subscriber is required to create a voice dialing list and do the following: first, record the names of the frequent called numbers; secondly, associate the recorded name with a called number; and finally, send the voice dialing list to the service provider's database. Then, the subscriber may use the voice dialing list to originate calls by saying a name that is on the voice dialing list. It is understood that the subscriber may change the content of number list any time; 11) Voice Activated Corporate Directory Services, i.e., a feature working in conjunction with Centrex service to provide automated access to any station within the corporate campus. The system prompts the caller for the name of the party to be accessed and terminates the call to the party requested; 12) Voice Activated Network Control Services, i.e., by *dialing feature code, a subscriber may activate or deactivate a certain feature, such as call waiting, by giving voice instruction to the system; 13) Voice Activated Premier Dialing Services, i.e., enabling commercial customers to put their company's name in the voice activated dialing list. For example, a hotel chain may put its hotel name or location in a voice activated dialing list. When a caller calls the hotel reservation service, the caller may speak the name of the hotel and the location of the hotel. In response, the call will be routed to the designated hotel and the specified location; 14) Vnet Work At Home Voice Services, i.e., assigning to employees who work at home a business number to their home phone. Thus, when the employee makes a business phone, they may use the Vnet service by dialing a *feature code prior to the Vnet number. The network will access the Vnet dialing plan of the customer and translate the number to the Vnet termination. The call will be charged to the Vnet business customer automatically. When an incoming call is received, a distinctive ringing will be applied to alert the user of a business call; 15) Who Called Me Services, i.e., storing in the network all the phone calls to a subscriber that were not answered. The subscriber may browse through all the stored phone calls. The calling party name may be spelled -out to the customer if requested; 16) Prepaid Card Services, i.e., enabling an end user to purchased a PrePaid calling card and make long distance calls with the card. An access number is assigned to the service. The caller may be prompted for the card ID after greeted by the system. If any units equivalent to the prepaid money are still available on the card, the caller will be allowed to make long distance call. The units are depleted while the conversation is going on, and when the units are used up, the caller will be disconnected. The user has the option to recharge the card with any commercial credit card. Customer service and operator service may also be provided; 17) Automated Customer-Name and Address Services, i.e., dedicating a special service access number for callers to check the name and address associated with any directory number. The system will prompt the caller for the directory number to be checked and play back the name and address associated with the number; 18) Automatic Call Back Incoming Services, i.e., providing a memory of those calls not answered by the subscriber. The subscriber may decide to call back any of the not answered call by browsing through the list of calling party numbers and indicating to the system the one to be dialed through DTMF tone. This feature can be accessed through * feature code; 19) Call Forwarding Busy/No Answer Services, i.e., forwarding a call on Busy or No Answer condition either to another directory number or to a voice mail box. The subscriber may change the forwarding number plan; 20) Call Waiting Services, i.e., providing a tone indication of an incoming call to the subscriber while another conversation is in progress. The subscriber may choose to ignore or receive the call by hook flash; 21) Calling Name Delivery Services, i.e., enabling a subscriber to receive, with a special terminal, the calling party name/number when an incoming call is in alerting stage. If the call is not answered, the calling party number/number will be stored in the terminal for later use; 22) Find-Me Services, i.e., assigning a phone number to a subscriber, not a terminal. A single number consolidates all current contact numbers such as home, office, mobile, pager, etc. to make the subscribers readily accessible to associates, customers and family. The subscriber is provided with a Find-Me List which consists of home, office, mobile, pager, voice mail or fax numbers. When there is a call to the subscriber, Find Me Feature directs the calls to the termination according to the Find-Me List. If the call is not answered by any of the termination specified in the Find-Me List, the call will be sent to subscriber's voice mail box; 23) Follow Me Services, i.e., allowing the Find Me feature subscriber to manipulate the Find Me number list, e.g., to change the order, number schedule (TOD, DOW) etc.; 24) supporting the automatic recall function; the automatic reverse charging function, the calling number identification restriction function, the message waiting notification function, the mobile access hunting function, the preferred language, the remote feature call, the three-way calling, the ability to broadcast services with/without user individual presentation control, supporting directory services capabilities, supporting computer-based training services, supporting entertainment on demand, games and contests, supporting information gathering and archiving-warehousing, support multimedia archive access, supporting pay per view for special events, support programming packaging, support shopping, targeted advertising, targeted entertainment, targeted news, video on demand movies, and video cam recorder capabilities on-line.

A few preferred embodiments have been described in detail hereinabove. It is to be understood that the scope of the invention also comprehends embodiments different from those described, yet within the scope of the claims.

For example, the general purpose computer is understood to be a computing device that is not made specifically for one type of application. The general purpose computer can be any computing device of any size that can perform the functions required to implement the invention.

An additional example is the "Java" programming language can be replaced with other equivalent programming languages that have similar characteristics and will perform similar functions as required to implement the invention.

The usage herein of these terms, as well as the other terms, is not meant to limit the invention to these terms alone. The terms used can be interchanged with others that are synonymous and/or refer to equivalent things. Words of inclusion are to be interpreted as non-exhaustive in considering the scope of the invention. It should also be understood that various embodiments of the invention can employ or be embodied in hardware, software or microcoded firmware.

While the present invention has been disclosed and discussed in connection with the above-described embodiment, it will be apparent to those skilled in the art that numerous changes, variations and modifications within the spirit and scope of the invention are possible. Accordingly, it is, therefore, intended that the following, claims shall encompass such variations and modifications.

What is claimed is:

1. A method for performing a call routing service in an intelligent network having one or more service nodes and a switch platform, the method comprising:

receiving call origination information at a first object instance executing in an execution environment, the execution environment being provided at a service node in response to a service request;

the first object instance determining an originating line object instance for maintaining the state of a communications line associated with a call origination;

implementing, via a service object, methods for performing a service for a customer, and initiating instantiation of a service logic and a line object in the execution environment;

querying a database associated with the execution environment for retrieving call routing information in support of the service and for determining a terminating location;

initiating instantiation of a terminating line object instance for maintaining the state of a communications line associated with a call termination;

communicating call routing commands from the service object to the line object; and providing a platform-independent communication system for routing the call information between a calling party and a destination party via the originating and terminating line object instances independent of their location in the network.

2. The method as claimed in claim 1, wherein the initiating instantiation includes:

instantiating a call object for maintaining a current state of a call.

3. The method as claimed in claim 2, wherein the call origination information includes a unique identifier for identifying a received call, the call object maintaining a state of each call based on the unique identifier.

4. The method as claimed in claim 3, further comprising:

maintaining and storing call context data associated with services performed for each call processed, the call context data identified by the unique identifier.

5. The method as claimed in claim 2, wherein the receiving call origination information includes determining a name of the first object instance and finding an executing version of the object based on the name.

6. The method as claimed in claim 1, wherein the first object instance performs feature discrimination function for determining a type of call object to be executed, the feature discrimination function including performing a database storage lookup to find logical name of each call, line and service objects.

7. The method as claimed in claim 1, further comprising:

communicating events received at the switch platform to the platform-independent communication system.

8. The method as claimed in claim 7, wherein the providing a platform-independent communication system further comprises:

converting a logical name of an object to an address location for executing an instance of the object.

9. The method as claimed in claim 4, wherein the maintaining and storing call context data further comprises:

instantiating an event object for receiving the call context data related to service processing from one or more of the originating line object instance, a call object instance, a service object instance, or the switch platform.

10. The method as claimed in claim 1, wherein the line object checks for features associated with a physical line, and including first line object instance for maintaining state of an originating line and a second object instance for maintaining state of a terminating line, the method further including registering the line object instance with the switching platform.

11. The method as claimed in claim 9, wherein the call object for maintaining state of current call provides interface connection point to the service object, the line object and the event object.

12. The method as claimed in claim 3, wherein a single line object instance is associated with multiple calls, each call identified by the unique identifier.

13. The method as claimed in claim 1, further comprising:

querying a customer profile database to determine a customer profile based on the call origination information and a called number.

14. A system for routing service calls in an intelligent network having one or more service nodes and a switch platform including an originating switch for receiving a service request in the form of a call event, the system comprising:

communication system for enabling communication between object instances executing at service nodes in the intelligent network;

an object instance executing in an execution environment associated with the originating switch for communicating call origination information corresponding to call events received at the switch platform to one or more object instances executing in an execution environment provided at a service node associated with the switch via a platform-independent communication system and determining a first line object instance for maintaining a state of a communications line associated with a call origination; and a database storage device for retrieving call routing information in support of the requested service, and including a terminating switch location address for the call based on the retrieved call routing information, and initiating instantiation of a second line object instance for maintaining the state of a communications line associated with a call termination, wherein the communication system communicates call routing commands between a service object and the first and second line object instances, the first and second line object instances enabling connection between the originating and terminating switches independent of their location in the network to establish a call connection between called and calling parties.

15. The system as claimed in claim 14, further including a call object instance for maintaining a current state of a call, and further enabling communication among the service object and the first and second line object instances via the platform-independent communication system.

16. The system as claimed in claim 15, wherein the origination information includes a unique identifier for identifying a received call, the call object instance tracking execution of services performed for a call event based on the unique identifier.

17. A system for routing service calls in an intelligent network, the system comprising:

communication system for enabling communication between object instances executing at service nodes in the intelligent network, the intelligent network further comprising a switch platform including an originating switch for receiving a service request in the form of a call event;

an object instance executing in an execution environment associated with the originating switch for communicating call origination information corresponding to call events received at the switch platform to one or more object instances executing in an execution environment provided at a service node, and determining a first line object instance for maintaining a state of a communications line associated with a call origination; and a database storage device for retrieving call routing information and terminating switch location addresses for the call based on the retrieved call routing information and for initiating instantiation of a second line object instance for maintaining the state of a communications line associated with a call termination, wherein the first and second line object instances enable connection between the originating and terminating switches independent of their location in the network to establish a call connection.

18. A method for performing a call routing service in an intelligent network having one or more service nodes and a switch platform, the method comprising:

receiving call origination information at a first object instance executing in an execution environment;

the first object instance determining an originating line object instance for maintaining the state of a communications line associated with a call origination;

a service object implementing methods for performing a service for a customer, and initiating instantiation of service logic and a line object in the execution environment;

retrieving call routing information in support of service and determining a termination location, initiating instantiation of a terminating line object instance for maintaining the state of a communications line associated with a call termination;

communicating call routing commands from the service object to the line object; and routing the call information between a calling party and a destination party via the originating and terminating line object instances independent of their location in the network.

* * * * *